US012654132B2

(12) United States Patent
Rousselet et al.

(10) Patent No.: US 12,654,132 B2
(45) Date of Patent: Jun. 16, 2026

(54) AIR CONTACTOR

(71) Applicant: Baltimore Aircoil Company, Inc.,
Jessup, MD (US)

(72) Inventors: Yohann Lilian Rousselet, Baltimore,
MD (US); Preston Blay, Silver Spring,
MD (US); Philip Hollander, Silver
Spring, MD (US); Ellie M. Litwack,
Columbia, MD (US)

(73) Assignee: Baltimore Aircoil Company, Inc.,
Jessup, MD (US)

( * ) Notice: Subject to any disclaimer, the term of this
patent is extended or adjusted under 35
U.S.C. 154(b) by 503 days.

(21) Appl. No.: 18/226,103

(22) Filed: Jul. 25, 2023

(65) Prior Publication Data

US 2024/0024815 A1     Jan. 25, 2024

Related U.S. Application Data

(60) Provisional application No. 63/392,018, filed on Jul.
25, 2022.

(51) Int. Cl.
B01D 53/02          (2006.01)
B01D 53/14          (2006.01)
(Continued)

(52) U.S. Cl.
CPC ......... B01D 53/78 (2013.01); B01D 53/1412
(2013.01); B01D 53/1425 (2013.01);
(Continued)

(58) Field of Classification Search
CPC ........ B01D 2251/304; B01D 2251/306; B01D
2251/404; B01D 2251/604;
(Continued)

(56) References Cited

U.S. PATENT DOCUMENTS 5,390,505 A     2/1995  Smith
5,724,828 A     3/1998  Korenic
(Continued)

FOREIGN PATENT DOCUMENTS

WO        2010107974 A1     9/2010

OTHER PUBLICATIONS

B.A.C.® TriConditioner™ Turbine Inlet Air Conditioner; brochure;
Baltimore Aircoil Company; PP-2M-2/99; copyright 1999; 4 pages.
(Continued)

*Primary Examiner* — Christopher P Jones
(74) *Attorney, Agent, or Firm* — Fitch, Even, Tabin &
Flannery LLP

(57) ABSTRACT

In one aspect, an air contactor comprising an air inlet, an air
outlet, a fan assembly to produce an airflow, a heat
exchanger operable to transfer heat between a process fluid
and the airflow, and an air pollutant capture system config-
ured to selectively remove an air pollutant from the airflow.
A controller has a fluid cooling and air pollutant capture
mode wherein the controller controls the fan assembly to
facilitate the heat exchanger transferring heat between the
process fluid and the airflow and the air pollutant capture
system removing the air pollutant from the airflow. The
controller has a fluid cooling mode wherein the controller
controls the fan assembly to facilitate the heat exchanger
transferring heat between the process fluid and the airflow
and the air pollutant capture system removing less of the air
pollutant from the air.

27 Claims, 56 Drawing Sheets

(51) Int. Cl.

| | | |
|---|---|---|
| *B01D 53/18* | (2006.01) | |
| *B01D 53/22* | (2006.01) | |
| *B01D 53/26* | (2006.01) | |
| *B01D 53/34* | (2006.01) | |
| *B01D 53/62* | (2006.01) | |
| *B01D 53/78* | (2006.01) | |
| *B01D 53/96* | (2006.01) | |

(52) U.S. Cl.
CPC ......... *B01D 53/1475* (2013.01); *B01D 53/18* (2013.01); *B01D 53/22* (2013.01); *B01D 53/268* (2013.01); *B01D 53/343* (2013.01); *B01D 53/346* (2013.01); *B01D 53/62* (2013.01); *B01D 53/96* (2013.01); *B01D 2251/304* (2013.01); *B01D 2251/306* (2013.01); *B01D 2251/604* (2013.01); *B01D 2257/206* (2013.01); *B01D 2257/504* (2013.01); *B01D 2257/7025* (2013.01); *B01D 2257/708* (2013.01); *B01D 2257/80* (2013.01); *B01D 2258/06* (2013.01)

(58) Field of Classification Search
CPC ........ B01D 2257/206; B01D 2257/504; B01D 2257/7025; B01D 2257/708; B01D 2257/80; B01D 2258/06; B01D 53/0407; B01D 53/1412; B01D 53/1425; B01D 53/1475; B01D 53/18; B01D 53/22; B01D 53/268; B01D 53/343; B01D 53/346; B01D 53/62; B01D 53/78; B01D 53/96

See application file for complete search history.

(56) References Cited

U.S. PATENT DOCUMENTS

| | | | |
|---|---|---|---|
| 8,728,428 | B1 | 5/2014 | Heidel |
| 9,353,994 | B1 | 5/2016 | Allison, III |
| 9,375,681 | B2 | 6/2016 | Strickroth |
| 9,511,319 | B2 | 12/2016 | Allison, III |
| 9,637,393 | B2 | 5/2017 | Heidel |
| 9,975,100 | B2 | 5/2018 | Heidel |
| 10,016,723 | B2 | 7/2018 | Strickroth |
| 10,214,448 | B2 | 2/2019 | Heidel |
| 10,421,039 | B2 | 9/2019 | Heidel |
| 10,471,388 | B2 | 11/2019 | Strickroth |
| 10,478,776 | B2 | 11/2019 | Strickroth |
| 10,519,041 | B2 | 12/2019 | Heidel |
| 10,767,561 | B2 | 9/2020 | Brady |
| 11,014,043 | B2 | 5/2021 | Heidel |
| 11,014,823 | B2 | 5/2021 | Heidel |
| 11,083,995 | B2 | 8/2021 | Strickroth |
| 11,369,922 | B2 | 6/2022 | Strickroth |
| 11,504,667 | B2 | 11/2022 | Keith |
| 11,623,863 | B2 | 4/2023 | Mccahill |
| 11,655,421 | B2 | 5/2023 | Heidel |
| 11,667,538 | B2 | 6/2023 | Heidel |
| 2001/0032477 | A1 | 10/2001 | Schlom |
| 2002/0056994 | A1 | 5/2002 | Irish |
| 2009/0151566 | A1* | 6/2009 | Handagama ....... B01D 53/1425 252/364 |
| 2009/0155889 | A1* | 6/2009 | Handagama ....... B01D 53/1425 423/220 |
| 2012/0031596 | A1 | 2/2012 | Kippel |
| 2012/0152116 | A1* | 6/2012 | Barclay .................. B01D 53/06 96/144 |
| 2012/0160098 | A1* | 6/2012 | Papale ............... B01D 53/0476 96/127 |
| 2013/0067922 | A1 | 3/2013 | Zhang |
| 2013/0269346 | A1* | 10/2013 | Li ........................... F01K 17/04 60/645 |
| 2014/0271379 | A1 | 9/2014 | Heidel |
| 2014/0314647 | A1 | 10/2014 | Strickroth |

| | | | |
|---|---|---|---|
| 2015/0017706 | A1 | 1/2015 | Kainth |
| 2015/0329369 | A1 | 11/2015 | Heidel |
| 2016/0102631 | A1* | 4/2016 | Lynn ......................... F02C 1/10 60/517 |
| 2016/0236137 | A1* | 8/2016 | Amte ..................... B01D 53/12 |
| 2017/0081207 | A1 | 3/2017 | Heidel |
| 2017/0082370 | A1 | 3/2017 | Strumenti |
| 2017/0252697 | A1 | 9/2017 | Strickroth |
| 2017/0327421 | A1 | 11/2017 | Heidel |
| 2017/0354925 | A1 | 12/2017 | Heidel |
| 2019/0118138 | A1 | 4/2019 | Strickroth |
| 2019/0126200 | A1 | 5/2019 | Strickroth |
| 2019/0144333 | A1 | 5/2019 | Heidel |
| 2019/0336909 | A1 | 11/2019 | Keith |
| 2019/0344217 | A1 | 11/2019 | Heidel |
| 2019/0359894 | A1 | 11/2019 | Heidel |
| 2020/0109059 | A1 | 4/2020 | Heidel |
| 2020/0208887 | A1 | 7/2020 | Mohammad |
| 2020/0217602 | A1 | 7/2020 | Blay |
| 2020/0230548 | A1 | 7/2020 | Libert |
| 2020/0299132 | A1 | 9/2020 | Mccahill |
| 2020/0346165 | A1 | 11/2020 | Lu |
| 2020/0384410 | A1 | 12/2020 | Strickroth |
| 2020/0400372 | A1* | 12/2020 | Castellucci ............ F25J 1/0292 |
| 2021/0101107 | A1 | 4/2021 | Heidel |
| 2021/0220771 | A1* | 7/2021 | Lefebvre ................ B01D 53/62 |
| 2021/0284545 | A1 | 9/2021 | Heidel |
| 2021/0356221 | A1 | 11/2021 | Blay |
| 2021/0380475 | A1 | 12/2021 | Heidel |
| 2022/0096998 | A1 | 3/2022 | Heidel |
| 2022/0176312 | A1 | 6/2022 | Olmstead |
| 2022/0178619 | A1 | 6/2022 | Rousselet |
| 2022/0193606 | A1 | 6/2022 | Nold |
| 2022/0362707 | A1 | 11/2022 | Kemp |
| 2022/0362737 | A1 | 11/2022 | Staufcik |
| 2023/0036635 | A1 | 2/2023 | Santos-Heard |
| 2023/0158446 | A1 | 5/2023 | Keith |
| 2023/0322554 | A1 | 10/2023 | Mccahill |
| 2023/0331576 | A1 | 10/2023 | Heidel |
| 2023/0357645 | A1 | 11/2023 | Heidel |
| 2023/0417494 | A1 | 12/2023 | Xu |
| 2024/0399290 | A1* | 12/2024 | Zaabout ............. B01D 53/1412 |

OTHER PUBLICATIONS

Benjaminsen, Christina; Capturing CO2 Using Heat Pumps; article from https://norwegianscitechnews.com/2018/05/capturing-co2-using-heat-pumps/; published May 22, 2018; retrieved Oct. 26, 2023; 3 pages.

Castro-Muñoz, Roberto et al., A new relevant membrane application: CO2 direct air capture (DAC); Chemical Enginerring Journal 446 (2022); https://doi.org/10.1016/j.cej.2022.137047; 13 pages.

CELdek Evaporative Cooling Pad product description by Munters Corporation, https://www.munters.com/en/munters/products/coolers-humidifiers/celdek-evaporative-cooling-pad---us/; retrieved Jun. 30, 2022; 4 pages.

Das, Sarit K et al.; A Review of Heat Transfer in Nanofluids; Publisher Summary; Advances in Heat Transfer, vol. 41, 2009, pp. 81-197; https://www.sciencedirect.com/science/article/abs/pii/S006527170841002X; 3 pages.

Direct air capture: A process engineer's view (Low-Carbon Energy Center Webinar); YouTube video https://www.youtube.com/watch?v=9uRHKnQ3b5s; published Jan. 26, 2021; disclosing screen captures and audio transcription; 33 pages.

Elfving, Jere et al.; Kinetic approach to modelling CO2 adsorption from humid air using amine-functionalized resin: Equilibrium isotherms and column dynamics; Chemical Engineering Science 246 (2021) 116885; https://doi.org/10.1016/j.ces.2021.116885; 18 pages.

Heat transfer fluids: key to CSP success; article from https://reutersevents.com/renewables/csp-today/technology/heat-transfer-fluids-key-csp-success; May 7, 2013; retrieved Jun. 30, 2022; 2 pages.

Heidel, Kenton et al.; Process design and costing of an air-contactor for air-capture; Energy Procedia 4 (2011) 2861-2868; doi: 10.1016/j.egypro.2011.02-192; 8 pages.

(56) References Cited

OTHER PUBLICATIONS

Higgins, Stuart J. et al.; CO2 Capture Modeling, Energy Savings, and Heat Pump Integration; Abstract from Ind. Eng. Chem. Res. 2015, 54, 9, 2526-2553; https://pubs.acs.org/doi/10.1021/ie504617w ; 6 pages.

Holmes, Geoffrey et al., An air-liquid contactor for large-scale capture of CO2 from air; Phil. Trans. R. Soc. A (2012) 370, 4380-4403, doi:10.1098/rsta.2012.0137; 25 pages.

Images of heat exchangers publicly available before Jul. 25, 2022, 3 pages.

International Search Report and Written Opinion from related International Application No. PCT/US2023/028602 dated Jan. 26, 2024; 19 pages.

Invitation to Pay Additional Fees from related International Application No. PCT/US2023/028602 dated Oct. 17, 2023; 2 pages.

Keith, David W., et al.; A Process for Capturing CO2 from the Atmosphere; Joule 2, 1573-1594, Aug. 15, 2018; https://doi.org/10.1016/j.joule.2018.05.006.

MIT engineers develop efficient means of carbon capture using electrochemical cell; article from https://www.greencarcongress.com/2019/10/20191027-mitcc.html; Oct. 27, 2019; retrieved Jun. 28, 2022; 17 pages.

Molecular Sieves: Mineral Adsorbents, Filter Agents, and Drying Agents; technical description from https://www.sigmaaldrich.com/us/en/technical-documents/technical-article/chemistry-and-synthesis/reaction-design-and-optimization/molecular-sieves; 2022; retrieved Jun. 30, 2022; 4 pages.

Phase Change Material (PCM) Selection, PCM Technology overview from Advanced Cooling Technologies, Inc. website https://www.1-act.com/products/pcm-heat-sinks/pcmselection; copyright 2022; retrieved Jun. 30, 2022; 6 pages.

Photovoltaics definition from Wikipedia at https://en.wikipedia.org/w/index.php?oldid=1095846810&title=Photovoltaics; Jun. 30, 2022; retrieved on Jun. 30, 2022; 35 pages.

Powerpoint presentation describing Bulk Air Coolers publicly disclosed before Jul. 25, 2022, 23 pages.

Sanz-Pérez, Eloy S. et al.; Direct Capture of CO2 from Ambient Air; Chem. Rev. 2016, 116, 11840-11876; doi: 10.1021/acs.chemrev.6b00173; 37 pages.

Siqueira, Rafael M. et al.; Carbon dioxide capture by pressure swing adsorption; Energy Procedia 114 (2017) 2182-2192; doi: 10.1016/j.egypro.2017.03.1355; 11 pages.

Sorption definition from Wikipedia at https://en.wikipedia.org/w/index.php?title=Sorption&oldid=1079454784; Mar. 26, 2022; retrieved Jun. 30, 2022; 2 pages.

Temple, James; Maybe we can afford to suck CO2 out of the sky after all; MIT Technology Review from https://www.technologyreview.com/s/611369/maybe-we-can-afford-to-suck-cosub2sub-out-of-the-sky-after-all/?set=; Jun. 7, 2018; 8 pages.

U.S. Appl. No. 63/392,018, filed Jul. 25, 2022, entitled Air Contactor; 132 pages.

Vidal, John; How Bill Gates aims to clean up the planet; The Guardian from https://www.theguardian.com/environment/2018/feb/04/carbon-emissions-negative-emissions-technologies-capture-storage-bill-gates; Feb. 4, 2018; 6 pages.

Voskian, Sahag et al.; Faradaic electro-swing reactive adsorption for CO2 capture; Energy Environ. Sci. 2019, 12, 3530-3547; doi: 10.1039/c9ee02412c; 18 pages.

* cited by examiner

Once the Filter is Saturated with
CO₂ the Filter is Heated to 100 °C

CO₂ is then Released
from the Filter
and Collected

Concentrated CO₂

CO₂-free Air

CO₂ is Chemically
Bound to the Filter

Ambient
Air

Reverse Polarity

Existing building with cooling tower and natural gas boiler

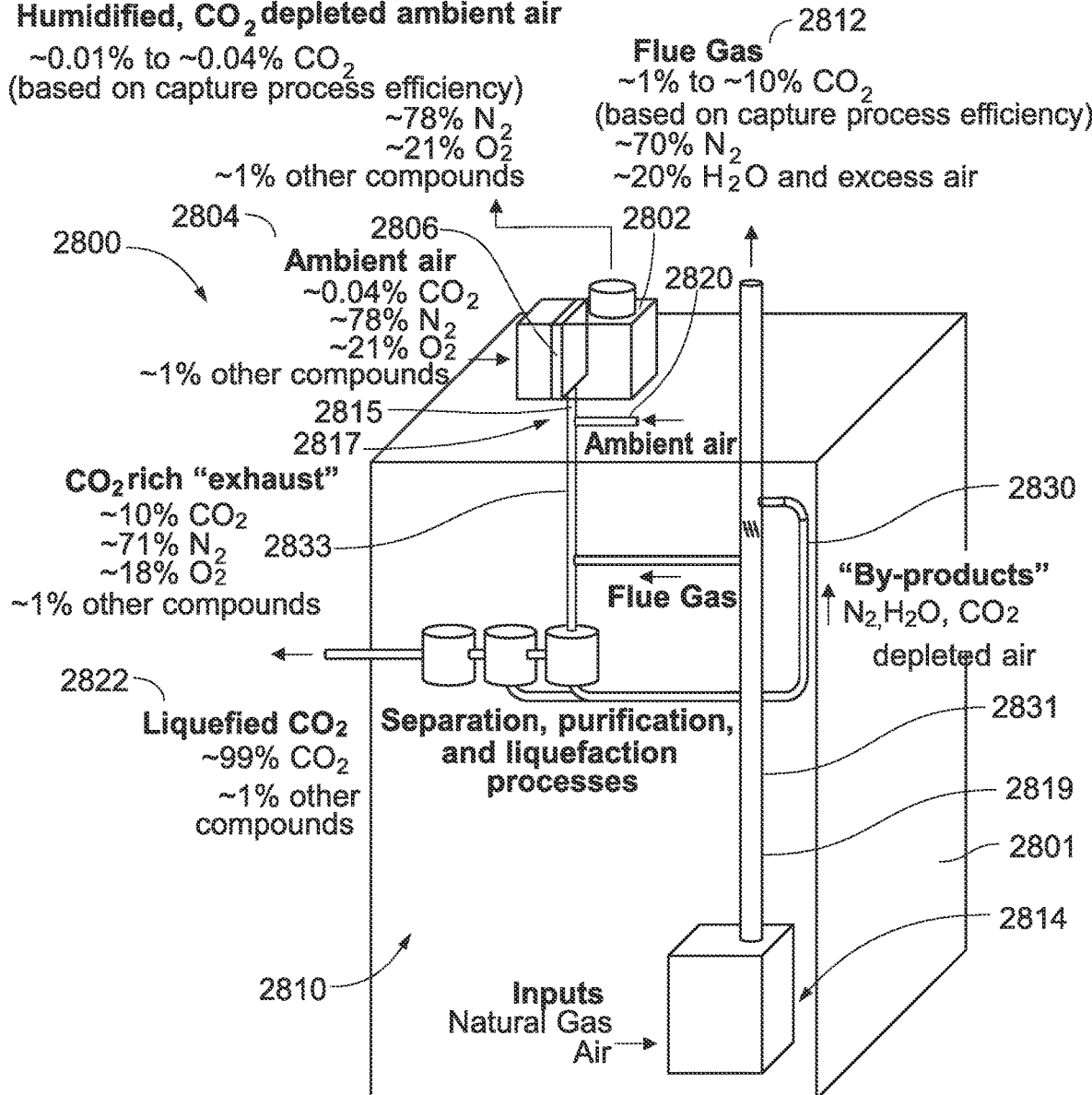

Humidified, CO$_2$ depleted ambient air
~0.01% to ~0.04% CO$_2$
(based on capture process efficiency)
~78% N$_2$
~21% O$_2$
~1% other compounds

Flue Gas
~1% to ~10% CO$_2$
(based on capture process efficiency)
~70% N$_2$
~20% H$_2$O and excess air 2800
2804
2806
2812
2802
2820

Ambient air
~0.04% CO$_2$
~78% N$_2$
~21% O$_2$
~1% other compounds 2815
2817
Ambient air

CO$_2$ rich "exhaust"
~10% CO$_2$
~71% N$_2$
~18% O$_2$
~1% other compounds

2833

2830

Flue Gas

"By-products"
N$_2$, H$_2$O, CO$_2$
depleted air

2822

Liquefied CO$_2$
~99% CO$_2$
~1% other
compounds

Separation, purification, and liquefaction processes

2831
2819
2801
2814

2810

Inputs
Natural Gas
Air

Existing building with CO$_2$ capture-enabled cooling tower, natural gas boiler, and combined CO$_2$ processing

FIG. 46

AIR CONTACTOR

CROSS-REFERENCE TO RELATED APPLICATION

This application claims benefit of U.S. Provisional Application No. 63/392,018, filed Jul. 25, 2022, which is hereby incorporated herein by reference in its entirety.

FIELD

This disclosure relates to air contactors and, more specifically, to air contactors having pollutant capture media to remove one or more pollutants from the air.

BACKGROUND

Some carbon capture systems utilize air contactors to remove an air pollutant, such as $CO_2$, from the air. Some of these air contactors have fill and a carbon capture solution recirculation system that sprays carbon capture solution onto the fill. The air contactors have fan assemblies to generate airflow across the fill. The air contacts the carbon capture solution and chemically reacts with the carbon capture solution such that carbon in the air as $CO_2$ transfers into the carbon capture solution and forms a different molecule such as $K_2CO_3$.

The fan assemblies of these known air contactors are downstream of the carbon capture media. In some applications, the spraying of carbon capture solution onto the fill creates droplets of the carbon capture solution that may accumulate on the fan assembly. The carbon capture solutions may include harsh chemicals that can degrade the operation of the fan assembly over time.

SUMMARY

In one aspect, an air contactor is provided that includes an air inlet, an air outlet, a fan assembly to produce an airflow from the air inlet to the air outlet, and a heat exchanger operable to transfer heat between a process fluid and the airflow. The air contactor has an air pollutant capture system configured to configured to selectively remove an air pollutant from the airflow, the air pollutant capture system having an air pollutant capture medium with an affinity for the air pollutant to remove the air pollutant from the airflow. In one embodiment, the air pollutant capture medium is configured to remove an air pollutant in a gaseous state from the airflow. For example, the air pollutant capture medium may be a liquid solution or a solid material configured to chemically react with one or more air pollutants, such as $CO_2$, in the air. In other embodiments, the air pollutant capture medium utilizes physical absorption or physisorption to remove one or more air pollutants from the air.

The air contactor further includes a controller operatively connected to the fan assembly, heat exchanger, and the air pollutant capture system. The controller has a process fluid cooling and air pollutant capture mode as well as a process fluid cooling mode. In the process fluid cooling and air pollutant capture mode, the controller controls the fan assembly to facilitate the heat exchanger transferring heat between the process fluid and the airflow and controls the air pollutant capture system to remove the air pollutant from the airflow. In the fluid cooling mode, the controller controls the fan assembly to facilitate the heat exchanger transferring heat between the process fluid and the airflow and controls the air pollutant capture system to remove less of the air pollutant from the air than when the controller is in the fluid cooling and air pollutant capture mode. In this manner, the air contactor is able to both remove an air pollutant from the airflow and transfer heat between the airflow and the process fluid as the airflow travels between the air inlet and the air outlet. Further, the controller may operate in the process fluid cooling mode when air pollutant capture is not needed, which conserves one or more resources (e.g., water, electrical energy, a gas used in solid sorbent-based system, etc.) used to remove the air pollutant from the airflow.

The present disclosure also provides an air contactor having a fan assembly operable to produce an airflow, an indirect heat exchanger configured to exchange heat between the airflow and a process fluid, and a liquid absorbent material configured to permit the airflow to travel through the liquid absorbent material. The air contactor includes a liquid distribution system comprising an air pollutant capture solution supply. The liquid distribution system is configured to provide an air pollutant capture solution from the air pollutant capture solution supply to the liquid absorbent material.

The air contactor further includes a controller operatively connected to the fan assembly and the liquid distribution assembly. The controller is configured to control the liquid distribution system to provide the air pollutant capture solution to the liquid absorbent material. The controller is further configured to control the fan assembly to cause air to flow through the liquid absorbent material having the air pollutant capture solution so that the air pollutant capture solution removes the air pollutant from the air and a portion of the water of the air pollutant capture solution evaporates. The air contactor thereby utilizes water evaporation during the interaction between the airflow and the air pollutant capture solution to adiabatically cool the airflow or increase the humidity of the airflow as desired for a particular embodiment.

The present disclosure also provides an air contactor having an airflow generator operable to produce an airflow. The air contactor has an air pollutant capture system that includes an air pollutant capture apparatus to transfer an air pollutant from the airflow to a fluid, a fluid regeneration apparatus configured to utilize heat from a heat source to remove an air pollutant from the fluid, and a thermal energy storage operable to either receive heat from the air pollutant capture fluid or provide heat to the a fluid regeneration apparatus. The heat source may be an intermittent heat source, such as a heat source powered by solar or wind power. The fluid may be an air pollutant capture fluid such as a liquid carbon capture solution that is sprayed onto fill of the air pollutant capture system. In another embodiment, the air contactor includes a solid sorbent and the fluid is a carrier gas (e.g., nitrogen or steam) that is used to remove the air pollutant from the solid sorbent.

The air pollutant capture system has a regeneration and charging mode wherein the fluid regeneration apparatus receives heat from the heat source, the fluid regeneration apparatus removes the air pollutant from the fluid, and the thermal energy storage receives heat from the fluid. The air pollutant capture system also has a regeneration and discharging mode wherein the fluid regeneration apparatus receives heat from the thermal energy storage and the fluid regeneration apparatus removes the air pollutant from the fluid. The air contactor further includes a controller operatively connected to the air pollutant capture system, the controller configured to operate the air pollutant capture system in the regeneration and discharging mode in response to a determination of the air pollutant capture system in the regeneration and discharging mode satisfying an operating criterion. In this manner, the air contactor may utilize the thermal energy storage to provide heat to the fluid regeneration apparatus when, for example, the heat source is unable to provide adequate heat such as during nighttime when the heat source utilizes solar power.

In another aspect of the present disclosure, an air contactor is provided that includes a fan assembly to generate an airflow and an air pollutant capture system. The air pollutant capture system includes an air pollutant capture apparatus to transfer an air pollutant from the airflow to a fluid and an fluid regeneration apparatus configured to remove the air pollutant from the fluid. The air contactor further includes a mechanical heat generator comprising at least one of a chiller and a heat pump, the mechanical heat generator configured to receive a process fluid from an industrial process (e.g., manufacturing, HVAC, energy production, data center) at a first temperature and to receive a heat transfer fluid from the air pollutant capture system. The mechanical heat generator is operable to increase the temperature of the heat transfer fluid to a second temperature higher than the first temperature and return the heat transfer fluid to the fluid regeneration apparatus at the second temperature to facilitate the fluid regeneration apparatus removing the air pollutant from the fluid. Because the mechanical heat generator provides the heat transfer fluid at the higher, second temperature, the air contactor is able to regenerate the fluid despite the process fluid having the first temperature which may be inadequate to drive the regeneration process by itself.

BRIEF DESCRIPTION OF THE DRAWINGS

FIG. 46 is a schematic view of a building having a building having air contactor to remove $CO_2$ from the ambient air, a natural gas boiler, and a carbon capture system that removes $CO_2$ from flue gas of the natural gas boiler and a $CO_2$-rich exhaust gas of the air contactor;

DETAILED DESCRIPTION

Figure 1:
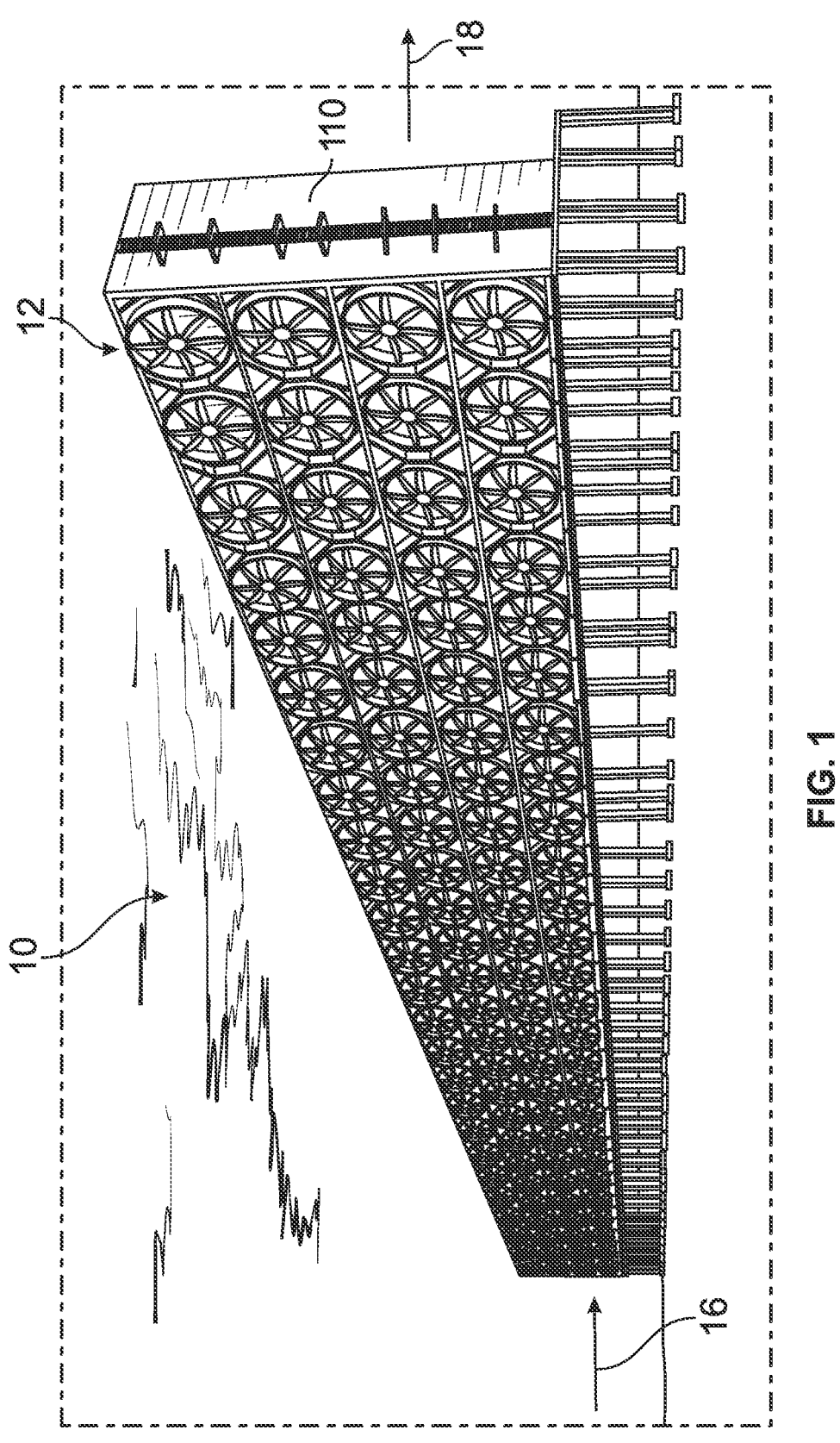
FIG. 1 is a perspective view of an air contactor train having columns of air contactors to remove pollutants from the air.

With reference to FIG. 1, an air contactor train 10 is provided having an array of air contactors 12 that draw air in direction 16 into the air contactors 12. The air contactors 12 are configured to remove one or more air pollutants from the air, such as $CO_2$, methane, volatile organic compounds (VOC), and/or volatile halogenated organic carbons (VOX).

Figure 2:
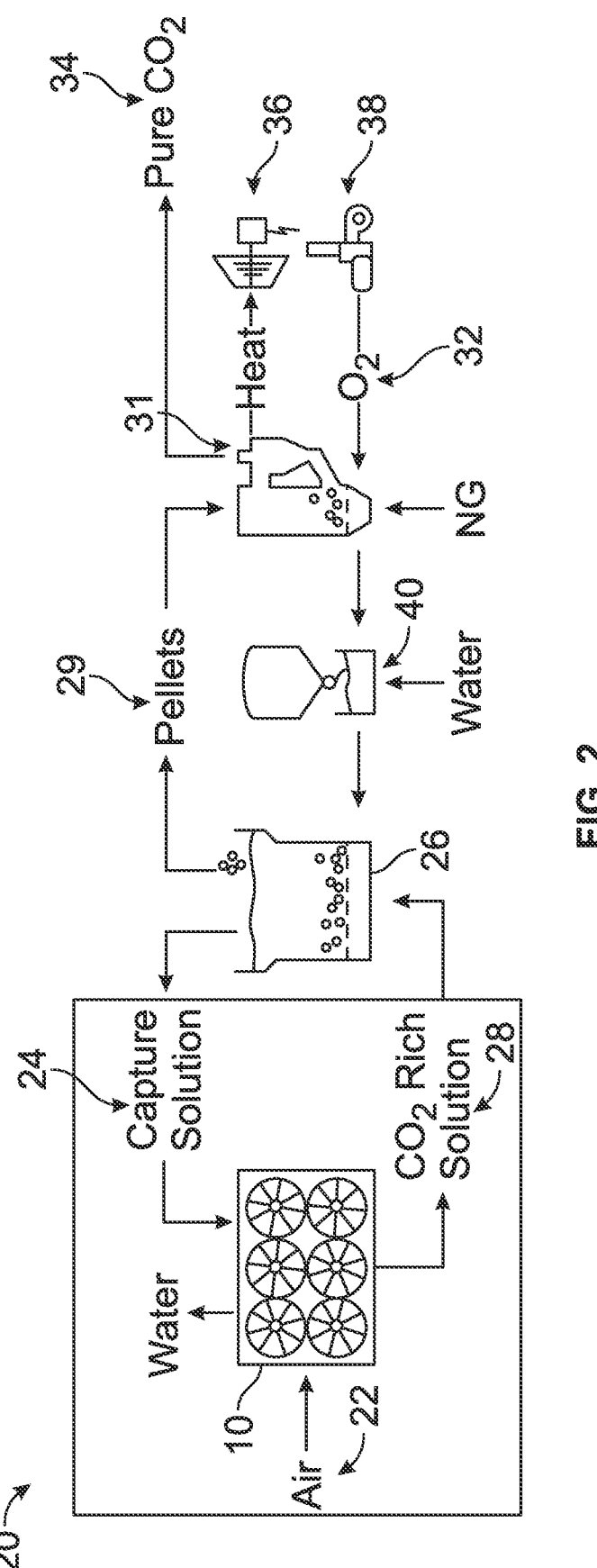
FIG. 2 is a schematic representation of a carbon capture system including the air contactor train of FIG. 1.

Regarding FIG. 2, an air pollutant capture system 20 is provided that includes the air contactor train 10 for removing one or more pollutants from air 22. In one example, the air pollutant capture system 20 is configured to remove $CO_2$ from the air 22. The air contactor train 10 receives a carbon capture solution 24 with a lower $CO_2$ content and discharges a carbonate solution 28 having a higher $CO_2$ content due to the $CO_2$ being entrained into the carbonate solution 28. The carbon capture solution 24 may include, for example, KOH or NaOH. The carbonate solution 28 may include, for example, K$_2$CO3.

The air pollutant capture system 20 includes a pellet reactor 26 that receives the carbonate solution 28 and contains a chemical that reacts with the carbonate solution 28 to cause carbon in the carbonate solution 28 to precipitate out of the solution as a solid 29 such as pellets. For example, the pellet reactor 26 may contain CaOH$_2$. The CaOH$_2$ in the pellet reactor 26 react with the K$_2$CO3 in the carbonate solution 28 to form liquid KOH and precipitate CaCO3 as solids 29 such as pellets. The solids 29 that precipitate in the pellet reactor 26 is collected and provided to a calciner 30. The calciner 31 burns natural gas and oxygen 32. In one embodiment, the calciner 31 releases $CO_2$ and forms CaO. The $CO_2$ is released as an output 34, such as in gas form.

The CaO is sent to a slacker 40 and mixed with water to form CaOH. The system 20 may also include a steam turbine 36 that uses waste heat from the calciner 31 to make electricity and a cryogenic air separation unit 38. The cryogenic air separation unit 38 produces highly concentrated oxygen under pressure to feed to the calciner 31, such as 99% or higher pure $O_2$ at 10 MPa. In this manner, the system 20 generates pure $CO_2$ 34 from air passing through the air contactor train 10.

Figures 3, 4:
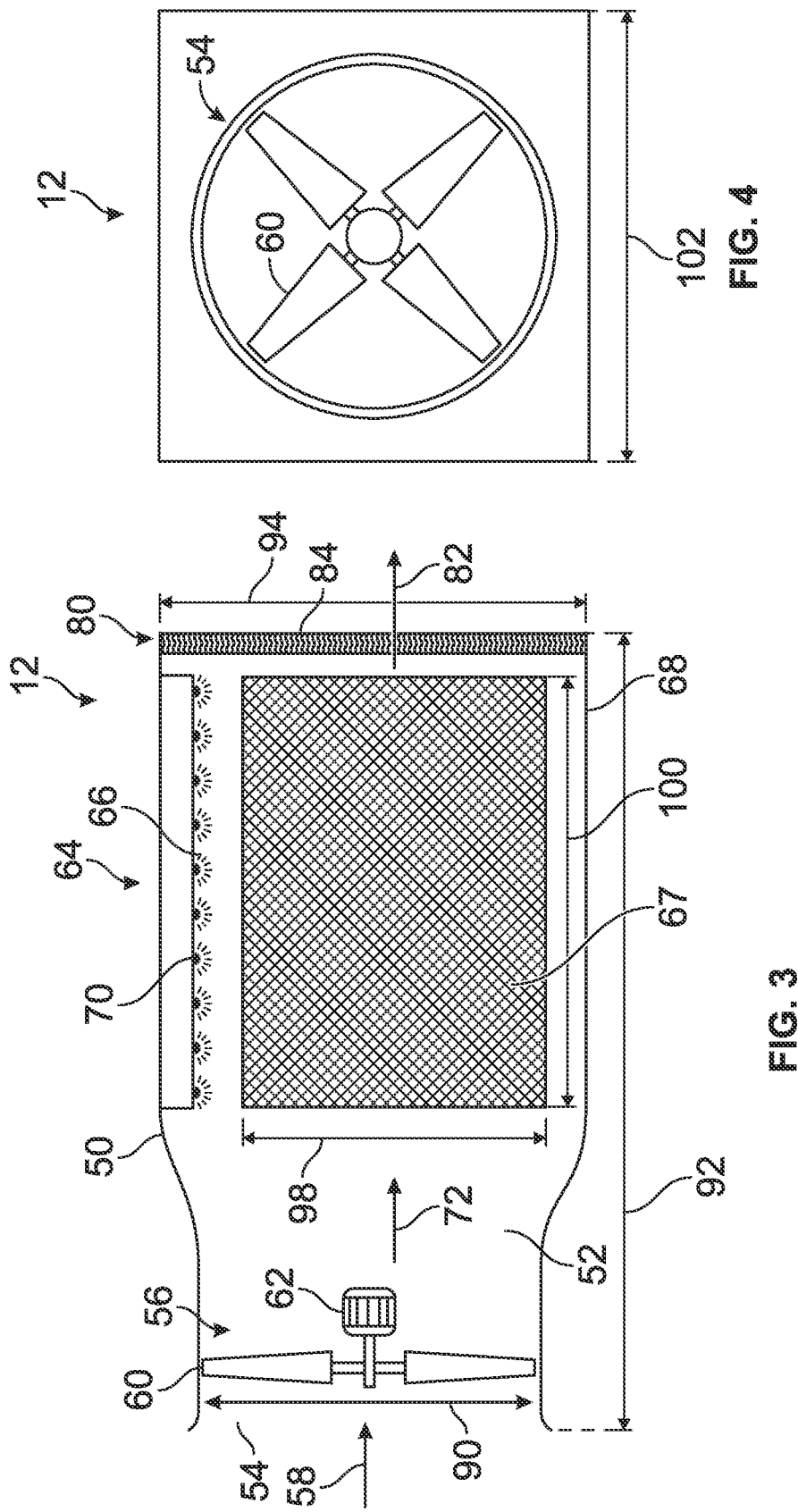
FIG. 3 is a cross-sectional view of an air contactor.
FIG. 4 is an end elevational view of the air contactor of FIG. 3.

With reference to FIG. 3, the air contactor 12 has a housing 50, an air inlet 54, and an air outlet 80. The air contactor 12 has an airflow generator, such as a fan assembly 56, that draws $CO_2$-rich ambient air in direction 58 into the air inlet 54. The fan assembly 56 has a fan 60 and a motor 62 generally upstream of a $CO_2$ capture system 64 of the air contactor 12. The $CO_2$ capture system has a $CO_2$ capture medium, such as a liquid carbon capture solution 27, distributed onto a support such as fill 67. As another example, the support may be a liquid absorbent material such as a pad.

The $CO_2$ capture system 64 includes a carbon capture solution distribution system 66 for distributing the liquid carbon capture solution 27 onto the fill 67. The fill 67 is hung or otherwise supported in the housing 50 between the air inlet 54 and the air outlet 80. The carbon capture solution distribution system 66 has one or more nozzles 70 for distributing the carbon capture solution 24 onto the fill 67.

The fan assembly 56 directs airflow in direction 72 within the housing 50 and across the fill 67. The carbon capture solution 24 on the surfaces of the fill 67 chemically reacts with the $CO_2$ in the air to entrain $CO_2$ in the air into the carbon capture solution 24 which is collected (see discussion of FIG. 7 below). The air flows across the fill 67 and exits the housing 50 via the outlet 80 in direction 82. The air exiting the housing 50 via the outlet 80 is $CO_2$-poor or depleted compared to the $CO_2$-rich ambient air entering the air inlet 54. The air contactor 12 may include a drift eliminator 84 to collect droplets of carbon capture solution in the air downstream of the fill 67. Because the carbon capture distribution system 66 is downstream of the fan assembly 56, there is little risk of droplets of the carbon capture solution 24 contacting the fan assembly 56. The operational lifespan of the fan assembly 56 is thereby increased by keeping the carbon capture solution 24 from contacting the fan assembly 56, which improves the durability of the air contactor 12. In one embodiment, the fan 60 has a diameter 90 of 11 feet, the housing 50 has a length 92 of feet 4 inches, the housing 50 has a height 94 of 13 feet, and the fill 67 includes rectangular fill sheets having a height 98 of 9 feet 4 inches, and a length 100 of 13 feet 4 inches.

Regarding FIG. 4, the fan 60 has four blades, although other blade configurations may be used. The air contactors 12 of the air contactor train 10 may each have their own motor 62 driving the fan 60 of the air contactor 12 or may have a single motor driving multiple fans 60. The air contactor 12 has a width 102 that may be, for example, 14 feet.

Figure 5:
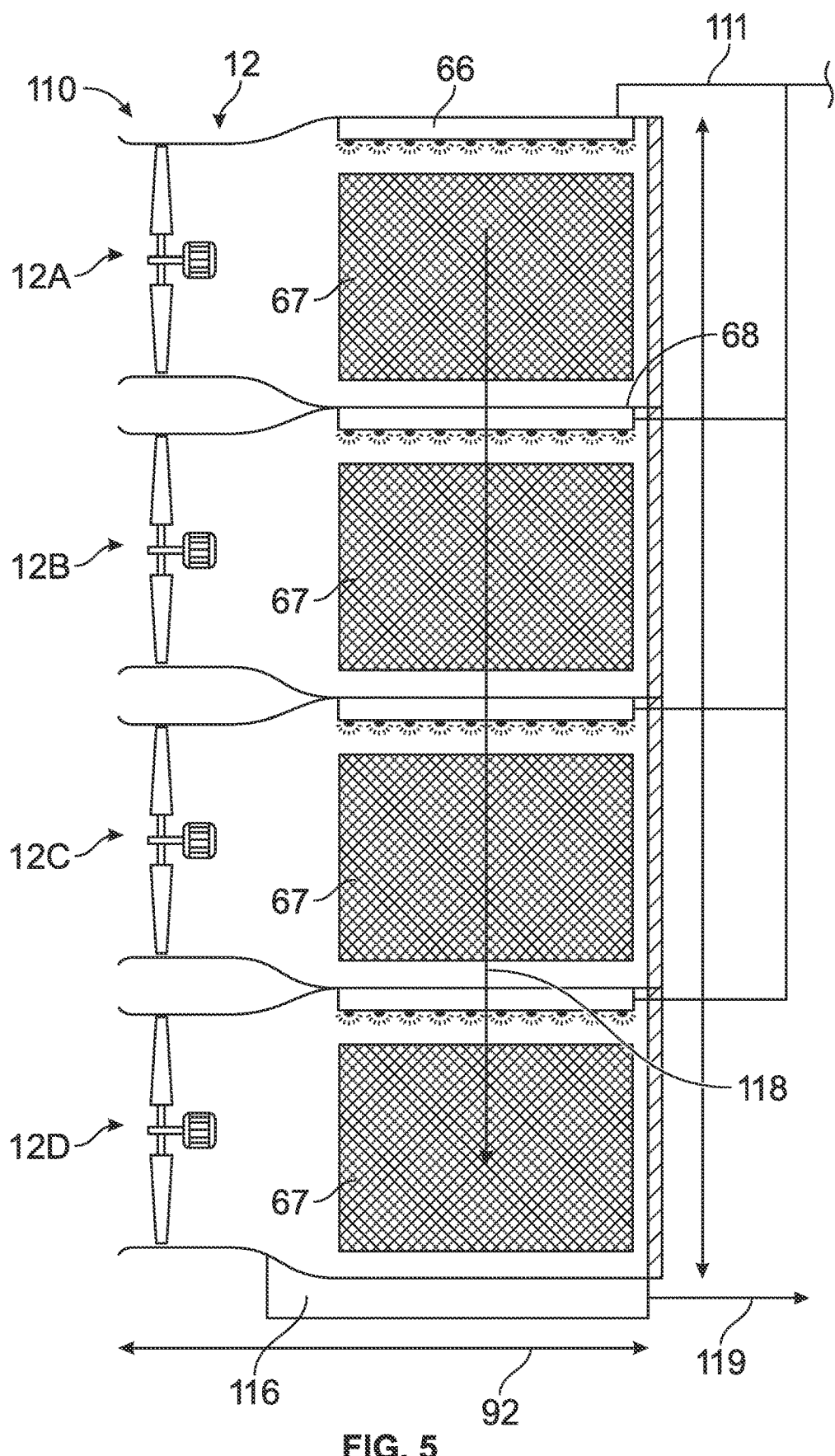
FIG. 5 is a cross-sectional view of a stack of air contactors of FIG. 3.

Regarding FIG. 5, the air contactor train 10 includes a number of air contactor stacks 110 having multiple air contactors 12 assembled one on top of another. For example, air contactors 12A, 12B, 12C, 12C are shown stacked on top of one another. In the embodiment of FIG. 5, the air contactor stack 110 includes a carbon capture solution supply 111 that provides carbon capture solution 24 to the carbon capture solution distribution system 66 of the air contactors 12A, 12B, 12C, 12D. The air contactors 12A, 12B, 12C, 12D have floors 68 with one or more openings that permit the carbon capture solution 24 to fall from the fill 67 of each air contactor 12 into the interior 52 of the air contactor 12 below. The carbon capture solution supply 111 has a primary distribution head in the air contactor 12A and interstitial distribution heads in the air contactors 12B, 12C, 12D that provide a lower flowrate than the primary distribution head. The interstitial distribution heads operate to provide make-up carbon capture solution to compensate for leaks or drift loss or operate to provide fresh carbon capture solution along the flow of carbon capture solution through the stack 110. In another embodiment, the carbon capture solution supply 111 only provides carbon capture solution to the air contactor 12A and the carbon capture solution trickles down from air contactor to air contactor.

The air contactor stack 111 has a basin 116 that collects the carbon capture solution 24 after the carbon capture solution 24 has traveled in direction 118 through the air contactors 12A-12D. The air contactor stack 110 has a carbon capture solution return 119 that provides the $CO_2$-rich carbonate solution 28 to the pellet reactor 26. In one embodiment, the air contactor stack 111 has multiple basins 116 and multiple carbon capture solution returns 119 such as a basin 116 and a carbon capture solution return 119 for each air contactor 12A-12D.

Figure 6:
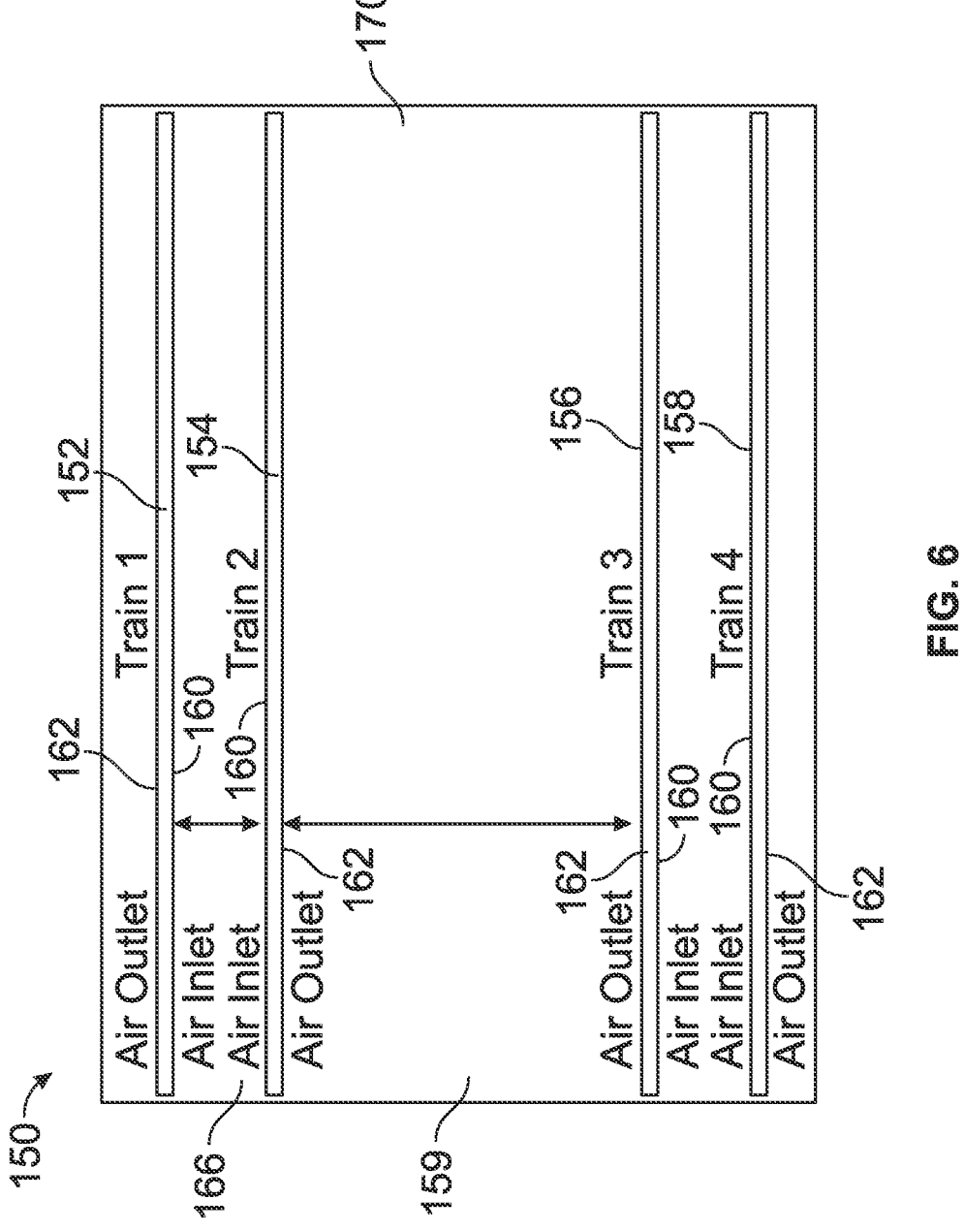
FIG. 6 is a plan view of a carbon capture facility having air contactor trains oriented to inhibit the exhaust air of one air contactor train entering another air contactor train.

With reference to FIG. 6, a plan view is provided of an example air contactor facility 150. The air contactor facility 150 has air contactor trains 152, 154, 156, 158 that are similar to the air contactor train 10 discussed above. The air contactor trains 152, 154, 156, 158 each have an air inlet 160 and air outlet 162 thereof oriented to limit the air inlet of one of the air contactor trains 152, 154, 156, 158 receiving air from the air outlet 162 of the nearby air contactor train 152, 154, 156, 158. To this end, the air contactor facility 150 has intermediate spacings 166 between the air inlets 160 of nearby air contactor trains 152, 154, 156, 158. Air may travel downward (into the page in FIG. 6) and travel generally horizontally along the ground 159 into the air inlets 160. The spacings 166 may be, for example, 160 feet. The air contactor facility 150 has a central spacing 170 between the air outlets 162 of air contactor trains 154, 156. The central spacing 170 is between the air outlets 162 and is, for example, 640 feet, which is larger than the intermediate spacings 166. The larger central spacing 170 keeps the air outlets 162 away from the air inlets 160 of the air contactor trains 154, 156. Keeping the air from the air outlets 162 away from the air inlets 160, ensures $CO_2$-rich air is being drawn into the air inlets 160 and improves the efficiency of the carbon capture process.

Figure 7:
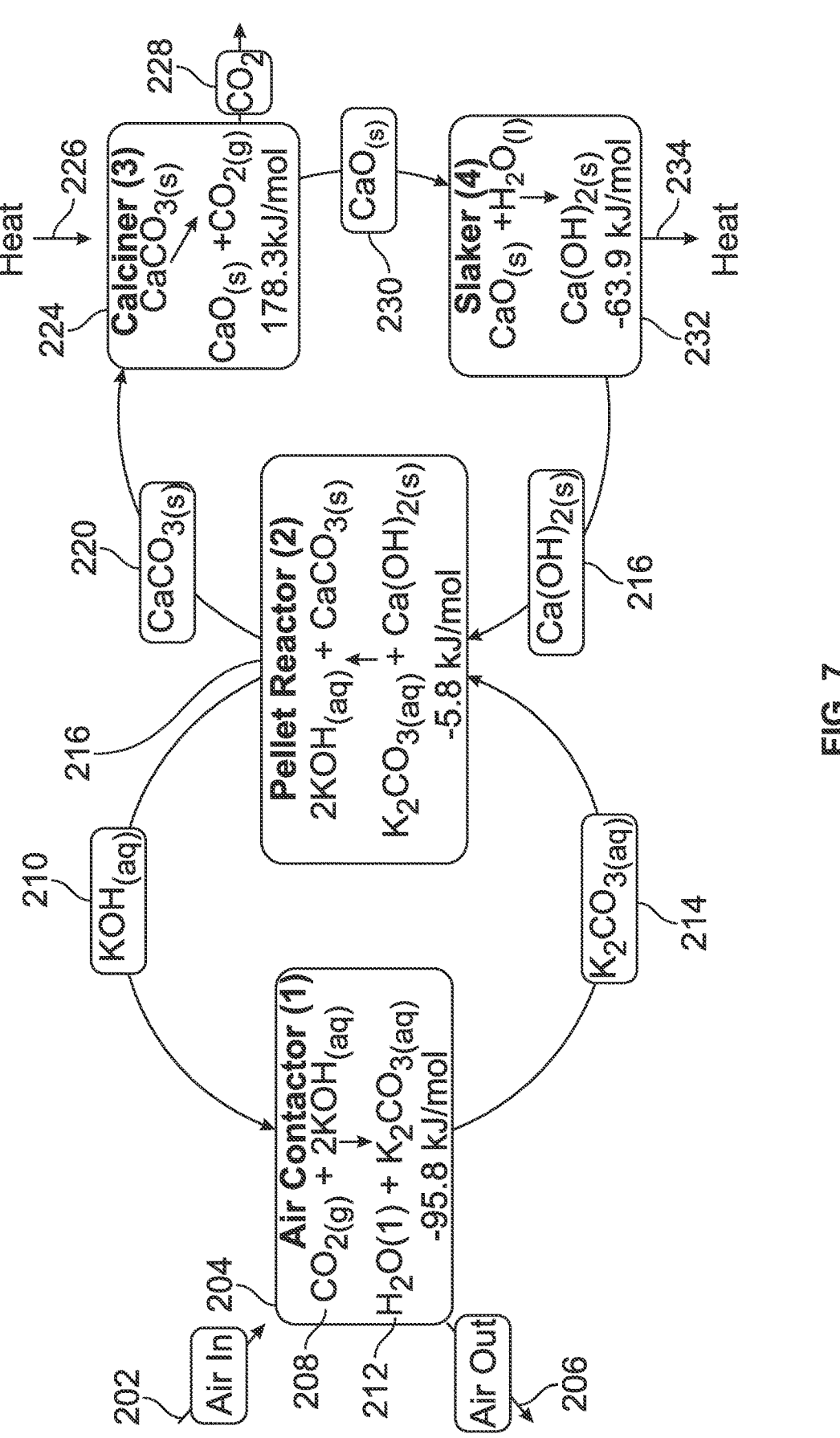
FIG. 7 is a flow diagram of a method of liquid solvent-based carbon capture.

With reference to FIG. 7, a liquid solution-based carbon capture method 200 is provided that includes air 202 containing $CO_2$ entering an air contactor 204 such as the air contactor 12 discussed above. The air contactor 204 discharges air 206 having a reduced $CO_2$ content than the air 202. In the air contactor 204, $CO_2$ 208 in the air contacts a carbon capture solution 210, such as KOH, that is being distributed onto support such as fill or a liquid-absorbent pad. The $CO_2$ in the air reacts with the carbon capture solution 210 to form water 212 and a carbonate solution 214 that is then removed from the air contactor 204. Part of the water 212 and the water in the carbonate solution 214 may be lost to evaporation. In one approach the carbonate solution 214 is a molar solution, i.e., the carbonate solution 214 has one gram of $K_2CO3$ dissolved in water to make one liter of carbonate solution 214. The carbonate solution 214 is provided to a pellet reactor 216, such as the pellet reactor 26 discussed above.

In the pellet reactor 30, the carbonate solution 214 reacts with $CA(OH)_2$ 216 provided as pellets to the pellet reactor 216. The chemical reaction in the pellet reactor 216 produces the carbon capture solution 210 and $CaCO_3$ 220. The $CaCO_3$ is provided to a calciner 224 that receives heat 226 from, for example, a geothermal heat source or burning a fuel such as natural gas. The calciner 226 produces $CO_2$ as a gas that is captured 228 and quicklime or CaO 230 as a solid. The $CO_2$ gas captured at operation 228 is directed to a compressor to compress the $CO_2$ and liquify the $CO_2$ for storage and transport.

The CaO 230 is provided to a slaker 232 which combines the CaO 230 with water to form hydrated lime $CA(OH)_2$ as a solid. The chemical reaction of the slaker 232 is exothermic and releases heat 234 that may be captured. The captured heat 234 may be used to reduce the heat required at operation 226 or be used for another industrial process. Although the method 200 discussed uses a KOH carbon capture solution, other solutions may be used as appropriate for a particular application.

Figures 8, 9:
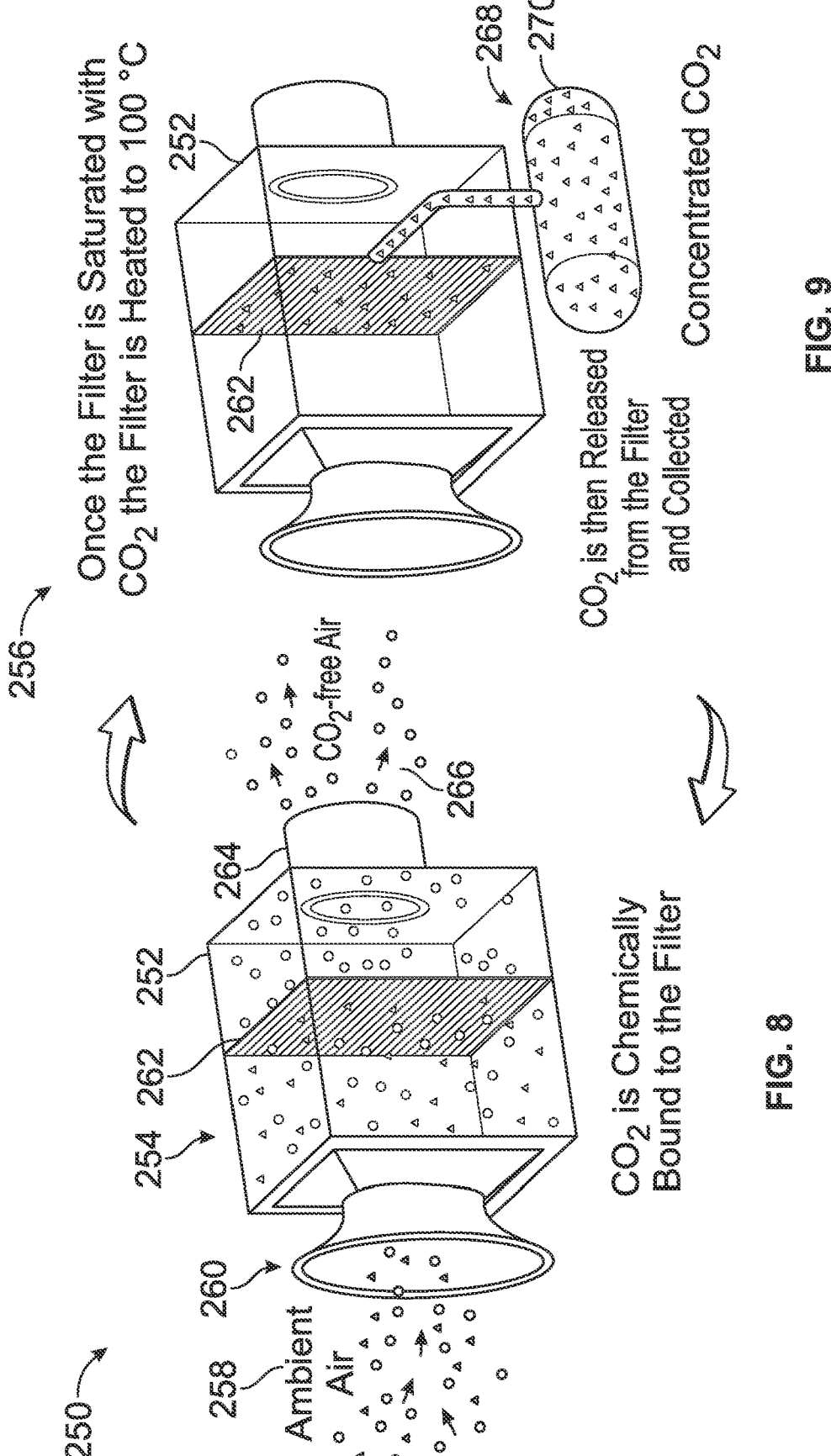
FIGS. 8 and 9 are schematic views of a solid sorbent-based air contactor.

With reference to FIGS. 8-9, in another embodiment one or more of the air contactors 12 utilize a solid sorbent-based $CO_2$ capture method 250. For example, an air contactor 252 has a first mode 254 and a second mode 256. In the first mode 254, the ambient air 258 is drawn into an air inlet 260 such as by a fan of the air contactor 252 and travels through a carbon capture medium such as a mass exchanger. The mass exchanger operates using adsorption or absorption to remove a pollutant such as $CO_2$ from the air. In one embodiment, the mass exchanger includes a filter 262. The air travels through the filter 262 and outward from the air contactor 252 via an air outlet 264.

The $CO_2$ in the ambient air attaches to the filter 262 such that discharged air 266 has a reduced $CO_2$ content. Once the filter 262 has been saturated, the air contactor 252 is reconfigured to the second mode 256 wherein the air contactor 252 heats the filter 262 to a temperature of, for example, 100° C. The air contactor 252 has a $CO_2$ capture system 268 to remove the captured $CO_2$ from the filter 262. For example, the $CO_2$ capture system 268 may include a vacuum and a container 270 to collect the $CO_2$ released from the filter 262.

Figure 11:
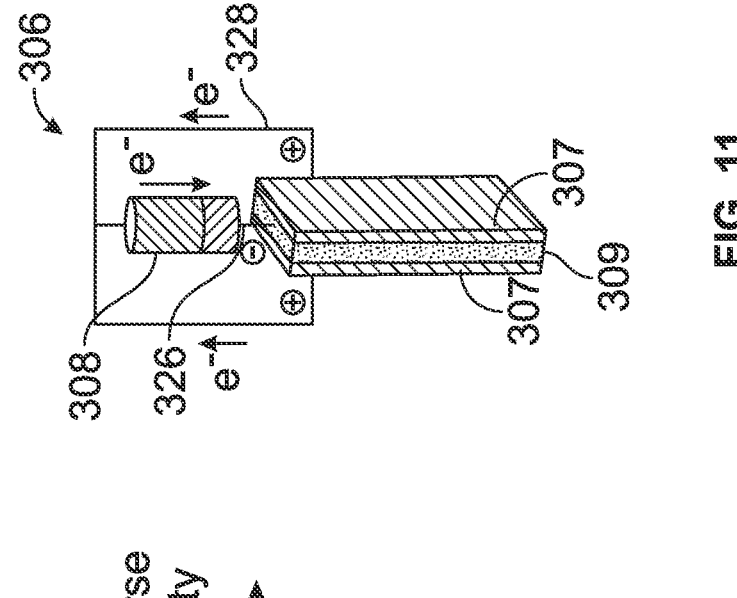
FIGS. 10 and 11 are schematic views of an electrochemical carbon capture system.
Figure 10:
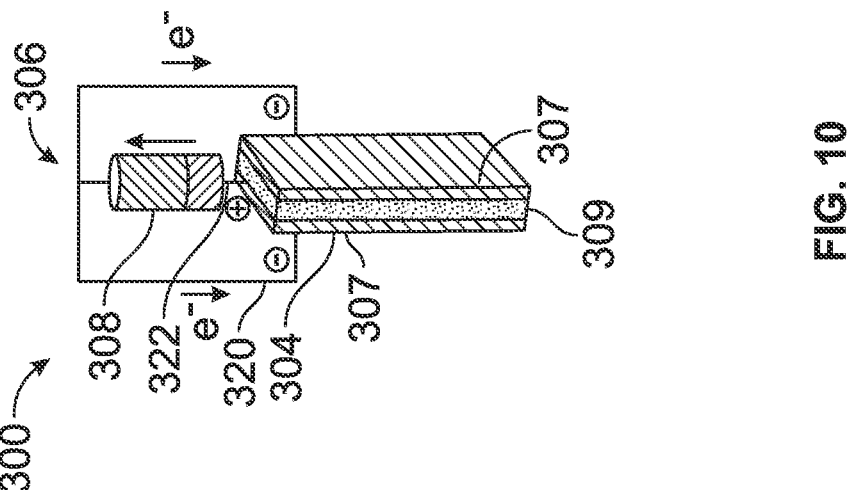
Figure 12:
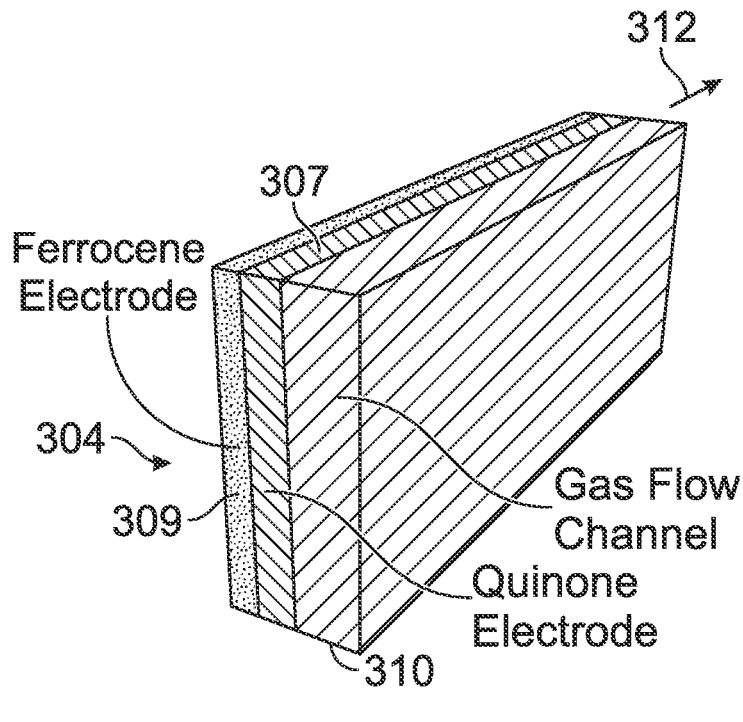
FIG. 12 is a perspective view of a portion of an electrochemical cell of the electrochemical carbon capture system of FIGS. 10 and 11.

With reference to FIGS. 10-12, in another embodiment one or more of the air contactors 12 utilize an electrochemical $CO_2$ capture method 300 of FIGS. 10 and 11. The method 300 includes utilizing a carbon capture system 302 including a carbon capture medium, such as an electrochemical cell assembly 304, and a control system 306 having a power source 308. The electrochemical cell assembly 304 includes an inner electrode 309 and outer electrodes 307. The outer electrodes 307 are coated with poly-1,4-anthraquinone composite and are operable to capture $CO_2$ via a carboxylation of quinone. The inner electrode 304 contains polyvinylferrocene and operates as an electron source or sink for quinone reduction and quinone oxidation. The inner electrode 304 is the driving force for the outer electrodes 307 to collect or release $CO_2$ from/into the airstream.

Depending on the polarity of the power source 308 applied to the electrochemical cell assembly 304, air traveling in direction 312 through the air flow channel 310 will either lose $CO_2$ to the outer electrodes 307 or gain $CO_2$ from the electrodes 307.

For example and with reference to FIG. 10, the control system 306 has a carbon capture configuration wherein a negative polarity 320 is applied to the outer electrodes 307 and a positive polarity 322 is applied to the inner electrode 308. Conversely, the control system 306 is shown in a $CO_2$ discharging configuration in FIG. 11 wherein the power source 308 applies a negative polarity 326 to the inner electrode 309 and a positive polarity 328 to the outer electrodes 307. The control system 306 is reconfigured from the carbon capture configuration of FIG. 10 to the carbon discharging configuration of FIG. 11 once the electrochemical cell assembly 304 has become saturated with $CO_2$. The carbon capture system 302 may be used in a batch process approach wherein air is provided to a sealed chamber containing the electrochemical cell assembly 304, the control system 306 is operated in the carbon capture configuration to capture $CO_2$, the $CO_2$-free air is released, the control system 306 is switched to the $CO_2$ discharging configuration, and a carrier gas is injected into the sealed chamber to flush the $CO_2$ from the chamber.

In another approach, the carbon capture system 302 may be used in a flow process wherein air flows over the electrochemical cell assembly 304 until the outer electrodes 307 are full of $CO_2$. The airflow over the outer electrodes 307 is stopped, then a carrier gas is directed over the outer electrodes 307 while the control system 306 is in the carbon discharge configuration to remove the $CO_2$ from the outer electrodes 307.

Figure 13:
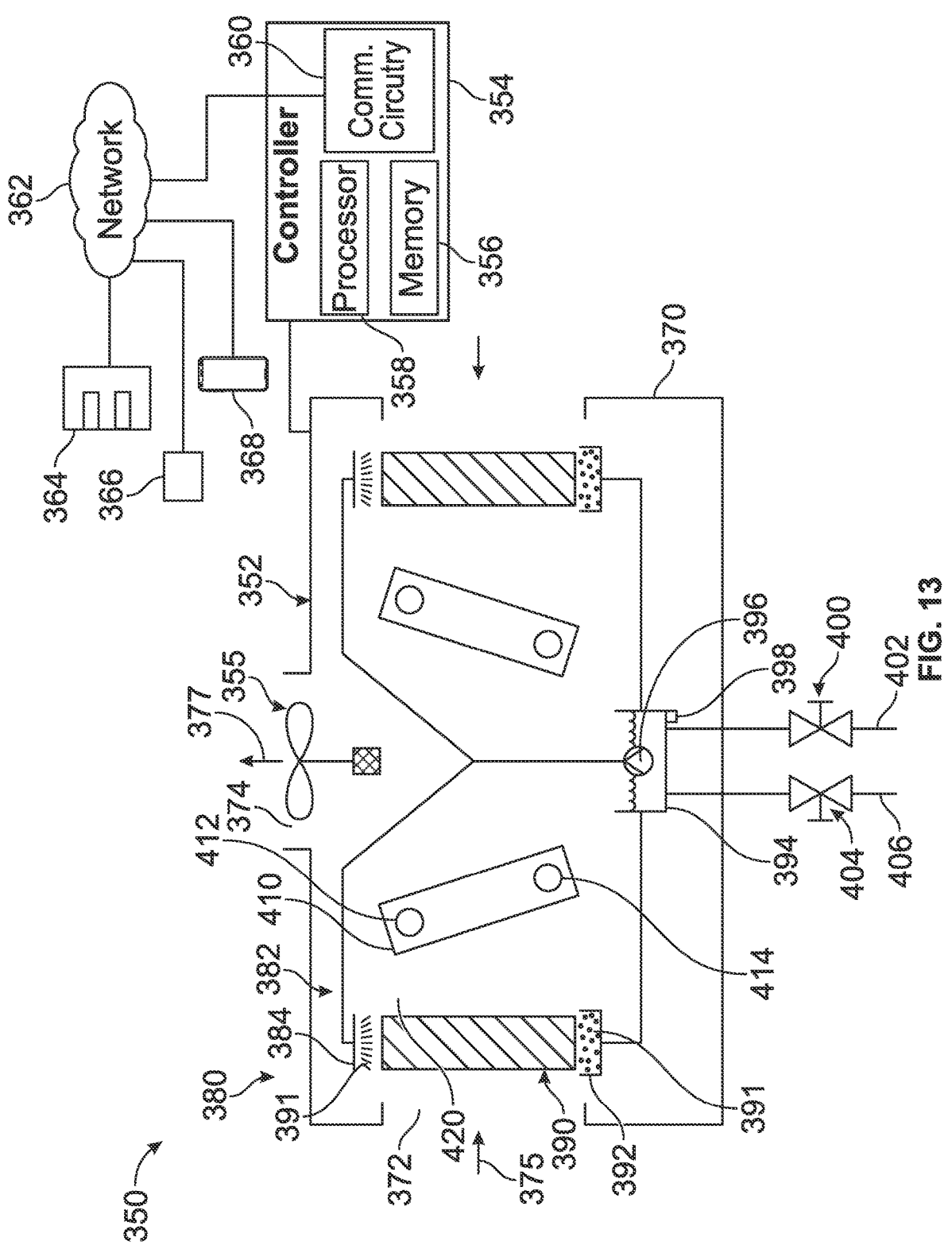
FIG. 13 is a schematic view of an air contactor having a carbon capture medium upstream of indirect heat exchangers.

With respect to FIG. 13, an air contactor system 350 is provided including an air contactor 352 that is similar in many respects to the air contactor 12 discussed above. The air contactor system 350 includes a controller 354 integrated with, or operatively connected to, the air contactor 352. The controller includes a memory 356 for storing non-transitory instructions for operating the air contactor 352, such as logic, programs, etc. The controller 354 includes a processor 358 operatively connected to the memory 356 and communication circuitry 360. The processor 358 may include, for example, a microprocessor, a gate array, a system-on-a-chip, and/or an application-specific integrated circuit, as some examples. The communication circuitry 360 is configured to communicate via one or more remote devices via a network 362. The one or more remote devices may include, for example, an HVAC system controller 366, a server computer 364, and/or one or more portable electronic devices such as a smartphone 368. The communication circuitry 360 may receive a carbon capture request from a remote device for the air contactor system 350 to operate a $CO_2$ capture system 380 of the air contactor 352.

The air contactor 352 will be described as being configured to remove $CO_2$ from the air, although the air contactor 352 may be configured to remove additional or alternative pollutants from the air using an appropriate a capture medium. The capture medium may include, for example, a carbon capture solution distributed onto fill sheets, blocks of fill, and/or pads. Alternative capture mediums may be used, such as a liquid solvent-based air pollutant capture system that utilizes a spray of fine capture solution droplets that the air is directed through. Other capture mediums may be utilized, such as a solid sorbent- or electrochemical-based air pollutant capture system.

With reference to FIG. 13, the air contactor 352 has an outer structure or housing 370, air inlets 372, and an air outlet 374. $CO_2$-rich air enters the air inlets 372 in direction 375 and $CO_2$-depleted air exits the air outlet 374 in direction 377. The air contactor 352 has a fan assembly 355 for generating airflow between the air inlets 372 and the air outlet 374. The fan assembly 355 includes a motor having a drive shaft and fan blades mounted to the drive shaft.

To remove the $CO_2$ from the air, the air contactor 352 has the $CO_2$ capture system 380 that includes a carbon capture solution distribution system 382 having one or more outlets such as spray nozzles 384 for distributing carbon capture solution 391 onto capture medium 390. In one embodiment, the capture medium 390 are fill sheets such as rubber or plastic sheets.

$CO_2$-rich air travels in direction 375 from the air inlets 372 into contact with the carbon capture solution on the surfaces of the capture medium 390. The carbon capture solution chemically reacts with the $CO_2$ in the $CO_2$-rich air and entrains the $CO_2$ into the carbon capture solution traveling generally downward along the capture medium 390 due to the effect of gravity.

The $CO_2$ capture system 380 includes troughs 392 that collect carbon capture solution 391 from the capture medium 390, a sump 394, and a pump 396 to recirculate the carbon capture solution 391 back to the spray nozzles 384. The sump 394 may be open or enclosed. In one embodiment, the $CO_2$ capture system 380 may normally operate as a closed loop within the air contactor 352, with the carbon capture solution 391 traveling from the sump 394, to the capture medium 390, and back to the sump 394. The concentration of $CO_2$ in the carbon capture solution 391 increases over time as the carbon capture solution 391 continues to entrain $CO_2$ from the air. In another embodiment the $CO_2$ capture system 380 discharges the $CO_2$ rich carbon capture solution 391 from the air contactor 352 for processing.

In one embodiment, the air contactor 352 has a sensor 398 to detect a variable, such as pH, indicative of the concentration of carbon in the carbon capture solution 391. Upon the parameter satisfying a concentration condition, such as exceeding a threshold concentration parameter, the controller 354 may open a valve 400 to direct the now $CO_2$-rich carbon capture solution 391 or carbonate from the sump 394 to a drain 402. The drain 402 directs the $CO_2$-rich carbon capture solution 391 to a tank, such as a pellet reactor 26 discussed above. In another approach, the controller 354 may operate the valve 400 after a predetermined period of time, such as a few hours, days, or a time period based on the duration of operation of the air contactor 352. Once the sump 394 has been partially or completely drained, the controller 354 may operate a valve 404 to open a carbon capture solution supply 406 and provide fresh carbon capture solution 391 to the sump 394.

The air contactor 352 also includes a heat exchanger, such as an indirect heat exchanger 410. The indirect heat exchanger 410 has an inlet 412 for receiving a fluid, such as a process fluid or a refrigerant, and an outlet 414. The flow of air across the external surfaces of the dry heat exchanger 410 indirectly cools the fluid within the indirect heat exchanger 410.

In one embodiment, the capture medium 390 provides adiabatic cooling to the air traveling across the capture medium 390 by way of evaporation of water in the carbon capture solution 391. The capture medium 390 may include a carbon capture solution 391 that permeates a liquid absorbent material while the liquid absorbent material permits air to travel through the material. For example, the capture medium 390 may include adiabatic cooling pads. The adiabatic cooling provided by the carbon capture solution 391 on the capture medium 390 reduces the dry bulb temperature of the air before the air reaches the indirect heat exchanger 410 which improves the efficiency of the heat exchange between the air and the indirect heat exchanger 410.

The air contactors 12, 352 and the other air contactors discussed herein are similar in many respects. The discussion of the following embodiments will focus on differences between the various embodiments, although the similarities in structure and operation between the embodiments will be apparent to the reader.

Figure 14:
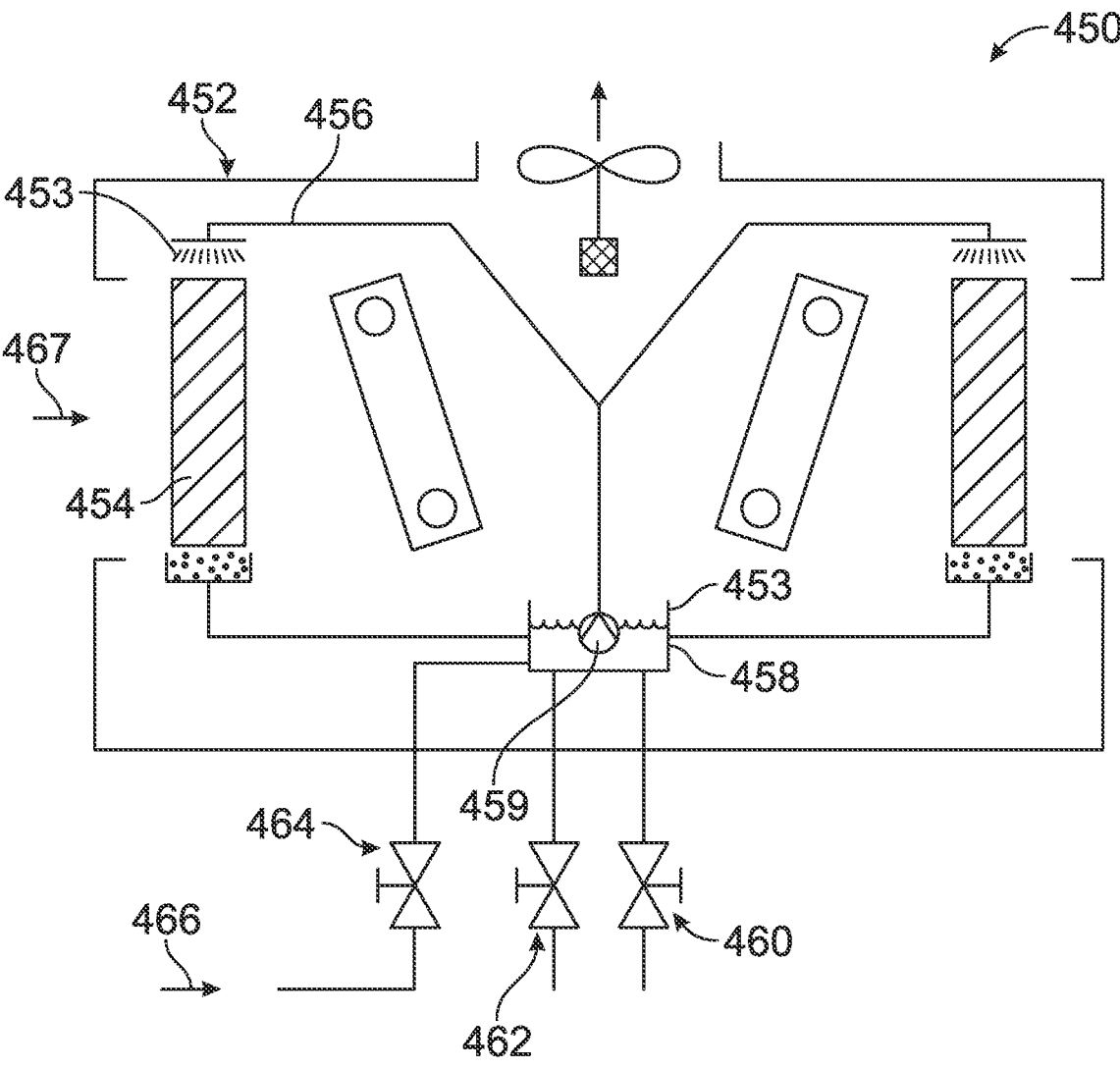
FIG. 14 is a schematic view of an air contactor having a water makeup supply to compensate for water that evaporates from the carbon capture solution.

With reference to FIG. 14, the air contactor 450 includes a $CO_2$ capture system 452 including a capture medium 454, a carbon capture solution distribution system 456, a sump 458, and a pump 459. The air contactor 450 has a drain valve 460 for draining carbon capture solution having a concentration above a predetermined threshold from the sump 458. The air contactor 450 further includes a carbon capture supply valve 462 for providing fresh carbon capture solution to the sump 458, and a water makeup valve 464 for providing makeup water 466 to the sump 458. The water makeup valve 464 may be opened to provide the makeup water 466 to the sump 458 to compensate for evaporation of water from the carbon capture solution 453. Water may evaporate from the carbon capture solution 453, for example, when the $CO_2$-rich air traveling in direction 467 into the air contactor 450 contacts the carbon capture solution 453 sprayed on the capture medium 454. In one embodiment, the carbon capture solution may be purged and replaced with water so that the air contactor 450 may operate in a water-only mode. The capture medium 454 may include adiabatic cooling pads and the air contactor 450 may operate as an adiabatic cooler or condenser in the water-only mode. The air contactor 450 may be operated in the water-only mode in predetermined situations, such as due to a heightened required cooling capacity, insufficient capacity in an associated $CO_2$ processing system to regenerate the carbon capture solution, and/or an associated $CO_2$ utilization process (e.g., producing fuel from the captured $CO_2$) not currently requesting $CO_2$.

Figure 15:
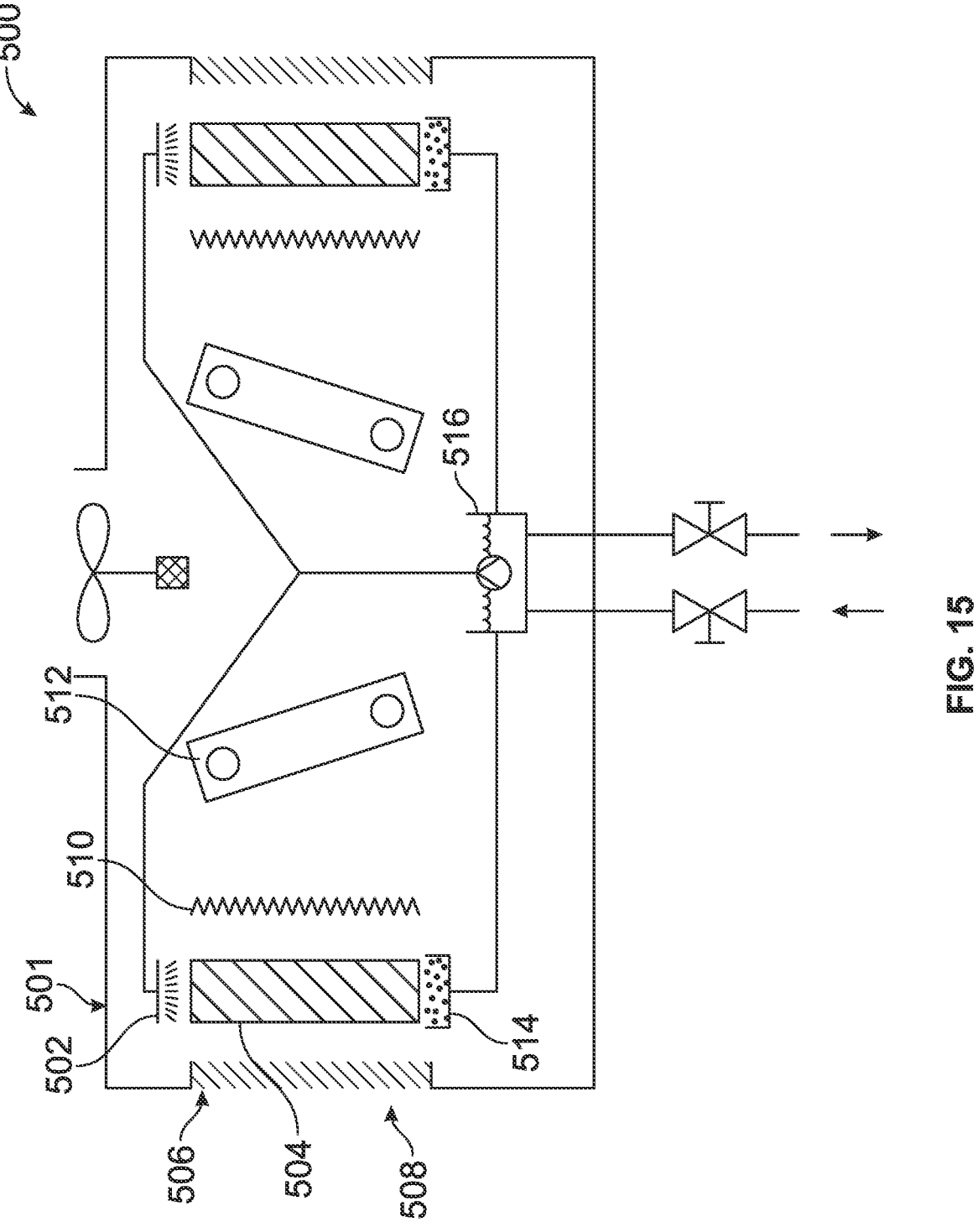
FIG. 15 is a schematic view of an air contactor having louvers, carbon capture media, drift eliminators, and indirect heat exchangers.

Regarding FIG. 15, an air contactor 500 is provided having a $CO_2$ capture system 500 that distributes a carbon capture solution 502 onto a carbon capture medium 504 of the $CO_2$ capture system 501. The carbon capture solution 502 may be corrosive to metals. The air contactor 500 has louvers 506 upstream at inlets 508 of the air contactor 500 and drift eliminators 510 downstream of the capture medium 504. The drift eliminators 510 inhibit carbon capture solution droplet carryover and splash out from the capture medium 504 to heat exchangers 512 of the air contactor 500. In one embodiment, the drift eliminators 510 are operably connected to troughs 514 of the $CO_2$ capture system 501 to direct collected carbon capture solution into the troughs 514 so that the solution may be directed to a sump 516 of the $CO_2$ capture system 500. In another embodiment, louvers may be utilized to direct $CO_2$ capture solution into a sump, such as fill sheets having louvers.

Figure 16:
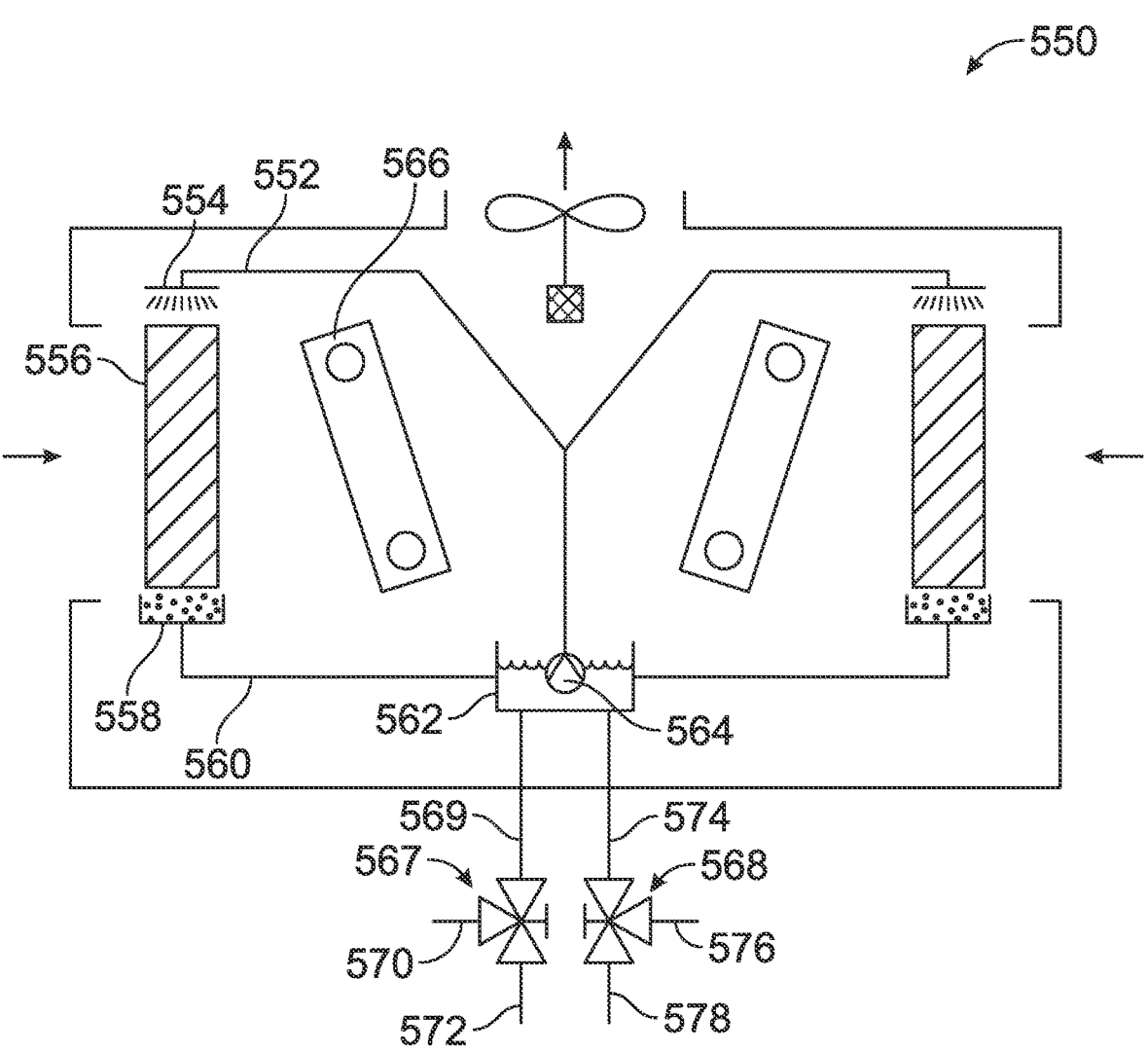
FIG. 16 is a schematic view of an air contactor having carbon capture media and three-way valves that permit the air contactor to utilize either carbon capture solution or water on the carbon capture media.

With reference to FIG. 16, an air contactor 550 is provided that is operable either as a carbon capture apparatus, or a fluid cooler with a pre-cooling option such as a condenser. More specifically, the air contactor 550 has a liquid distribution system 552 operable to distribute liquid 554 onto a capture medium 556. The liquid 554 may be an air pollutant capture solution or water depending on the operating mode of the air contactor 550.

In one embodiment, the capture medium 556 comprises a liquid absorbent material. The liquid 554 sprayed onto the capture medium 556 saturates the capture medium 556 and excess liquid collects in a trough 558 for traveling via a return tubing 560 to a sump 562. The sump 562 is shown in FIG. 16 having an open top, but in other embodiments the sump 562 may be enclosed.

In one embodiment, the capture medium 556 permits air to travel through the saturated capture medium 556 to cool the air. For example, the capture medium 556 may include a pad such as an adiabatic cooling pad. The pad may include, for example, cellulose fibers, and/or aspen fibers coated for biocontrol and fireproofing. Alternatively or additionally, the pad may include polymers (e.g., PVC), ceramics, and/or coated metals.

The air contactor 550 has a pump 564 to recirculate the liquid from a sump 562 back to the capture medium 556. The air contactor 550 has a heat exchanger, such as an indirect heat exchanger 566, that may be a dry heat exchanger. In another embodiment, the liquid distribution system 552 may be configured to distribute liquid onto the indirect heat exchanger 566 when the air contactor 550 is operated in a wet mode.

The air contactor 550 has one or more valves operable to direct either air pollutant capture solution (e.g., carbon capture solution) or water into the liquid distribution system 552. For example, the air contactor 550 may include a supply three-way valve 567 and a drain three-way valve 568. The supply three-way valve 567 is operable to connect a supply line 569 for the sump 562 to either a water supply 570 or a carbon capture solution supply 572. The drain three-way valve 568 is operable to connect a drain 574 from the sump 562 to either a water drain 576 or a $CO_2$-rich carbon capture solution drain 578.

The supply three-way valve 567 may be opened to the carbon capture solution supply 572 to fill the sump 562 in response to the air contactor 550 being in a carbon capture mode. Once the carbon capture mode has ended, or during a recharge operation, the drain three-way valve 568 may direct the $CO_2$-rich carbon capture solution from the sump 562 to the $CO_2$-rich carbon capture solution drain 578. If the carbon capture solution is being drained from the liquid distribution system 552 to recharge the system with fresh carbon capture solution, the supply three-way valve 567 is operated to direct carbon capture solution from the carbon capture solution supply 572 to the sump 562. In another embodiment, air contactor 550 is operated in a "once through" approach where the carbon capture solution is directed into the air contactor 550, distributed onto the capture medium 556, collected, and directed out of the air contactor 550 for $CO_2$ removal from the carbon capture solution. If the air contactor 550 is being reconfigured from the carbon capture mode to a wet heat exchange mode, the air contactors 550 operates the supply three-way valve 567 to direct water from the water supply 570 into the sump 574 after the sump 574 has been emptied of carbon capture solution. The liquid distribution system 552 thereafter distributes water onto the capture medium 556. The water traveling across the capture medium 556 may directly cool the air upstream of the indirect heat exchanger 566 which improves the efficiency of heat exchange between the air and the indirect heat exchanger 566. In one embodiment, the three-way valve 567 may be operated to provide water to replenish water that evaporates from the carbon capture solution. In another embodiment, the three-way valve 567 and the pump 564 may be operated to provide water for cleaning the capture medium 556.

The air contactor 550 may have a dry heat exchanger mode wherein the pump 564 is not operated to distribute liquid onto the capture medium 556. In the dry mode, the air contactor 550 utilize the flow of air over the indirect heat exchanger 566 to remove heat from the fluid in the indirect heat exchanger 566.

Figures 17A, 17B:
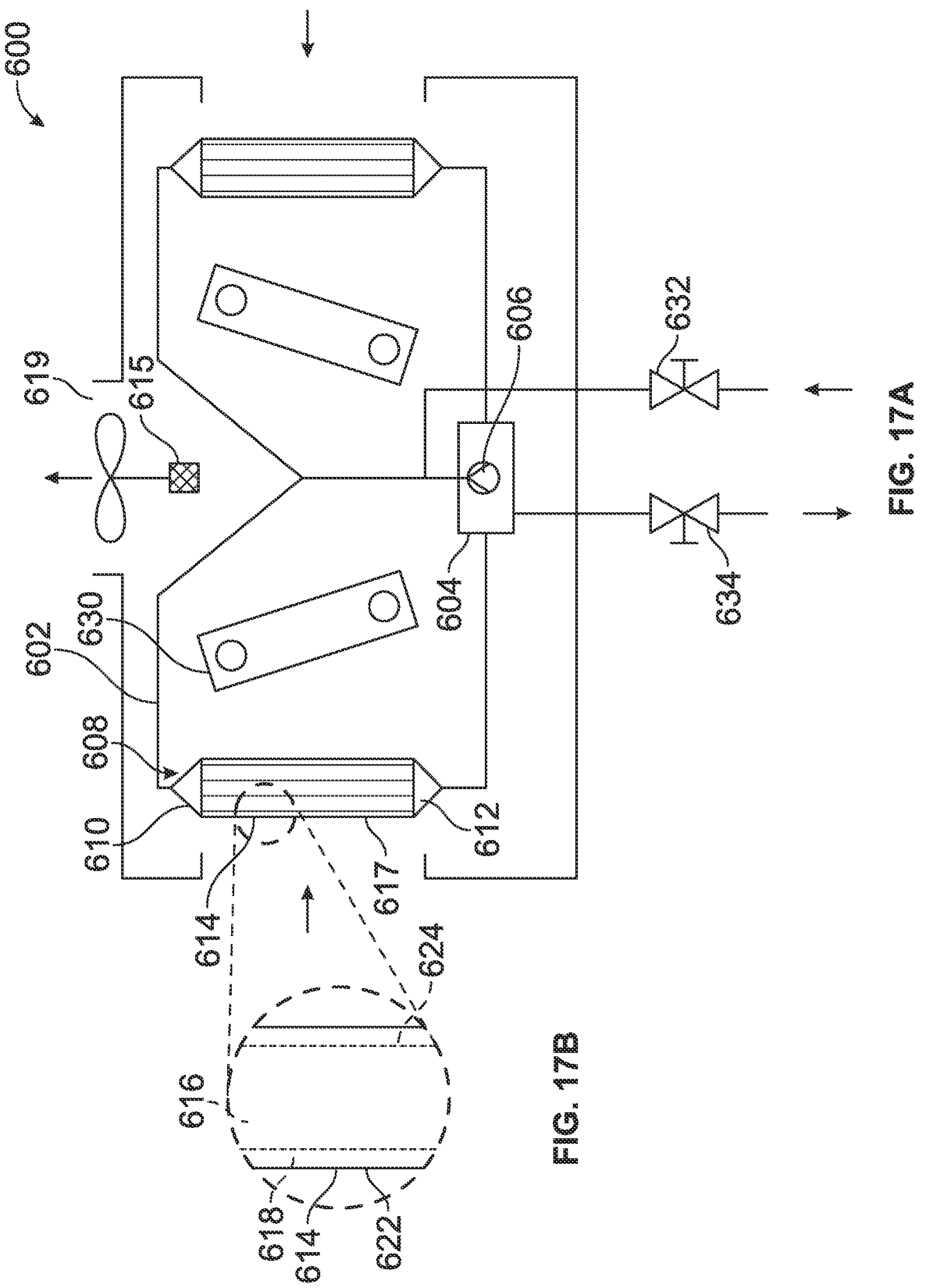
FIG. 17A is a schematic view of an air contactor having tubular membrane mass exchangers that receive carbon capture solution from an enclosed sump.
FIG. 17B is an enlarged view of one of the tubular membranes shown in the dashed circle in FIG. 17A.

Regarding FIGS. 17A and 17B, an air contactor 600 is provided having a contained carbon capture solution, eliminating the risk of splash out and droplet carryover from the carbon capture medium and reducing water loss in some embodiments. More specifically, the air contactor 600 has a liquid distribution system 602 that directs an air pollutant capture solution, such as carbon capture solution, from an enclosed sump 604 via pump 606 to a membrane assembly such as tubular membrane assembly 608. The tubular membrane heat assembly 608 includes an inlet header 610, an outlet header 612, and tubular membranes 614 having cannulas or interiors 616 to direct the carbon capture solution from the inlet header 610 to the outlet header 612. In other embodiments, different membranes may be used such as flat sheets.

With reference to FIG. 17B, the tubular membranes 614 each include an interior 616 and a side wall 618 extending thereabout. The side wall 618 is made of one or more materials configured to be highly selective to the air pollutant to be captured. In one embodiment, the air pollutant to be captured is $CO_2$ and the tubular membranes 614 have a high permeance to $CO_2$ for a given surface area and concentration gradient.

The air contactor 600 has a fan assembly 615 operable to generate airflow from an air inlet 617 of the air contactor 600, through the tubular membrane assembly 608, through the indirect heat exchanger 630, and to an air outlet 619 of the air contactor 600. The flows across the outer surfaces 622 of the tubular membranes 610 as the air flows through the tubular membrane assembly 608. The $CO_2$ in the air permeates through the side wall 618 from the outer surface 622 to an inner surface 624 of the tubular membranes 610. Once the $CO_2$ reaches the interior 616 of the tubular membranes 610, the $CO_2$ is absorbed into the carbon capture solution flowing in the interior 616. The $CO_2$ in the air is thereby captured by the solution in the interior 616 of the tubular membranes 614.

The air contactor 600 has a heat exchanger 630 that may be, for example, an indirect heat exchanger. The air contactor 600 includes a carbon capture solution supply valve 632 and a $CO_2$-rich carbon capture solution drain valve 634.

In one embodiment, the air contactor 600 has a wet precooling mode wherein water is provided to the tubular membranes 614 instead of carbon capture solution. The material of the tubular membranes 614 may be selected to be permeable to $CO_2$ and water vapor such that water may be used in the tubular membranes 608 to precool air for reaching the heat exchanger 630 instead of the tubular membrane assembly 608 capturing $CO_2$ from the air. The water vapor emitted from the tubular membrane 614 may cool the air upstream of the heat exchanger 630 and approve the efficiency of the heat exchange between the air and the heat exchanger 630.

In another embodiment, the air contactor 600 has a vacuum in the interior 616 rather than a carbon capture solution. The pump 606 may be a vacuum pump that collects the $CO_2$ which permeates through the side wall 618 of the tubular membranes 610. The sump 604 may be replaced with a storage unit for storing the captured $CO_2$ until the $CO_2$ is removed from the storage unit.

In yet another embodiment, the air contactor 600 may be provided with a solid sorbent and a membrane (e.g., a sheet) associated with the solid sorbent to selectively limit which components of the air may contact the solid sorbent. For example, the air contactor 600 may have a membrane that is water-impermeable and $CO_2$-permeable to prevent water vapor in the air from contacting the solid sorbent while permitting $CO_2$ in the air to be absorbed or adsorbed by the solid sorbent. In this manner, a membrane may be used to improve the efficiency of a solid sorbent.

Figure 18:
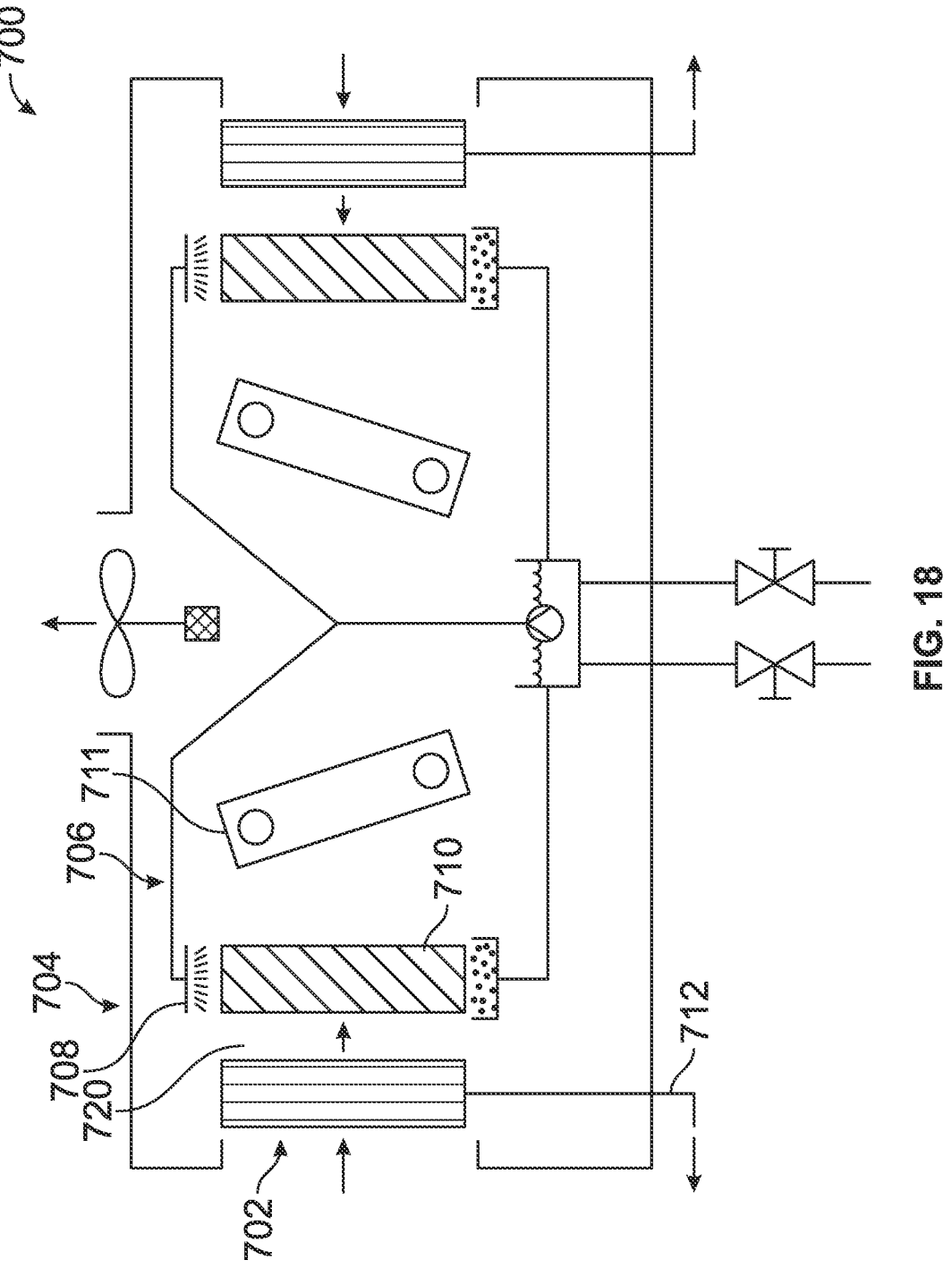
FIG. 18 is a schematic view of an air contactor having dehumidifiers upstream of carbon capture media and indirect heat exchangers.

With reference to FIG. 18, an air contactor 700 is provided that has a dehumidifier 702 upstream of an air pollutant capture system 704. The air pollutant capture system 704 includes a liquid distribution system 706 that distributes a liquid, such as a carbon capture solution 708, onto a capture medium 710. The air contactor 700 further includes a heat exchanger 711 downstream of the capture medium 710. The dehumidifier 702 collects water 712 that may be used as a water makeup to compensate for water that evaporates from the carbon capture solution 708 during operation of the air contactor 700. The use of the collected water 712 may reduce the fresh water needed to regenerate the carbon capture solution.

The dehumidifier 702 may include, for example, a vacuum driven membrane heat exchanger and/or a mass exchanger. Other examples of the dehumidifier 702 include a liquid desiccant driven membrane heat exchanger and a mass exchanger. Further examples include a fin-tube heat exchanger coated with desiccant material, a desiccant wheel, and/or a sub-dew point cooling heat exchanger. Dehumidification of the air upstream of the capture medium 710 improves the efficiency of the capture system 704 for some embodiments. For example, removing humidity may increase the efficiency of solid sorbents such as zeolites. Dehumidifying the air decreases the water the zeolite media captures from the air, which increases the capacity of the zeolite media to store $CO_2$. The dehumidifier also provides water in situ at the air contactor 700 that may be used as makeup water or a fresh water source for another process. In another embodiment, the pollutant capture medium benefits from having higher humidity such that the dehumidifier 702 may be omitted.

The air contactor 700 may have a wet precooler mode wherein the air pollutant capture system 704 recirculates water instead of carbon capture solution. The air pollutant capture system 704 sprays the water onto the capture medium 710, which cools the air before the air reaches the heat exchanger 711 and improves the efficiency of the heat exchanger 711. The dehumidifier 702 removes moisture from the air which reduces the wet bulb temperature of the air. The decrease in wet bulb temperature increases the amount of adiabatic pre-cooling achievable by the water-moistened capture medium 710 (which may be one or more pads). The water-moistened capture medium 710 may then decrease the dry bulb temperature of the air flowing across the capture medium 710. In another embodiment, dry or sensible cooling may be used instead of the adiabatic cooling provided by the capture medium 710. The sensible cooling may be provided using a refrigerant such as chilled water or glycol from a chiller. The sensible cooling may be provided by an evaporator of a refrigeration system.

If the capture medium 710 includes adiabatic pads and the air contactor 700 is operating in a water-only or wet pre-cooler mode, the dehumidification of the air upstream of the capture medium 710 improves the efficiency of the adiabatic heat exchange at the adiabatic pads. Further, if the air contactor 700 is operating in water-only mode and the adiabatic pads of the capture medium 710 are lowering the dry bulb temperature, the efficiency of the heat exchanger 711 is increased due to the dehumidification of the air upstream of the capture medium 710.

Figure 19:
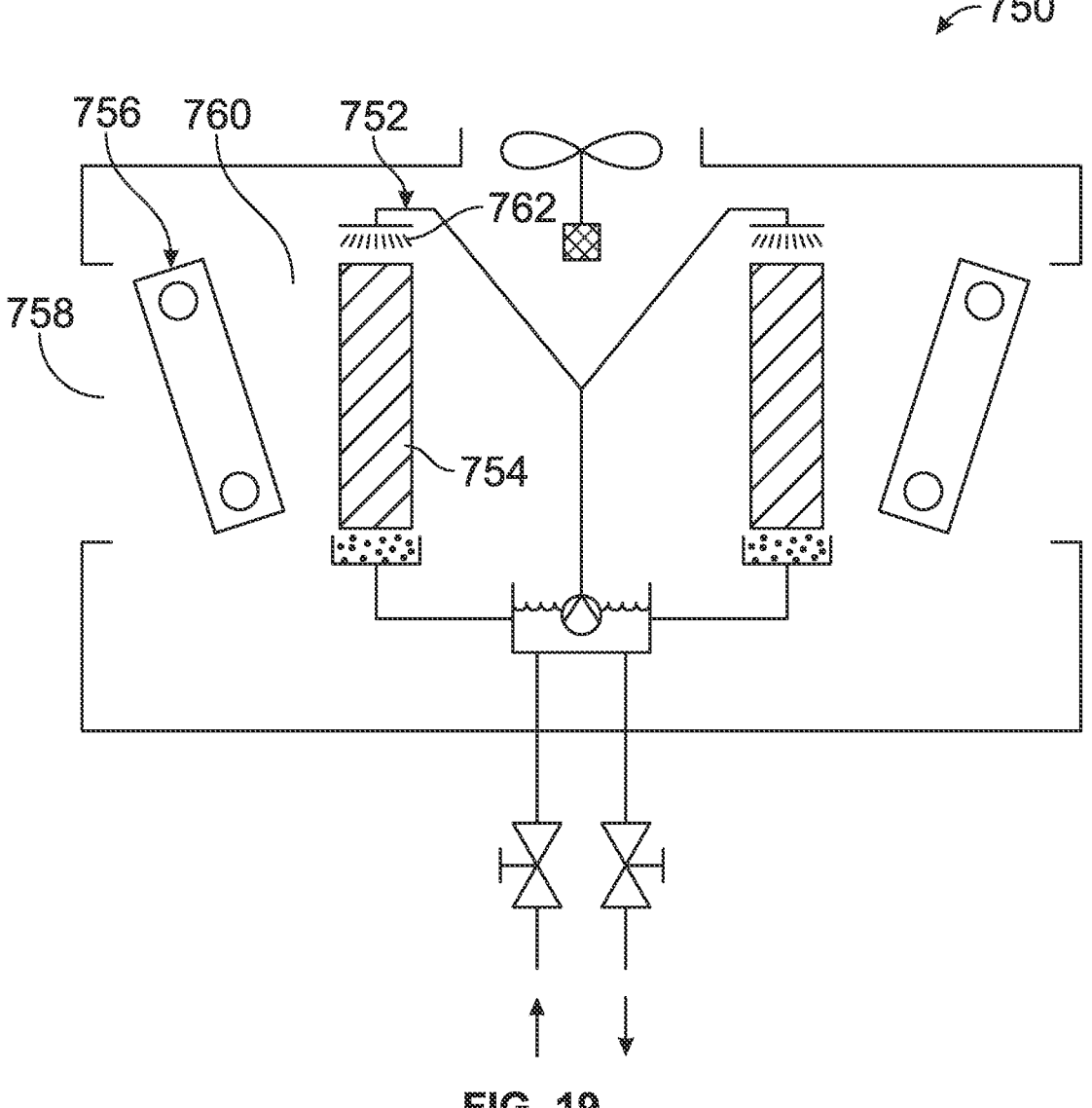
FIG. 19 is a schematic view of an air contactor having indirect heat exchangers upstream of carbon capture media.

With reference to FIG. 19, an air contactor 750 is provided that is similar in many respects to the air contactor 750. The air contactor 750 has a carbon capture solution distribution system 752 with a support such as a pad 754 downstream of a heat exchanger 756. The heat exchanger 756 may include a dry heat exchanger and/or a wet indirect heat exchanger.

The heat exchanger 756 receives air from an inlet 758 of the air contactor 750, heats the air, and discharges heat 760 to capture medium 754. Because the carbon capture solution distribution system 752 distributes carbon capture solution 762 onto the pad 754 downstream of the heat exchanger 756, the risk of drift of carbon capture solution from the carbon capture medium 754 onto the heat exchanger 756 is reduced. Further, the heat exchanger 756 heats the air before it reaches the pad 754 which may improve the efficiency of some types of carbon capture solution 762. For example, some sorbents are known to be more effective at higher temperatures. The pre-heating of the hear by the heat exchanger 756 reduces the relative humidity of the air which may be beneficial for some types of carbon capture solution 762.

In another embodiment, the heat exchanger 756 includes a direct heat exchanger such as a system that distributes process fluid onto fill sheets. The direct heat exchanger may increase the humidity of the air upstream of the pad 754 which may improve the efficiency of some types of carbon capture solution 762. Utilizing the evaporating water in the process fluid of the direct heat exchanger to humidify the air upstream of the pad 754 may facilitate a water-neutral carbon capture process.

Figure 20:
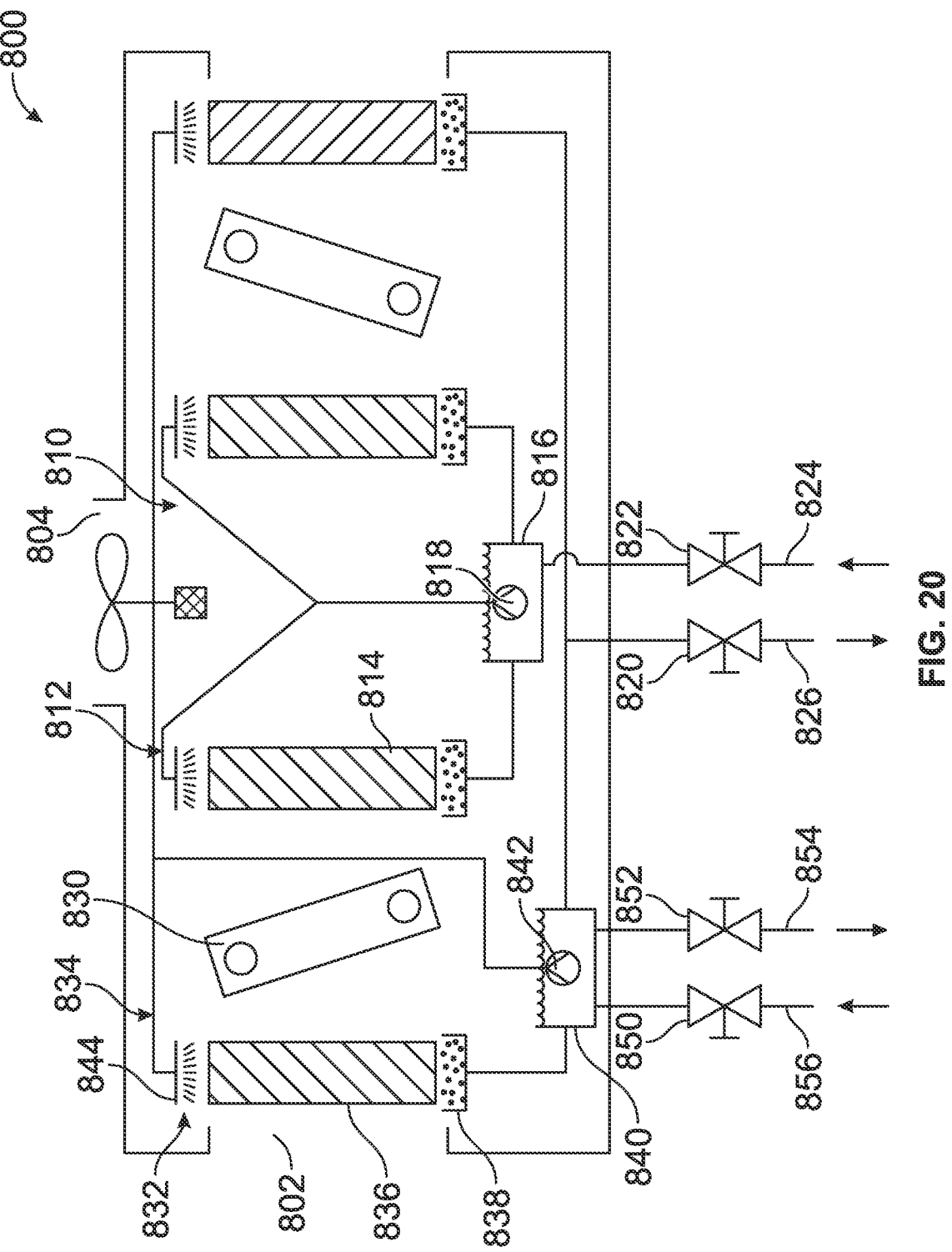
FIG. 20 is a schematic view of an air contactor having adiabatic cooling pads, indirect heat exchangers, and carbon capture media.

With reference to FIG. 20, an air contactor 800 is provided that may simultaneously use water to precool air entering an air inlet 802 and carbon capture solution to remove $CO_2$ from air within the air contactor 800 before the air exits an air outlet 804. More specifically, the air contactor 800 includes a carbon capture system 810 having a carbon capture solution distribution system 812, a carbon capture medium 814, a carbon capture solution sump 816, and a pump 818. The air contactor 800 has valves 820, 822 for selectively permitting carbon capture solution to enter the sump 816 from a carbon capture solution source 824 or to exit the sump 816 to a $CO_2$-rich carbon capture solution drain 826.

The air contactor 800 has an indirect heat exchanger 830 upstream of the carbon capture medium 814 and a precooler 832 upstream of the dry heat exchanger 830. The precooler 832 includes a water distribution system 834 that distributes water onto a liquid absorbent material 836. The liquid absorbent material 836 is configured to become saturated with water while permitting air to flow through the liquid absorbent material 836. The air traveling through the liquid absorbent material 836 becomes cooler and more humid before reaching the indirect heat exchanger 830 which improves the efficiency of operation of the indirect heat exchanger 830. In another embodiment the precooler 832 is a membrane heat exchanger, a dry heat exchanger with an internal fluid that is cooler than the air, and/or a liquid desiccant dehumidifier.

The water distribution system 834 further includes a trough 838 to collect water from the liquid absorbent material 836 and direct the water to a water sump 840. Further, a pump 842 is operable to recirculate the water from the sump 840 to outlets such as spray nozzles 844 of the water distribution system 834. The air contactor 800 further includes valves 850, 852 selectively operable to remove water from the sump 842 to a drain 854 and provide water to the sump 840 from a water source 856.

Figure 21:
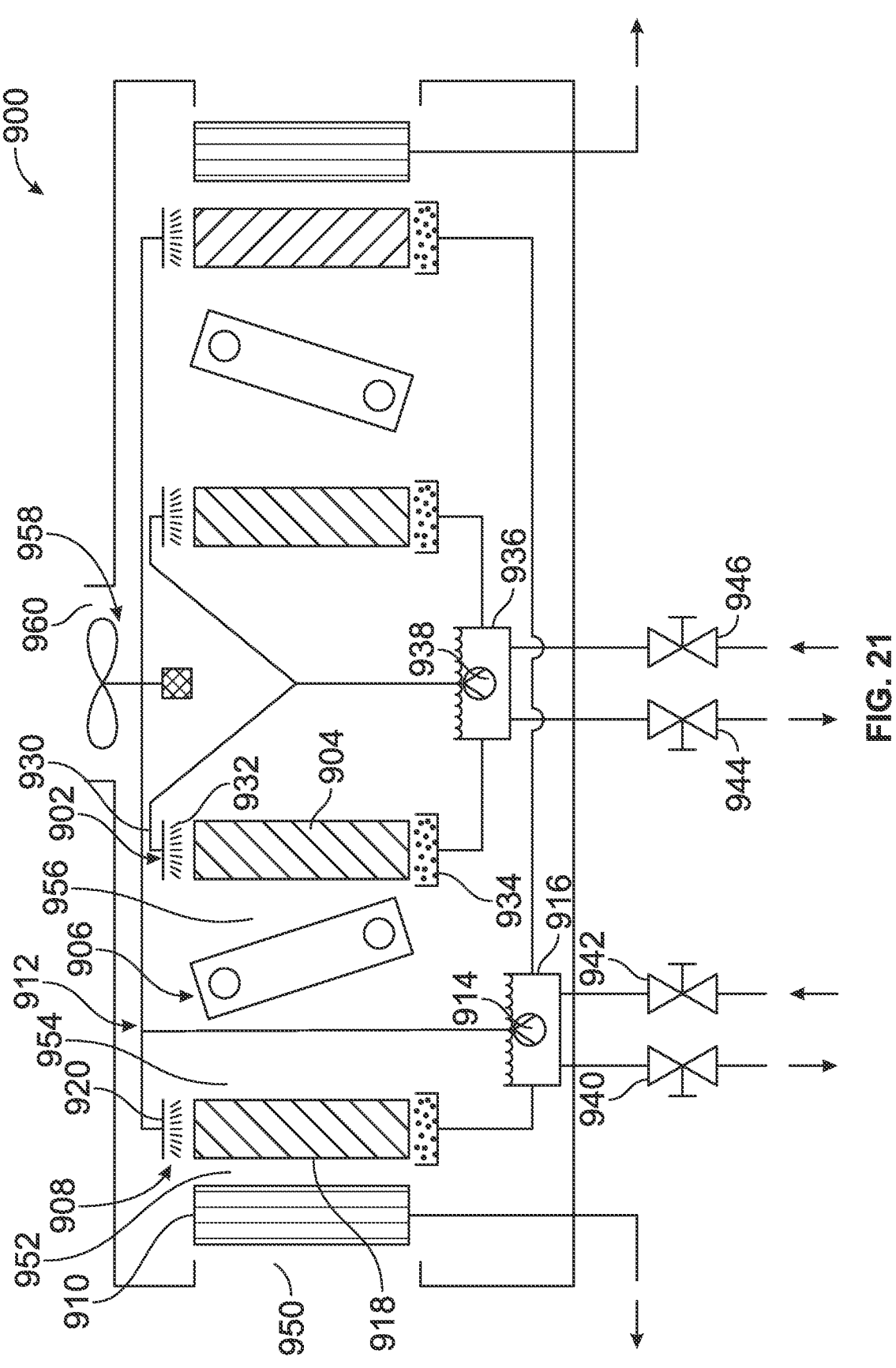
FIG. 21 is a schematic view of an air contactor having dehumidifiers, adiabatic cooling pads, indirect heat exchangers, and carbon capture pads.

With reference to FIG. 21, an air contactor 900 is provided having a $CO_2$ capture system 902 including a carbon capture medium 904, an indirect heat exchanger 906, a precooler system 908, and a dehumidifier 910. The precooler 908 includes a water distribution system 912 having a pump 914 that circulates water from a water sump 916 to a liquid absorbent material 918 of the precooler system 908. The water distribution system 912 includes outlets such as nozzles 920 that spray the water onto the liquid absorbent material 918. The $CO_2$ capture system 904 has a carbon capture solution distribution system 930 including one or more nozzles 932 to spray the carbon capture solution onto the carbon capture medium 904 and a trough 934 to collect the carbon capture solution from the carbon capture medium 904. The $CO_2$ capture system 904 includes a carbon capture solution sump 936 and a pump 938 to circulate the carbon capture solution. The air contactor 900 includes a water drain valve 940, a water supply valve 942, a carbon capture solution drain valve 944, and a carbon capture solution supply 946.

The air contactor 900 has a fan assembly 958 that moves air from the air inlet 950, through the dehumidifier 910, through the precooler system 908, through the indirect heat exchanger 906, through the carbon capture medium 904, and out from the air outlet 960 of the air contactor 900. The dehumidifier 910 provides dehumidified air 952 upstream of the precooler 908, the precooler 908 provides cooler and slightly more humid air 954 upstream of the indirect heat exchanger 906, and the indirect heat exchanger 906 reduces the humidity and provides heated air 956 upstream of the carbon capture medium 904. The dehumidification and cooling of the air upstream of the indirect heat exchanger 906 improves the efficiency of the indirect heat exchanger 906. Another benefit of the air contactor 900 is that the air contactor 900 provides flexibility in providing optimally conditioned air to the indirect heat exchanger 906 and/or $CO_2$ capture process. The air contactor 900 also provides flexibility in optimizing water and energy use for heat rejection and/or $CO_2$ capture process.

Figure 22:
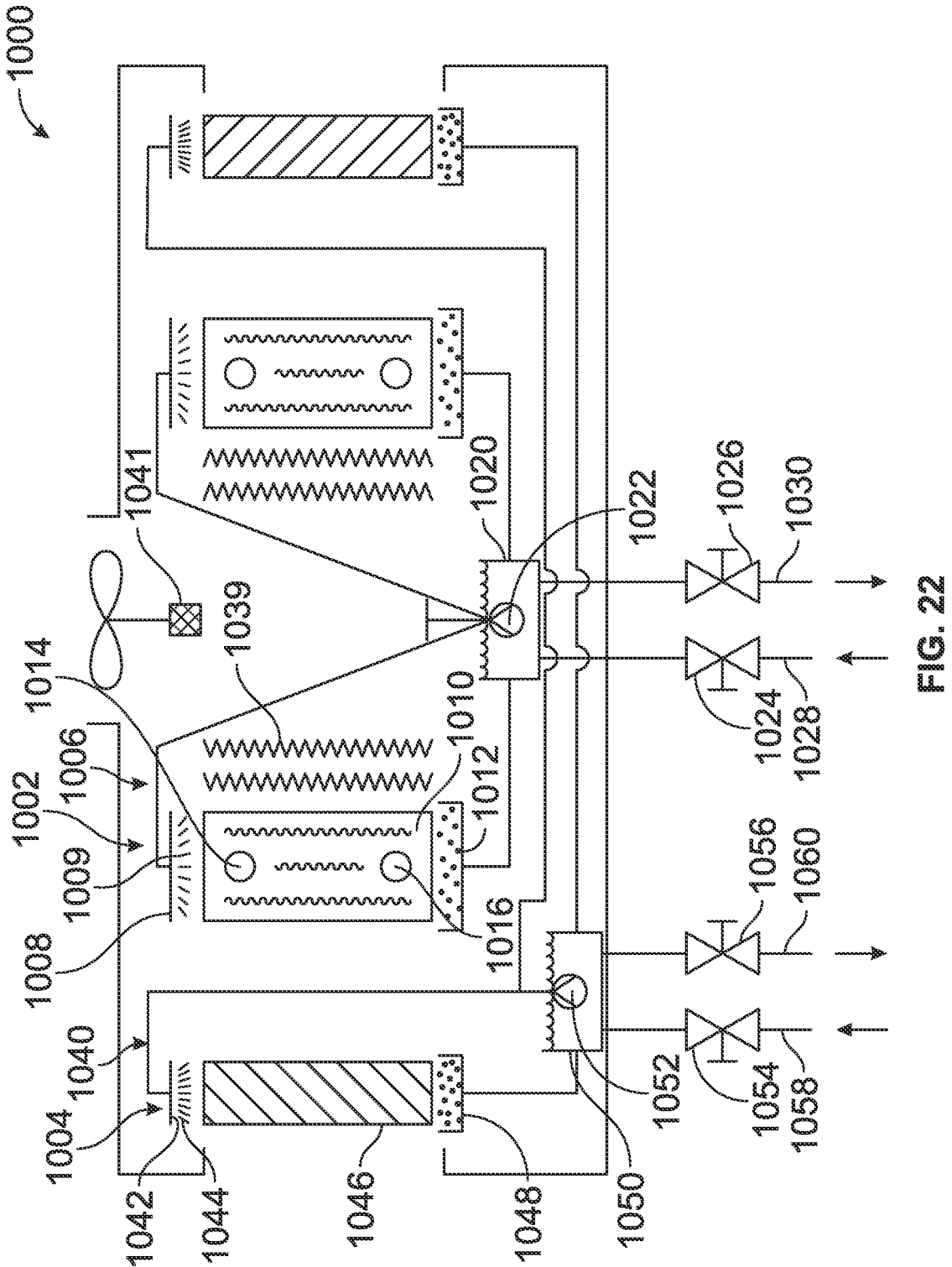
FIG. 22 is a schematic view of an air contactor having adiabatic cooling pads, plate heat exchangers, and a carbon capture solution distribution system operable to distribute carbon capture solution onto the plate heat exchangers.

Regarding FIG. 22, an air contactor 1000 is provided that has a $CO_2$ capture system 1002 and a precooler 1004. The $CO_2$ capture system 1002 has a carbon capture solution distribution system 1006 including one or more outlets such as nozzles 1008 to distribute carbon capture solution onto an indirect heat exchanger 1010. The nozzles 1008 are configured cover the external surfaces of the indirect heat exchanger 1010 with carbon capture solution. The flow rate of carbon capture solution may be adjusted to optimize capture efficiency and minimize energy use, e.g., pumping power and airside pressure drop.

The indirect heat exchanger 1010 may be a pillow-type indirect heat exchanger that includes an inlet 1014 to receive a fluid and an outlet 1016 for a fluid. The indirect heat exchanger 1010 may be made of a material selected to withstand the carbon capture solution, such as galvanized steel, aluminum, stainless steel, platinum, polymeric material, and/or ceramics as appropriate for a particular embodiment.

The air contactor 1000 includes a drift eliminator 1039 intermediate the indirect heat exchanger 1010 and a fan assembly 1041. The drift eliminator 1039 is configured to inhibit carbon capture solution drift from reaching the fan assembly 1041.

The carbon capture solution distribution system 1002 includes a trough 1012 to collect carbon capture solution 1009 after the carbon capture solution 1009 has traveled along outer surfaces of the indirect heat exchanger 1010.

The flow of air across the outer surfaces of the indirect heat exchanger 1010 with the carbon capture solution 1009 thereon indirectly cools the fluid inside of the indirect heat exchanger 1010. Further, some of the water in the carbon capture solution 1009 may evaporate as the carbon capture solution 1009 travels along the exterior surfaces of the indirect heat exchanger 1010. The evaporating water removes additional heat from the indirect heat exchanger 1010.

The carbon capture solution 1009 on the exterior surfaces of the indirect heat exchanger 1010 is positioned to entrain $CO_2$ into the carbon capture solution 1009 as air travels through the indirect heat exchanger 1010. The $CO_2$ capture system 1002 includes a carbon capture solution sump 1020, a pump 1022, and valves 1024, 1026 to provide $CO_2$-rich carbon capture solution to a drain 1028 or to receive fresh carbon capture solution from a supply 1030.

The precooler 1004 includes a water distribution system 1040 having one or more outlets such as nozzles 1042 to distribute water 1044 onto a liquid absorbent material 1046. The water distribution system 1040 further includes a trough 1048 to collect water from the liquid absorbent material 1046, a water sump 1050, a water pump 1052, and valves 1054, 1056 to receive water from a water supply 1058 or direct water from the water sump 1050 to a water drain 1060.

The air contactor 1000 is operable in different modes of operation. For example, the air contactor 1000 has a dry cooling mode wherein air flows over the indirect heat exchangers 1010 and the pumps 1024, 1052 are turned off. The air contactor 1000 has a pure $CO_2$ capture mode wherein the pump 1024 operates to distribute carbon capture solution onto the indirect heat exchanger 1010 but there is no fluid traveling through the interior of the indirect heat exchanger 1010. The air contactor 1000 has an adiabatic cooling mode wherein the pump 1024 is off, the pump 1052 is on to pump water to the liquid absorbent material 1046, and there is fluid traveling through the interior of the indirect heat exchanger 1010. The air contactor 1000 has a $CO_2$ capture and fluid cooling mode, wherein the pump 1024 is on and the indirect heat exchanger 1010 has fluid traveling through the interior of the indirect heat exchanger 1010. The air contactor 1000 has a $CO_2$ capture, fluid cooling, and adiabatic precooling mode wherein the pumps 1024, 1052 are on and the indirect heat exchanger 1010 has fluid traveling through the interior thereof.

In some embodiments, the precooler 1004 and the indirect heat exchanger 1010 may include, for example, a serpentine tube, a membrane heat exchanger, and/or a spray on dry heat exchanger. In some embodiments, the air contactor 1000 may include three-way valves to permit switching between the $CO_2$ capture system 1002 utilizing carbon capture solution and utilizing water. In one embodiment, the component at reference numeral 1004 may be an air pollutant capture apparatus and the component at 1002 may be a wetted indirect heat exchanger and/or a direct heat exchanger such as fill.

Figure 23:
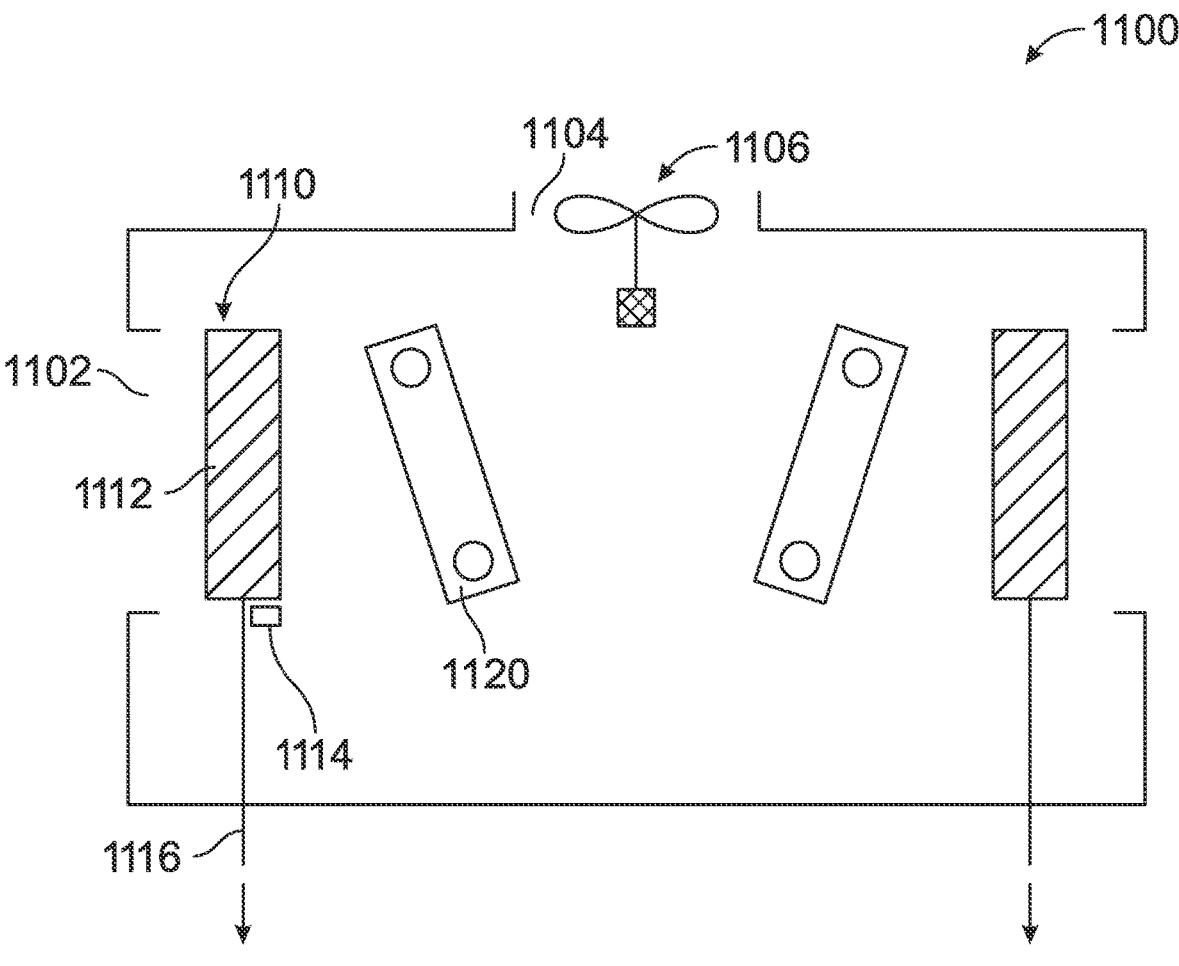
FIG. 23 is a schematic view of an air contactor having solid sorbent-based carbon capture media upstream of indirect heat exchangers.

With reference to FIG. 23, an air contactor 1100 is provided that includes an air inlet 1102, an air outlet 1104, and a fan assembly 1106 to generate air flow therebetween. The air contactor 1100 has a solid sorbent-based carbon capture medium system 1110. The solid sorbent-based carbon capture medium system 1110 may include, for example, amines, zeolites, and/or metal organic frameworks. In one embodiment, the carbon capture medium system 1110 includes a carbon capture media comprising a filter 1112 that captures $CO_2$ from the air traveling through the air contactor 1100. The solid sorbent-based carbon capture medium system 1110 includes a heat source 1114 to heat the filter 1112 once the filter 1112 has been saturated to release $CO_2$ from the filter 1112. The solid sorbent-based carbon capture medium system 1110 further includes a $CO_2$ exhaust 1116 to remove the $CO_2$ from the filter 1112. For example, the $CO_2$ exhaust 1116 may include a vacuum. In one embodiment, the air inlet 1102 and the air outlet 1104 may have features, such as louvers or movable panels, to close the air inlets and outlets 1102, 1104 during removal of $CO_2$ from the filter 1112. Other embodiments may utilize a vacuum-only approach to remove $CO_2$ from the filter. Still further, some embodiments may utilize heat and a carrier gas to flush the sorbent material after releasing much of the $CO_2$ using a heating and vacuum operation.

The air contactor 1100 includes a heat exchanger 1120 downstream of the filter 1112. Examples of solid sorbent materials include alkaline earth oxides, amines, zeolites, and/or metal organic frameworks. In one embodiment, the air contactor 1100 may include an electrochemical $CO_2$ capture medium (see FIGS. 10-12 and associated discussion) instead of or in addition to the solid sorbent-based carbon capture medium system 1110.

Figure 24:
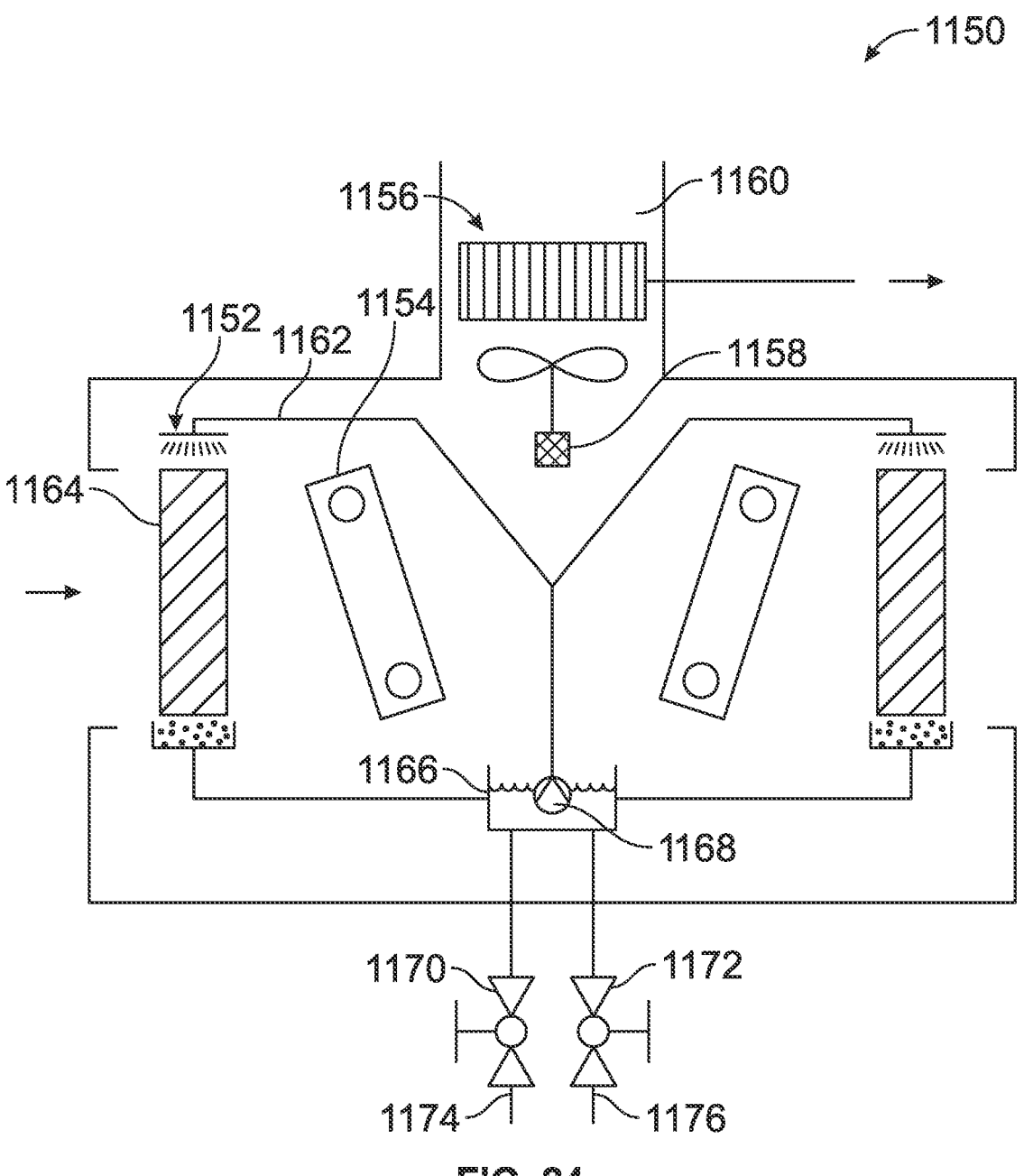
FIG. 24 is a schematic view of an air contactor having adiabatic pads and indirect heat exchangers upstream of a fan assembly and a carbon capture system downstream of the fan assembly.

With reference to FIG. 24, an air contactor 1150 is provided that is similar in many respects to the air contactors discussed above. The air contactor 1150 has a precooler 1152, a heat exchanger 1154, and a carbon capture system 1156. The carbon capture system 1156 is intermediate a fan assembly 1158 and an air outlet 1160 of the air contactor 1150. The carbon capture system 1156 may include, for example, a solid sorbent, a liquid solvent, and/or an electrochemical sorbent-based approach to remove $CO_2$ from air flowing through the air contactor 1150. The heat exchanger 1154 may be include an indirect evaporative heat exchanger. The precooler 1152 includes a water distribution system 1162, liquid absorbent material 1164, a sump 1166, a pump 1168, and valves 1170, 1172. The valves 1170, 1172 control water flow from a water supply 1174 and water flow to a water drain 1176. The carbon capture system 1156 is downstream of a fan assembly 1158 which may be desirable for some embodiments as a way to protect the fan assembly 1158 while making the carbon capture system 1156 readily serviceable. Positioning the carbon capture system 1156 downstream of the fan assembly 1158 may in some instances reduce the risk of plume and contamination of the ambient air with microorganisms. In one embodiment, the carbon capture system 1156 is configured to be retrofit to an existing cooling tower, which permits the cooling tower to provide $CO_2$ capture capability without increasing the footprint of the cooling tower. The air contactor utilizing the carbon capture system 1156 may have a forced-draft configuration with a larger discharge area and a lower pressure drop across the air contactor. The lower pressure drop and large discharge area may permit a more efficient carbon capture operation in some embodiments.

Figure 25:
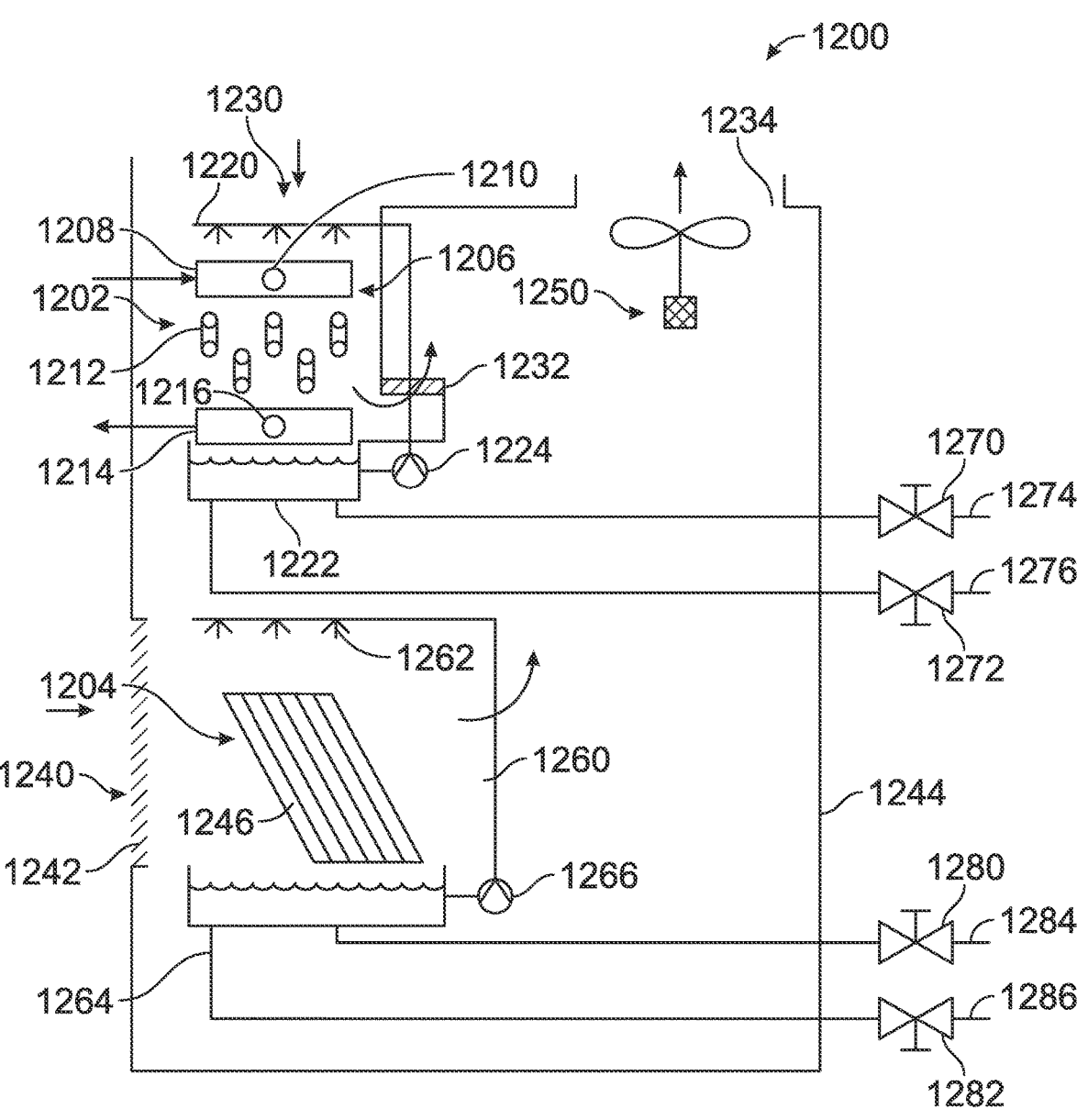
FIG. 25 is a schematic view of an air contactor having an indirect evaporative heat exchanger above a carbon capture system of the air contactor.

With reference to FIG. 25, an air contactor 1200 is provided having an evaporative indirect heat exchanger system 1202 and a $CO_2$ capture system 1204 that may be operated independently of one another. Further, the indirect evaporative heat exchanger system 1202 may be operated in a dry mode or in a wet mode regardless of whether the carbon capture system 1204 is operating. More specifically, the indirect evaporative heat exchanger system 1202 includes indirect heat exchanger 1206 having an inlet header 1208 with an inlet 1210 to receive a fluid, a coil such as one or more serpentine tubes 1212, and an outlet header 1214 with a fluid outlet 1216.

The indirect evaporative indirect heat exchanger 1202 includes a liquid distribution system 1220 having nozzles 1226 to distribute an evaporative liquid onto the serpentine tubes 1212, a sump 1222 that collects the evaporative liquid, and a pump 1224 to circulate the evaporative liquid back to the nozzles 1226 of the liquid distribution system 1220. The air contactor 1200 has a fan assembly 1250 that generates airflow from an air inlet 1230, through the indirect heat exchanger 1206, through a drift eliminator 1232, and outward from an air outlet 1234 of the air contactor 1200.

The air contactor 1200 includes another air inlet 1240 with louvers 1242 that may be opened to permit air to enter the interior of the housing 1244 of the air contactor 1200 and travel across a carbon capture medium 1246 of the $CO_2$ capture system 1204. The carbon capture medium 1246 may include, for example, a carbon capture solution distributed onto fill sheets. The louvers 1242 may be closed when the $CO_2$ capture system is not operating. With the louvers 1242 open, the fan assembly 1250 may generate airflow from the air inlet 1240, through the carbon capture medium 1246, and to the air outlet 1234.

The $CO_2$ capture system 1204 includes a carbon capture solution distribution system 1260 with one or more outlets such as nozzles 1262 to direct carbon capture solution onto the carbon capture medium 1246. The $CO_2$ capture system 1204 further includes a sump 1264 to collect the carbon capture solution from the carbon capture medium 1246 as well as a pump 1266 to recirculate the carbon capture solution back to the nozzles 1262.

The air contactor 1200 includes a supply valve 1270 and a drain valve 1272 to control the flow of water from a water supply 1274 to the sump 1222 and to control the flow of water from the sump 1222 to a drain 1276. Similarly, the air contactor 1200 includes valves 1280, 1282 for controlling the flow of fresh carbon capture solution from the supply 1284 to the sump 1264 and for controlling the flow of $CO_2$-rich carbon capture solution to the drain 1286. In one embodiment, the air contactor 1200 is configured to flow carbon capture solution or water over both the indirect evaporative heat exchanger 1202 and the carbon capture medium 1264 depending on the operation mode of the air contactor 1200. In yet another embodiment, the air contactor 1200 may be provided with a carbon capture system (e.g., a system that distributes carbon capture solution onto adiabatic pads) upstream and/or downstream of the indirect evaporative heat exchanger 1202 and the carbon capture medium 1264.

Figure 26:
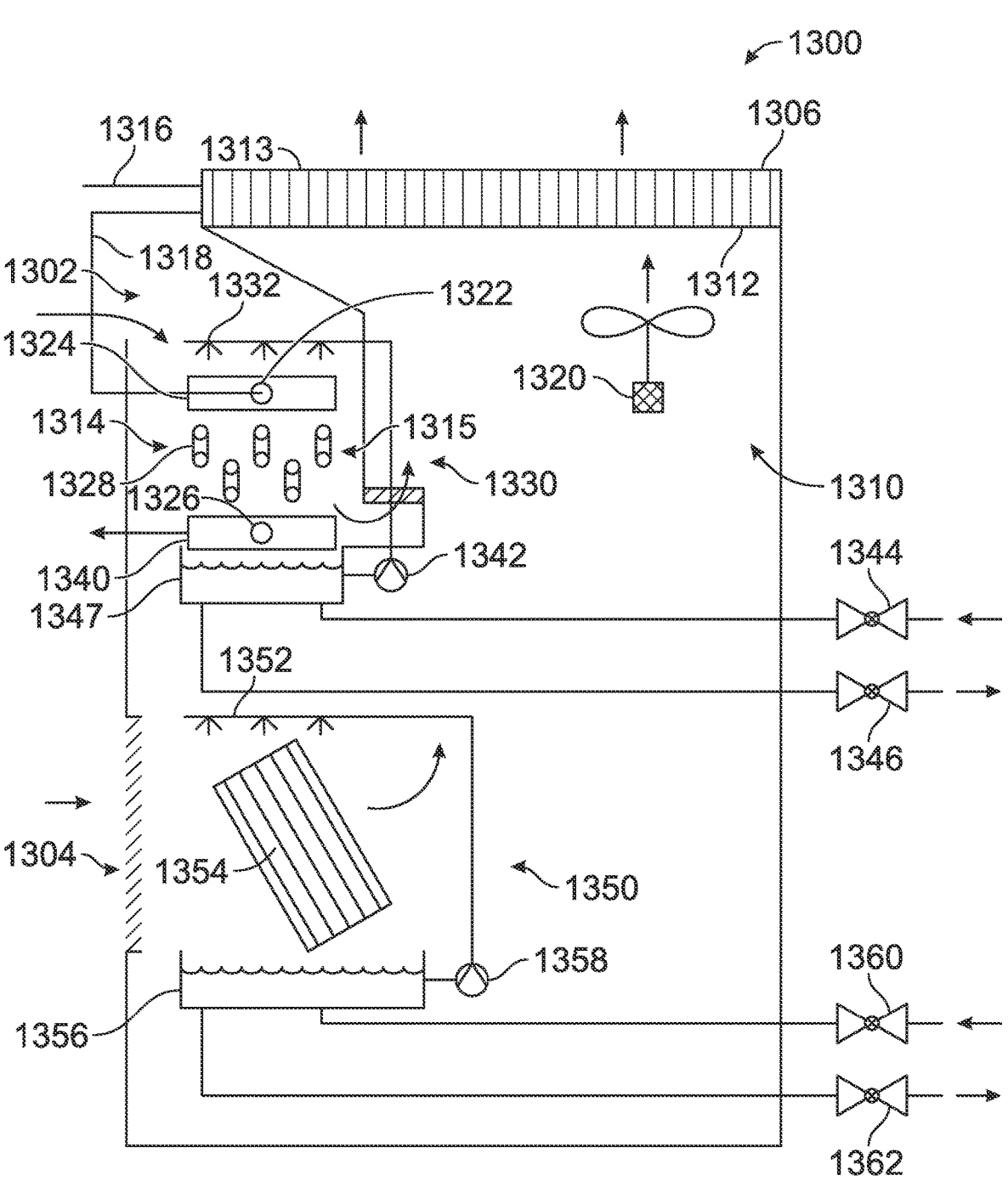
FIG. 26 is a schematic view of an air contactor having an indirect heat exchanger with serpentine coils above a carbon capture system of the air contactor.

With reference to FIG. 26, an air contactor 1300 is provided that is similar in many respects to the air contactor 1200. The air contactor 1300 has air inlets 1302, 1304 and an air outlet 1306. The air contactor 1300 has a heat exchanger system 1310 including a dry heat exchanger system 1312 at the air outlet 1306 and an evaporative heat exchanger system 1314 at the air inlet 1302. The dry heat exchanger system 1312 include an indirect heat exchanger 1313 such as a tube-and-fin heat exchanger, a fluid inlet 1316 to receive fluid, such as a hot process fluid, and a fluid outlet 1318 to direct the process fluid to the evaporative heat exchange system 1314 after fluid has been cooled by way of indirect contact between the fluid in the indirect heat exchanger 1313 and air flow traveling thereacross generated by a fan assembly 1320 of the air contactor 1300. The fluid flows from the fluid outlet 1318 of the dry heat exchanger 1311 to an indirect heat exchanger 1315 of the evaporative heat exchanger system 1314.

The indirect heat exchanger 1315 may include, for example, a coil such as one or more serpentine tubes and/or a plate heat exchanger. In one embodiment, the indirect heat exchanger 1315 includes an inlet header 1324 with an inlet 1322 that receives fluid from the fluid outlet 1318 of the dry heat exchanger 1311. The indirect heat exchanger 1315 further includes an outlet header 1326 and serpentine tubes 1328 connecting that inlet and outlet headers 1324, 1326.

The evaporative heat exchanger system 1314 has a liquid distribution system 1330 including one or more outlets such as nozzles 1332 to distribute evaporative liquid onto the serpentine tubes 1328, a sump 1347 to collect the evaporative liquid from the serpentine tubes 1328, and a pump 1342 to circulate the evaporative fluid. The evaporative heat exchanger system 1314 further includes a water makeup valve 1344 and a drain valve 1346 to control the flow of liquid into and out of the sump 1347.

The air contactor 1300 further includes a $CO_2$ capture system 1350 having a carbon capture solution distribution system 1352 operable to distribute a carbon capture medium such as carbon capture solution onto a support 1354 such as fill sheets. The carbon capture solution distribution system 1352 includes a sump 1356 for collecting carbon capture solution as the carbon capture solution travels off of the fill 1354 and a pump 1358 to circulate the carbon capture solution. The $CO_2$ capture system 1350 further includes a carbon capture solution supply valve 1360 and a carbon capture solution drain valve 1362. The evaporative heat exchanger system 1314 may be operated in a dry mode wherein the pump 1342 is turned off to permit cooling of the process fluid via indirect heat exchange between the air traveling through the air contactor 1300 and the fluid in the heat exchangers 1313, 1315. By removing heat from the fluid before the fluid reaches the indirect heat exchanger 1315, the dry heat exchanger system 1312 provides additional cooling capacity for the air contactor 1300. Further, the dry heat exchanger system 1312 may reduce plume in some embodiments by raising the temperature of the air exiting the air contactor 1300.

In another embodiment, the air contactor 1300 has a full $CO_2$ capture mode wherein the air contactor 1300 distributes the carbon capture solution onto both the support 1354 and the serpentine tubes 1328. This permits both the serpentine tubes 1328 and the capture medium 1354 to both be used as media to exchange $CO_2$ to the carbon capture solution. In one embodiment, a solid sorbent-based electrochemical carbon capture medium may be used in the air contactor 1300. In one embodiment, the air contactor 1300 has a carbon capture system (e.g., a system that distributes carbon capture solution onto adiabatic pads) upstream and/or downstream of the evaporative heat exchanger system 1314 and the $CO_2$ capture system 1350. In yet another embodiment, the air contactor 1300 has a solid sorbent-based capture medium instead of or in addition to the dry heat exchanger system 1312.

Figure 27:
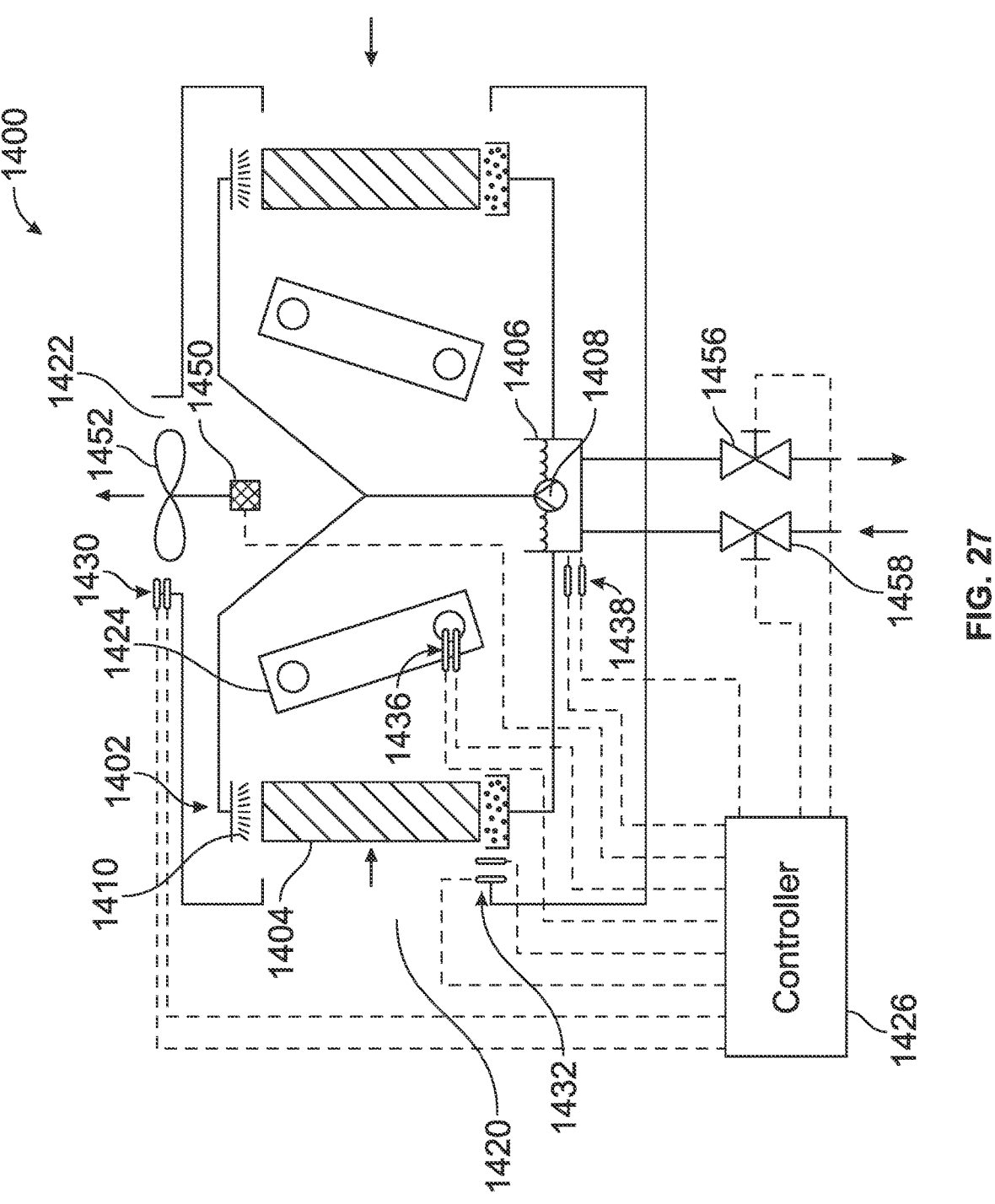
FIG. 27 is a schematic view of an air contactor having a controller that operates the air contactor based at least in part upon data from air sensors, carbon capture solution sensors, and heat exchanger sensors.

With reference to FIG. 27, the air contactor 1400 is provided that is similar to the air contactor 352 discussed above. The air contactor 1400 includes an air pollutant capture system such as a $CO_2$ capture system 1402 having a support such as a liquid absorbent material 1404, a carbon capture solution sump 1406, a pump 1408, and one or more outlets such as nozzles for distributing a carbon capture solution 1410 onto the liquid absorbent material 1404. The capture solution may be suitable for capturing $CO_2$, methane, or VOC as some examples. The air contactor 1400 has an air inlet 1420 and an air outlet 1422, a heat exchanger 1424, and a controller 1426. To monitor and control operation of the air contactor 1400, the controller 1426 is operably connected to air sensors 1430, 1432, one or more fluid sensors 1436, and one or more carbon capture solution sensors 1438. The air sensors 1430, 1432 may measure one or more of, for example, temperature, relative humidity, carbon dioxide concentration, carbon monoxide concentration, volatile organic compounds (VOX) concentration, ozone concentration, sulfuric dioxide concentration, nitrogen dioxide concentration, and/or a particular matter (for example, 2.5 and/or 10 micrometer diameter) concentration. The one or more fluid sensors 1436 may measure, for example, inlet temperature, outlet temperature, flow rate, and/or pressure of the fluid of the heat exchanger 1424. The one or more liquid sensors 1438 may measure temperature, conductivity, pH, solids, carbon dioxide concentration, carbon monoxide concentration, volatile organic compounds concentration, ozone concentration, sulfuric dioxide concentration, and/or nitrogen dioxide concentration.

The controller 1426 may operate a fan motor 1450 of the air contactor 1400 to ensure a process fluid temperature set point and/or pressure set point by monitoring the fluid temperature and/or fluid pressure via the sensors 1436 and controlling a speed of a fan 1452 accordingly. The controller 1426 ensures the optimal operation of the $CO_2$ capture process by measuring air side capture performance over time, e.g., the difference between entering and leaving $CO_2$ concentration, and/or by measuring certain parameters of the carbon capture solution to verify that the capture solution does not exceed a preset $CO_2$ saturation threshold. If the $CO_2$ saturation threshold is reached, the controller 1426 operates the drain valve 1456 to drain the saturated carbon capture solution. The controller 1426 then closes the drain valve 1456 and opens a makeup carbon capture solution valve 1458 to provide fresh carbon capture solution to the sump 1406. The controller 1426 may switch on/off the operation of the heat exchanger 1424 and/or the $CO_2$ capture process as needed.

The controller 1426 may perform other operations to maintain the air contactor 1400. For example, the controller 1426 may turn off the pump 1408 and operate the fan 1452 in a reverse direction to clean the liquid absorbent material 1404 if the liquid absorbent material 1404 includes liquid absorbent material. The controller 1426 may reduce fan speed and/or reduce distribution of fluid onto the liquid absorbent material 1404 in response to an increase of drift and/or occurrence of plume. The air contactor 1400 may open the carbon capture solution valve 1458 to add carbon capture solution to compensate drift losses, losses for leaks, and/or splashout.

In one embodiment, the controller 1426 may operate the motor 1450 to optimize the pollutant capture process. In one approach, the control system may optimize both the pollutant capture and fluid cooling processes. The controller 1426 may utilize logic that takes into account other parameters such as ambient air temperature, relative humidity, time of day, total pollutants capture over a relevant period of time, and/or energy cost as some examples.

The controllers of the air contactors disclosed herein may optimize (e.g., minimize) one or more operating parameters such as energy consumption, water consumption, carbon footprint (for $CO_2$ capture processes), and operating cost(s). The optimization allows for optimal control of the fan speed (directly or by setting a different leaving water temperature setpoint, and/or leaving air $CO_2$ concentration setpoint) and/or liquid supply to the carbon capture system to minimize one or more of the operating parameters. The optimization may be bounded by some minimum and maximum values, e.g., for leaving water temperature, process fluid temperature/pressure, and/or leaving air $CO_2$ concentration as some examples. The optimization may therefore be based on cooling performance and/or efficiency of the $CO_2$ capture process.

The controllers of the air contactors operate the air contactors based upon the intermittent nature of the $CO_2$ capture process, especially for solid state capture materials. For example, the controller of an air contactor may periodically alter the operator of the air contactor to allow for isolation of the carbon capture system and desorption of the captured $CO_2$. The controller may optimize the timing of the isolation/desorption operation based upon, for example, cooling requirements, time of day, and energy pricing. The controller may optimize the rate at which the $CO_2$ is absorbed to ensure that the desorption process happens during a downtime of the cooling process such as at night and/or on weekends.

Figure 28:
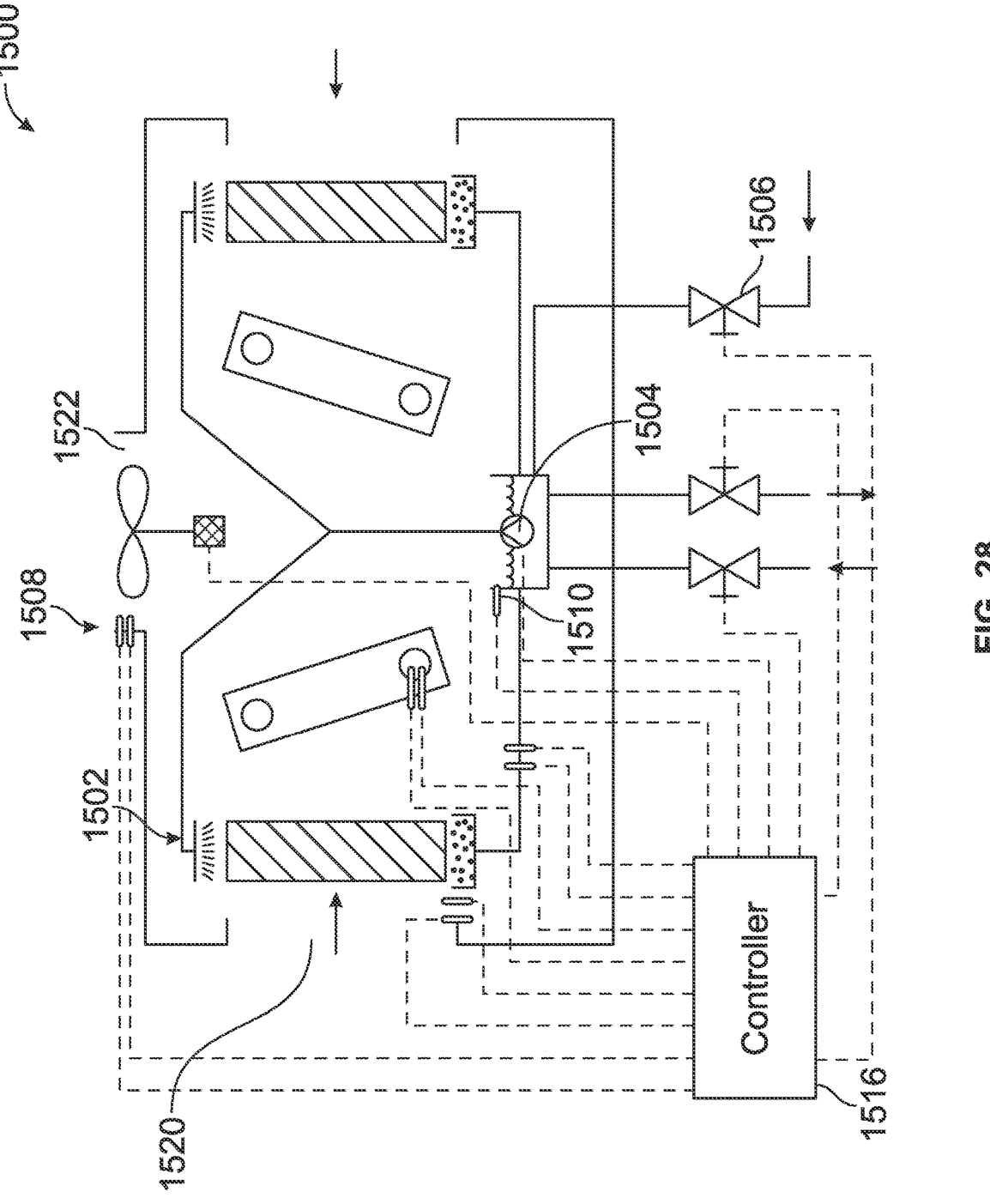
FIG. 28 is a schematic view of an air contactor having a controller in communication with a sump level sensor, the controller operating a makeup water valve in response to data from the sump level sensor.

With reference to FIG. 28, an air contactor 1500 is provided that is similar to the air contactor 1400 discussed above. The air contactor 1500 has a carbon capture solution system 1502 with a carbon capture solution sump 1504 and a water makeup valve 1506 that controls a flow of makeup water into the carbon capture solution sump 1504. The air contactor 1500 has one or more sensors 1508 similar to the sensors discussed above with respect to the air contactor 1400 as well as a level sensor 1510 that detects a level of carbon capture solution in the capture solution sump 1504. The air contactor 1500 includes a controller 1516 that may open the valve 1506 to replenish water lost via evaporation from the carbon capture solution. The controller 1516 may monitor the evaporative water loss using the level sensor 1510 of the capture solution sump 1504 because the volume of carbon capture solution in the sump 1504 will decrease as water evaporates from the carbon capture solution. Once a lower threshold of the carbon capture solution in the capture solution sump 1504 has been reached, the controller 1516 opens the valve 1506. Once a high-level threshold of capture solution in the capture solution sump 1504 is reached due to the addition of makeup water to the sump 1504, the controller 1516 closes the valve 1506.

Water loss by evaporation of the capture solution may also be determined indirectly. For example, the controller 1516 may determine evaporative loss via a difference in the humidity between air entering an air inlet 1520 of the air contactor 1500 and air exiting an air outlet 1522 of the air contactor 1500. As another example, the controller 1516 may detect a change in concentration of one or more parameters of the carbon capture solution such as pH, conductivity, and/or $CO_2$ concentration, etc.

Figure 29:
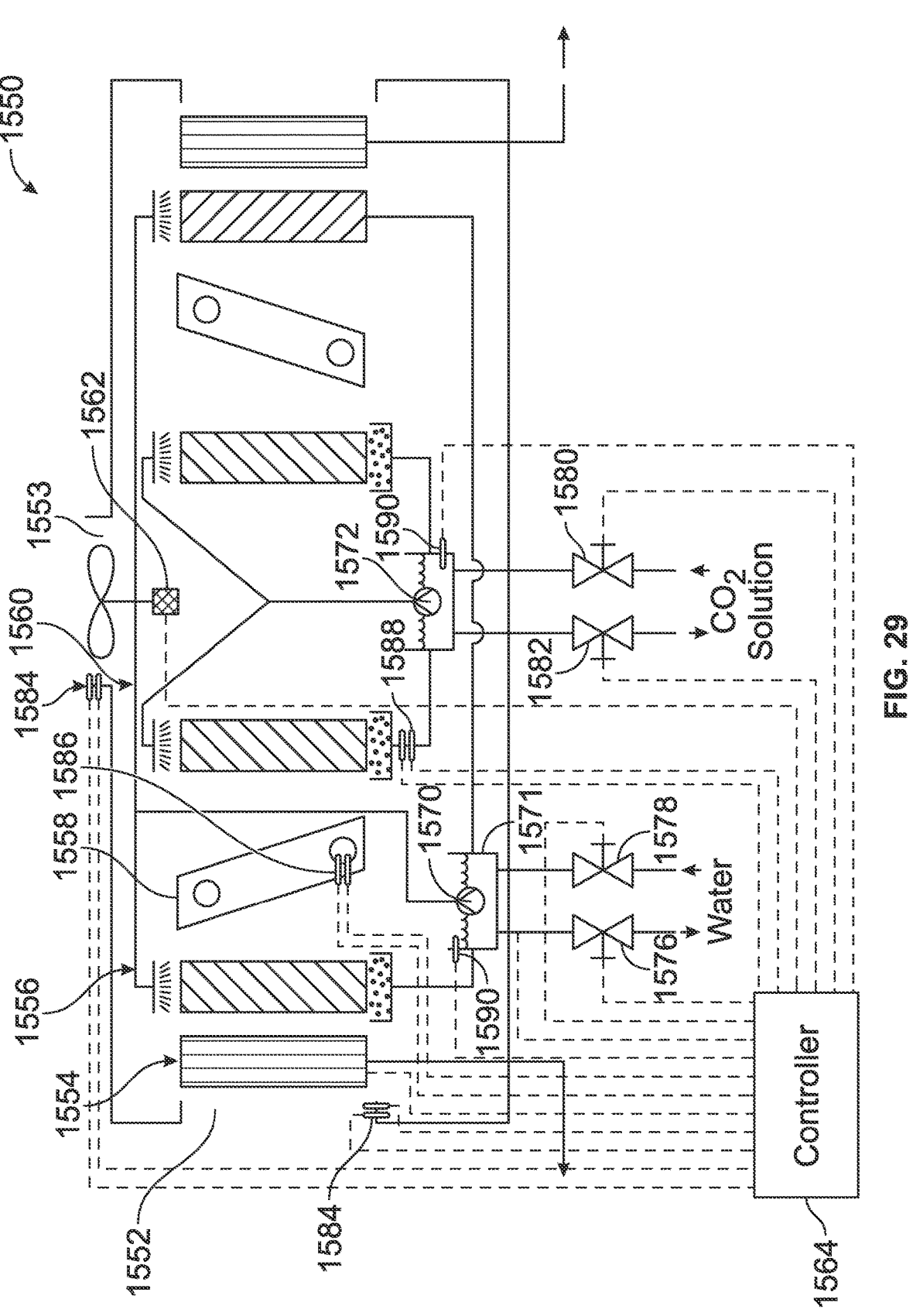
FIG. 29 is a schematic view of an air contactor having a controller that uses sensors to monitor parameters of the air contactor and controls water and carbon capture solution distribution systems of the air contactor.

With respect to FIG. 29, an air contactor 1550 is provided that is similar to the air contactor 900 discussed above. The air contactor 1550 has an air inlet 1552, a dehumidifier 1554, a precooler system 1556, a heat exchanger 1558, an air pollutant capture system such as $CO_2$ capture system 1560, a fan assembly 1562, and a controller 1564. The controller 1564 operates pumps 1570, 1572 of the precooler system 1556 and the $CO_2$ capture system 1560, the dehumidifier 1554, the fan assembly 1562, the water drain and supply valves 1576, 1578 and carbon capture solution supply and drain valves 1580, 1582.

The controller 1564 incorporates logic to control the various components of the air contactor 1550 based at least in part upon data from an air sensor 1584, a fluid sensor 1586, a liquid sensor 1588, and a level sensor 1590. The controller 1564 utilizes similar logic to the operation of the air contactor 900 discussed above. Further, the controller 1564 may increase heat transfer capacity by turning on the pump 1570 to enable the precooling of air upstream of the heat exchanger 1558. The controller 1564 may monitor the level of water in the sump 1571 and other parameters of the water to drain and/or replenish the water as needed. In one approach, the controller 1564 may utilize relative humidity and/or temperature information detected by the air sensor 1584 to determine whether it will be worthwhile to enable precooling.

The controller 1564 may also determine whether to operate the dehumidifier 1554 to increase cooling capacity and/or to produce water. The dehumidifier 1554 may include, for example, controlling a vacuum pump, motor, valves, or other mechanical components of the dehumidifier 1554. The controller 1564 may utilize the relative humidity of air and/or temperature detected by the air sensors 1584 to determine whether it will be useful to operate the dehumidifier 1554.

The controller 1564 may be configured to optimize operation of the air pollutant capture process by, for example, measuring air side capture performance over time such as the difference between the $CO_2$ concentration of the air inlet 1552 versus the concentration of $CO_2$ in the air exiting at the air outlet 1553. Alternatively or additionally, the optimizing of the operation of the air pollutant capture process may include a measuring set of parameters of the capture solution, such as using data from the liquid sensors 1558, to verify that the capture solution does not exceed a preset saturation level. If the saturation level is reached, the controller 1564 may operate the capture solution drain valve 1580 to drain the saturated solution and subsequently operate the capture solution supply valve 1580 to replace the capture solution with fresh capture solution.

The controller 1564 may be used to switch on or off the fluid cooling and/or air pollutant capture process. The controller 1564 may also operate the fan assembly 1562 to optimize the air pollutant capture process primarily, or to co-optimize the air pollutant capture process and the cooling process. The controller 1564 may take into account parameters such as air temperature, relative humidity, time of day, total air pollutant capture over a period of time, and/or energy cost as some variables that are monitored to control operation of the air contactor 1550.

The controller 1564 may switch to the wet cooling mode or the dry cooling mode based upon the cooling capacity required. For example, the controller 1564 may operate the precooling system 1554 when the cooling capacity required is higher and may not operate the precooling system 1554 when the cooling capacity required is lower. Further, for embodiments wherein the air contactor 1550 may utilize water or carbon capture solution in the precooler system 1556, the controller 1564 may utilize water in the precooler system 1556 when a higher cooling capacity is required rather than carbon capture solution.

The controller 1564 may also determine whether to operate the $CO_2$ capture system 1560 based upon a signal from the $CO_2$ utilization process. For example, if $CO_2$ storage tanks are full and/or there is insufficient value for capturing $CO_2$, the controller 1564 may not operate the $CO_2$ capture system 1560.

The air contactor 1550 may recirculate carbon capture solution in the $CO_2$ capture system 1560 or may utilize a once-through approach. The air contactor 1550 may have a time-based bleed or drain of recirculating water, or a drain based on conductivity of water to avoid excessive scaling and/or corrosion of the unit.

Figure 30:
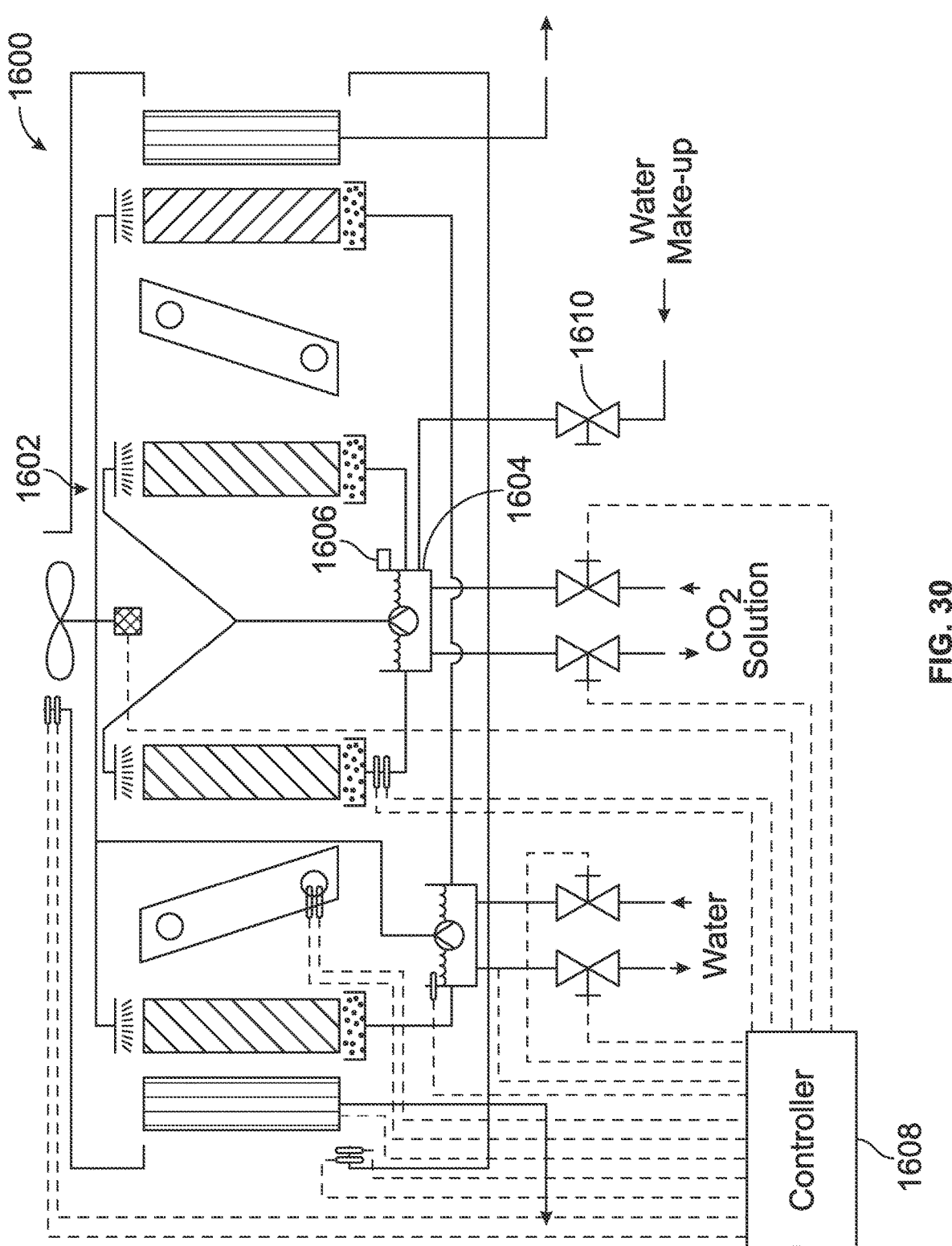
FIG. 30 is a schematic view of an air contactor having a controller that operates a water makeup valve of a carbon capture solution distribution system in response to a level of carbon capture solution in a sump of the air contactor falling below a threshold value due to evaporation of water from the carbon capture solution.

With reference to FIG. 30, air contactor 1600 is provided that is similar in many respects to the air contactor 1550 discussed above. The air contactor 1600 includes an air pollutant capture system such as a $CO_2$ capture system 1602 having a sump 1604 with a level sensor 1606. The air contactor 1600 has a controller 1608 operably connected to the level sensor 1606 and a water supply valve 1610 such that the controller 1608 may selectively provide makeup water to the sump 1604 to compensate for evaporation of water from the carbon capture solution. The level sensor 1606 permits the controller 1608 to directly measure the evaporative water loss and control the valve 1610 in response to the level of capture solution being lowered in a predetermined threshold. Alternatively or additionally, the controller 1608 may determine water loss indirectly using other sensors of the air contactor 1600 in a manner similar to the approaches discussed above. For example, water loss may be estimated via a difference in humidity of air entering and leaving the air contactor 1600 or a change in concentration parameters of the carbon capture solution such as pH, conductivity, and/or pollutant concentration.

Figure 31:
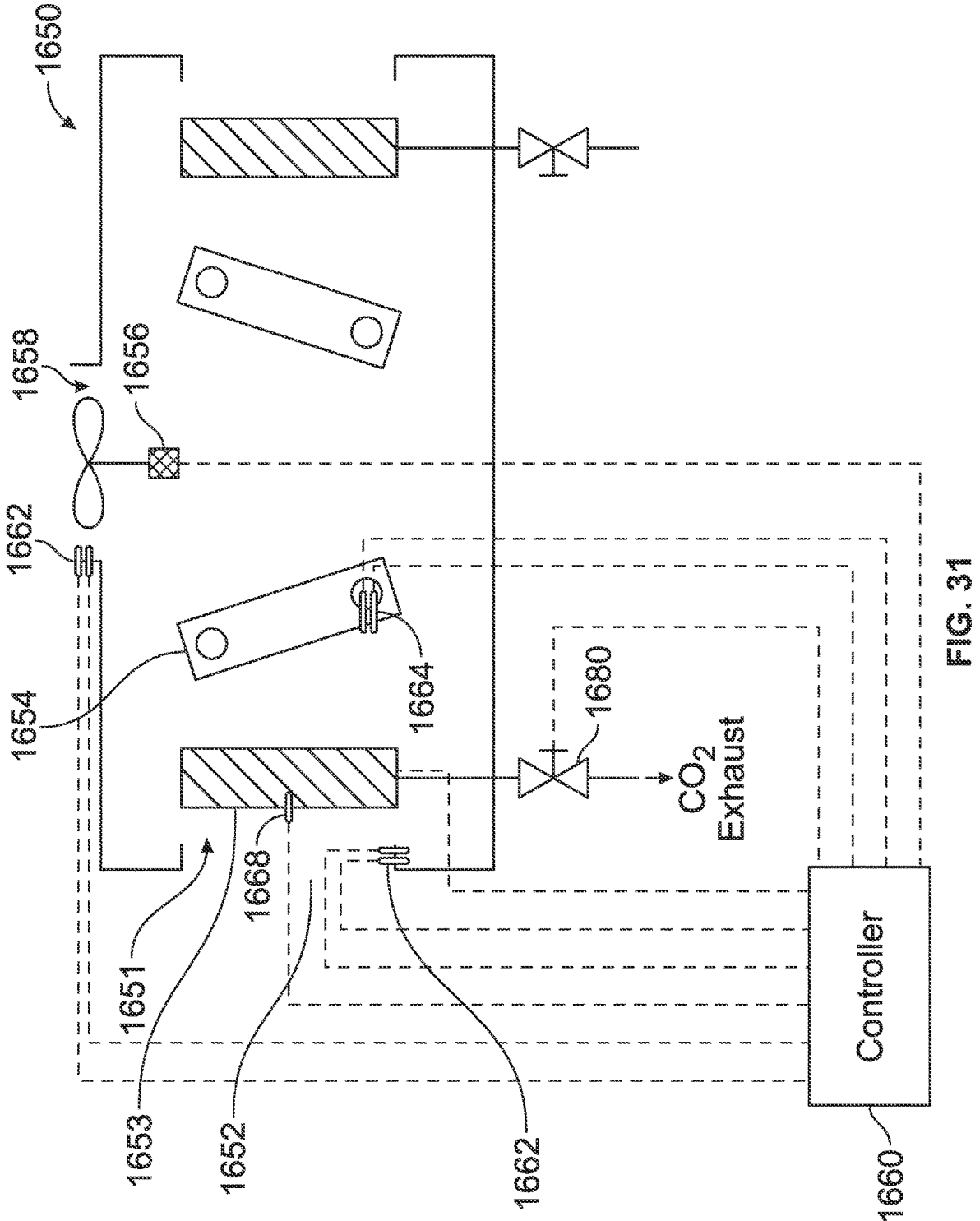
FIG. 31 is a schematic view of an air contactor having a solid state carbon capture media and a controller that operates valves to release $CO_2$ collected by the solid state carbon capture media.

With respect to FIG. 31, the air contactor 1650 is provided that is similar in many respects to the air contactor 1100 discussed above. The air contactor 1650 has an air inlet 1652, $CO_2$ capture system 1651, a heat exchanger 1654, a fan assembly 1656, an air outlet 1658, and a controller 1660. The $CO_2$ capture system 1651 has a $CO_2$ capture medium 1653 which may include, for example, a solid sorbent and/or electrochemical absorption/desorption process apparatus. The air contactor 1650 includes an air sensor 1662, a fluid sensor 1664, and a $CO_2$ capture medium sensor 1668 of the $CO_2$ capture medium 1653.

The controller 1660 may control operation of the $CO_2$ capture system 1651, such as by controlling a resistive heater of the $CO_2$ capture medium 1653, the fan assembly 1656, and a $CO_2$ exhaust valve 1680. The controller 1660 may close the $CO_2$ exhaust valve 1680 when the $CO_2$ capture system 1651 is an operating mode whereby the $CO_2$ capture medium 1653 collects $CO_2$. The controller 1660 may transition to a $CO_2$ removal mode wherein the controller 1660 stops operation of the fan assembly 1656, closes the air inlet 1652 and air outlet 1658, opens the $CO_2$ exhaust valve 1680, and operates a vacuum of the $CO_2$ capture system 1651 to draw $CO_2$ from the $CO_2$ capture medium 1653 through the $CO_2$ exhaust valve 1680 to a $CO_2$ storage container.

The air sensor 1662 may measure parameters similar to the parameters discussed above with respect to the air sensors of other air contactors discussed above. Similarly, the fluid sensor 1664 may measure at least one of temperature, flow rate, and pressure of the fluid of the heat exchanger 1654. The $CO_2$ capture medium sensor 1668 may detect at least one of, temperature, electrical potential/resistivity, carbon dioxide concentration, carbon monoxide concentration, volatile organic compounds (VOC) concentration, ozone concentration, sulfuric dioxide concentration, and nitrogen dioxide concentration.

The controller 1660 may operate the air contactor 1650 using logic similar to the logic discussed above, such as operating the fan assembly 1656 to adjust fan speed to provide a requested process fluid temperature set point and/or process fluid pressure set point.

The controller 1660 may ensure optimum operation of the $CO_2$ capture process measuring air side capture performance over time, such as the difference in $CO_2$ concentration entering at air inlet 1652 and exiting at air outlet 1658 via data from the air sensor 1662. Alternatively or additionally, the controller 1660 may optimize the air pollutant capture process by using one or more parameters of the $CO_2$ capture medium 1653 to verify that the air pollutant capture medium

1650 does not exceed a preset saturation level. Upon the saturation level being reached, the controller 1660 may change from the $CO_2$ capture phase to the $CO_2$ removal phase. For example, the controller 1660 may operate the $CO_2$ capture medium 1650 to apply a different voltage potential to the $CO_2$ capture medium 1653, increase or decrease the temperature of the $CO_2$ capture medium 1653, and/or cause a liquid distribution system to wash the captured $CO_2$ from the capture medium 1653. Another embodiment utilizes a gas to remove the captured $CO_2$ from the capture medium 1653.

Figure 32:
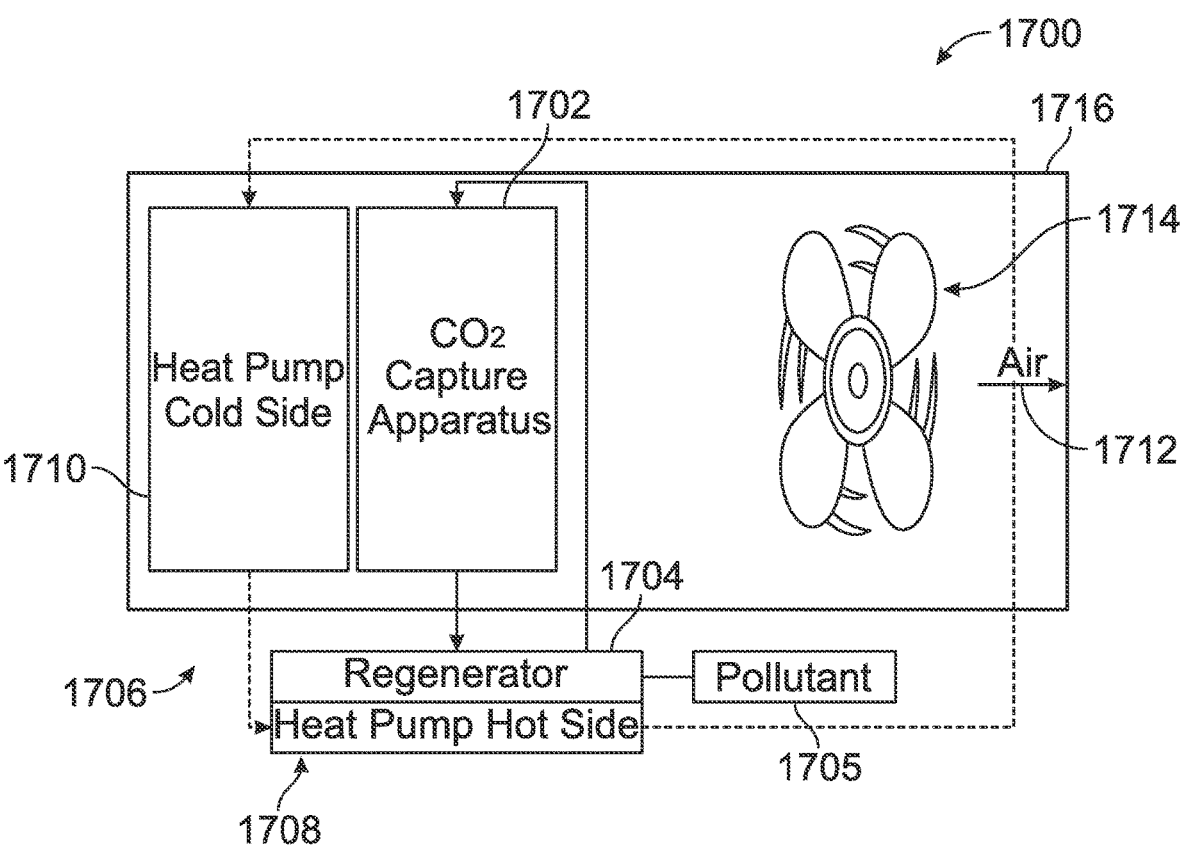
FIG. 32 is a schematic view of an air contactor having a heat pump cold component upstream of a $CO_2$ capture apparatus of the air contactor.

With reference to FIG. 32, an air contactor such as a chiller or heat pump 1700 is provided. The heat pump 1700 has a $CO_2$ capture apparatus 1702 that is configured to utilize either absorption or adsorption to capture $CO_2$. In another embodiment, the capture apparatus 1702 may be configured to remove another air pollutant such as methane, or a combination of air pollutants. In one embodiment, the $CO_2$ capture apparatus 1702 uses a liquid capture solution that is directed to a regenerator 1704 to regenerate the capture fluid by removing $CO_2$ from the liquid capture solution. The regenerator 1704 outputs pollutant 1705 for collection such as $CO_2$ in a gaseous form.

The heat pump 1700 further includes a heat pump 1706 having a hot component 1708 that may include, for example, a condenser. The heat pump 1706 has a cold component 1710 that may include, for example, an evaporator. In another embodiment, the heat pump cold component 1710 may include an intercooler between two $CO_2$ capture apparatuses. The heat pump cold component 1710 operates as an air conditioner that removes heat from the sweep gas, such as air 1712, traveling through the heat pump 1700. The heat pump 1700 has a fan assembly 1714 to generate movement of the air 1712 within an outer structure 1716 of the heat pump 1700.

In one embodiment, the temperature of the heat pump cold component 1710 is higher than the dew point of the air 1712. This reduces the dry bulb temperature of the air 1712 and increases the relative humidity of the air 1712 downstream of the heat pump cold component 1710. Depending on the air pollutant capture medium utilized, the $CO_2$ capture apparatus 1702 may benefit from a higher relative humidity as part of the air pollutant (e.g., $CO_2$) removal process.

Figure 33:
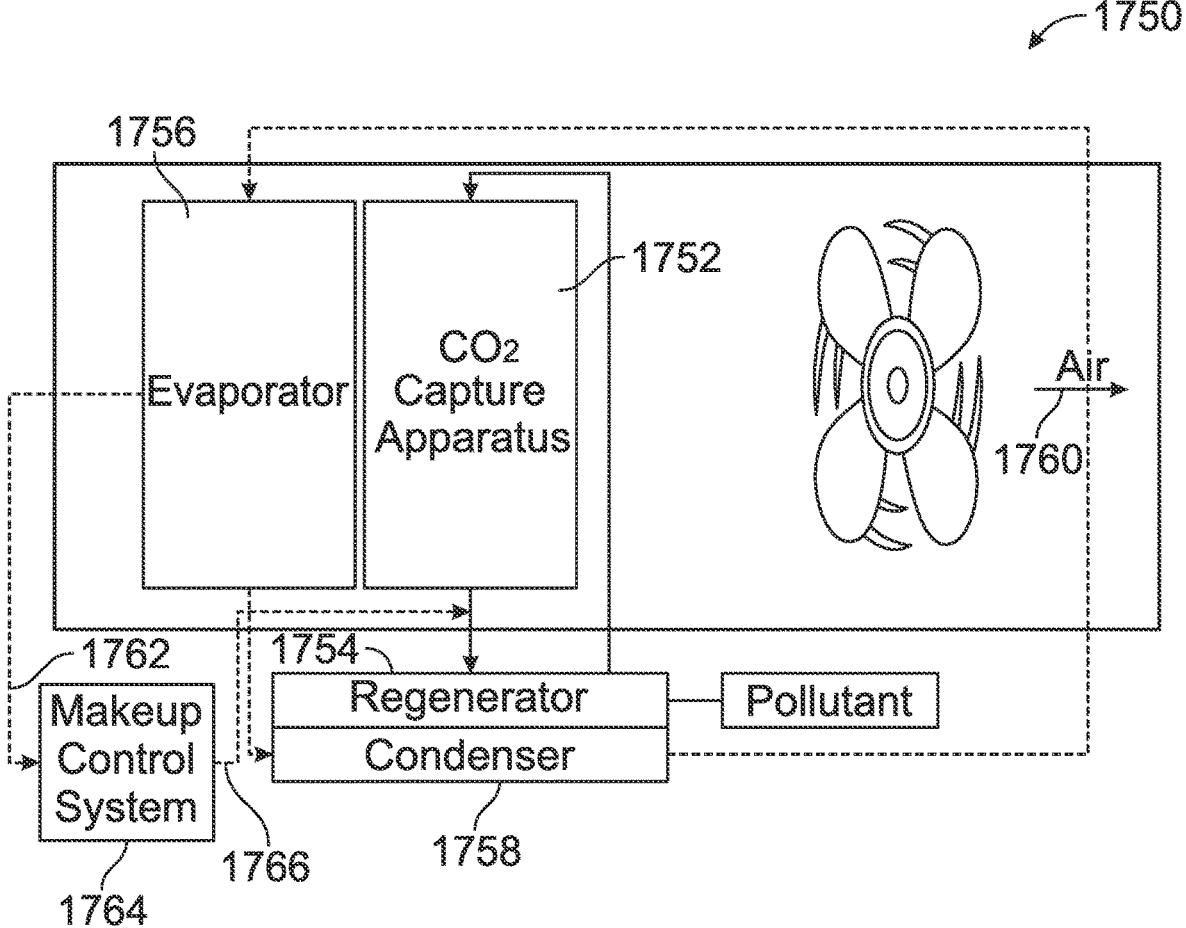
FIG. 33 is a schematic view of an air contactor having an evaporator with a temperature lower than the dewpoint temperature of the inlet sweepgas and a makeup control system that collects condensed water from the evaporator and directs the collected water to an air pollutant capture solution regenerator of the air contactor.

With reference to FIG. 33, a heat pump 1750 is provided having a $CO_2$ capture apparatus 1752, a regenerator 1754, an evaporator 1756, and a condenser 1758. The temperature of the evaporator 1756 may be less than the dew point of sweep gas 1760 entering the heat pump 1710. The lower temperature of the evaporator 1756 reduces the humidity of the air and operates as a dehumidifier. The reduced humidity of the air downstream of the evaporator 1756 is beneficial for the $CO_2$ capture apparatus 1752 that utilizes low humidity air as part of the air pollutant removal process. The heat pump 1750 has a makeup control system 1764 that collects water 1762 from the evaporator 1756 and directs the collected water 1762 to the regenerator 1754. For example, the $CO_2$ capture apparatus 1752 may utilize a liquid carbon capture fluid and the makeup water 1766 is used to make up for water that evaporates from the carbon capture solution. As another example, the water 1762 collected from the evaporator 1756 may be used for another process such as an industrial process that utilizes potable water.

Figure 34:
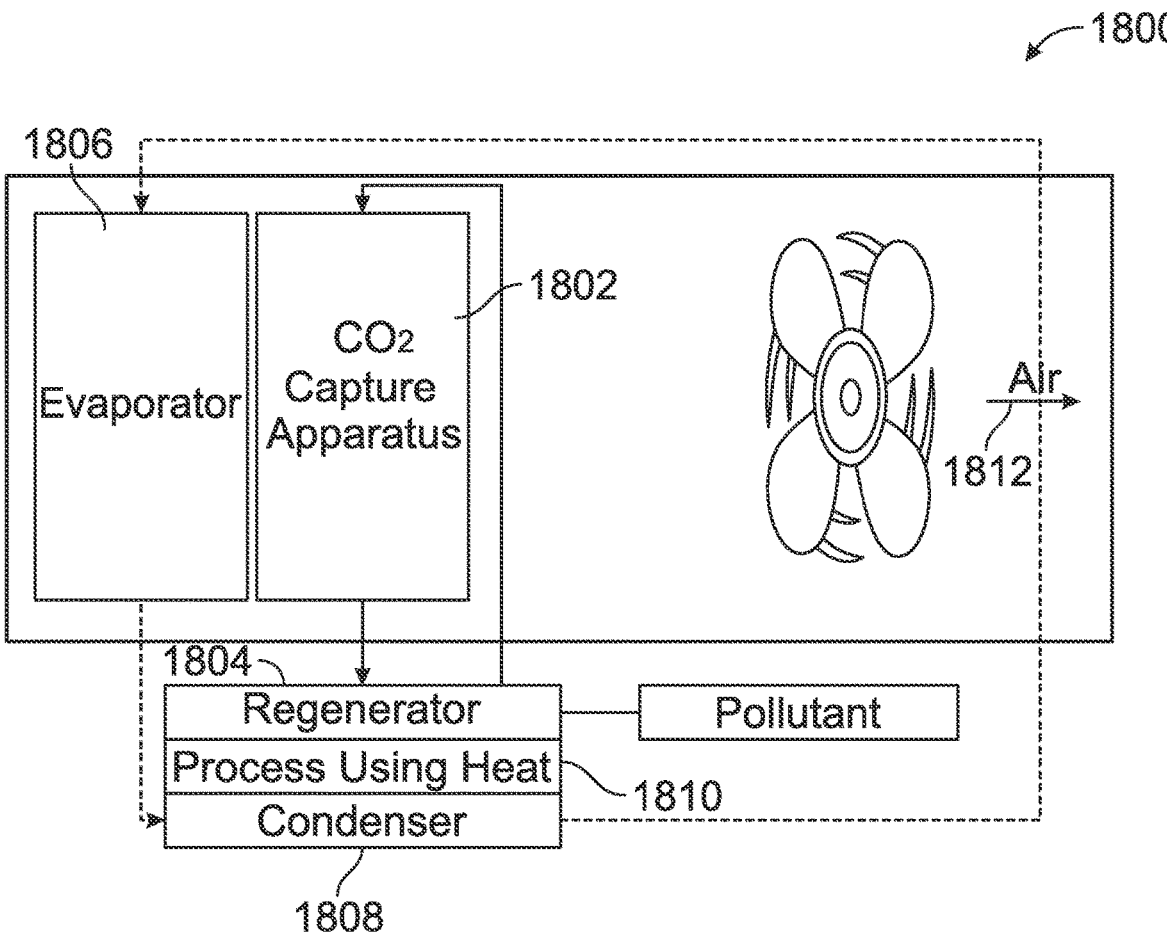
FIG. 34 is a schematic view of an air contactor having an air pollutant capture solution regenerator that receives process heat instead of or in addition to heat from a condenser of the air contactor.

Regarding FIG. 34, a heat pump 1800 is provided that is similar in many respects to the heat pumps discussed above. The heat pump 1800 includes a $CO_2$ capture apparatus 1802, a regenerator 1804, an evaporator 1806, and a condenser 1808. The heat required by the regenerator 1804 to regenerate the air pollutant capture solution significantly exceeds a temperature of the condenser 1808. To provide the required heat, heat from a heat source 1810 is used heat to the regenerator 1804. The heat source 1810 may include, for example, a resistor heating element, direct fire, nuclear power, solar, fission, a heat exchanger between plasma fusion, geothermal, and/or magma under the earth's crust.

The heat from the condenser 1808 may be combined with the heat from the heat source 1810 or used for a different purpose, such as to provide heat for district heating or an industrial process. The presence of the evaporator 1806 in the path of sweep gas flow 1812 through the heat pump 1800 improves the efficiency of the $CO_2$ capture apparatus 1802 in some embodiments by removing heat from the sweep gas flow 1812 upstream of the $CO_2$ capture apparatus 1802.

Figure 35:
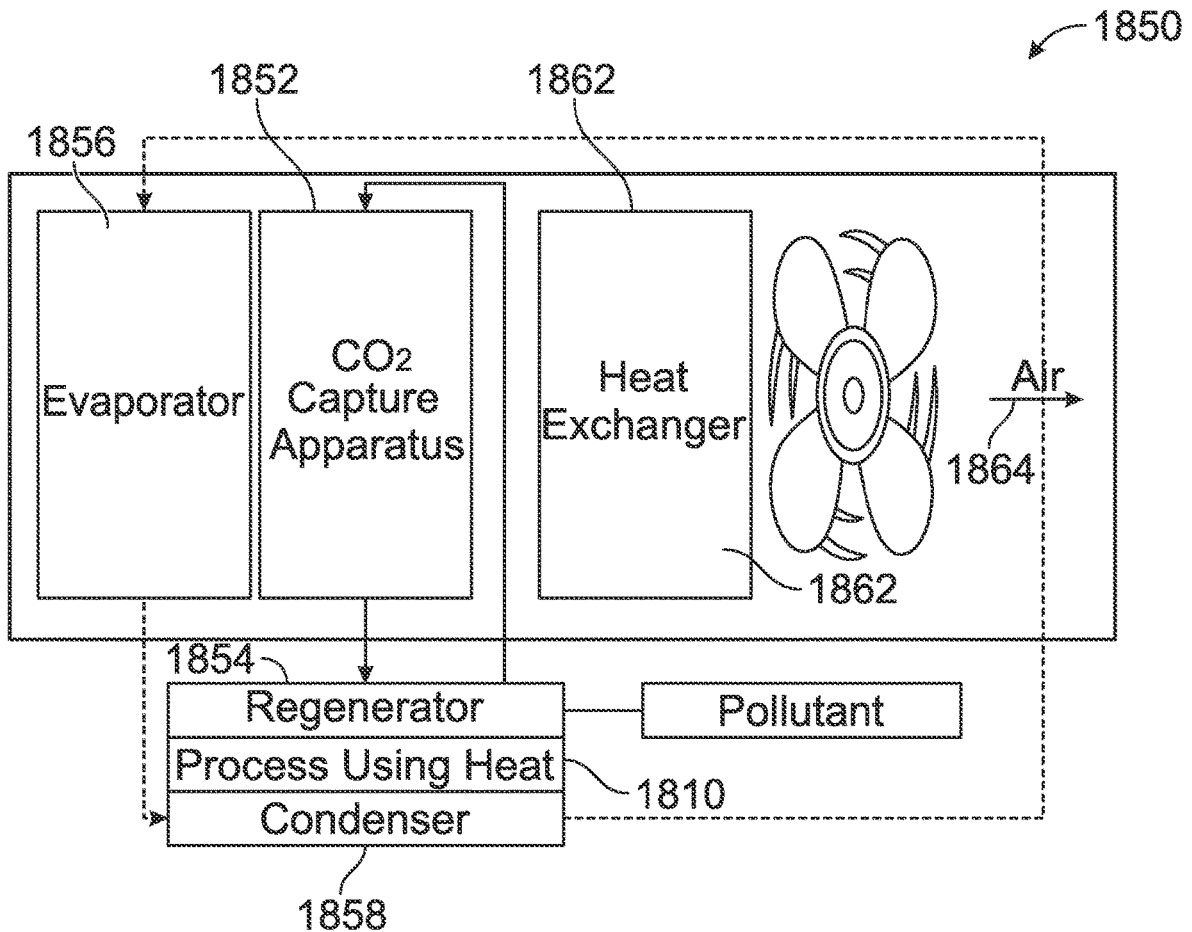
FIG. 35 is a schematic view of an air contactor having an evaporator upstream of a $CO_2$ capture apparatus and a heat exchanger downstream of the $CO_2$ capture apparatus.

With respect to FIG. 35, a heat pump 1850 is provided that is similar to the heat pump 1800 discussed above. The heat pump 1850 includes a $CO_2$ capture apparatus 1852, a regenerator 1854, an evaporator 1856, a condenser 1858, and a heat source 1860. The heat pump 1850 further includes a heat exchanger 1862 downstream of the $CO_2$ capture apparatus 1852. The heat exchanger 1862 may be wet or dry and may be a direct or indirect heat exchanger. Examples of the heat exchanger 1862 include a liquid spray/fill system, fin-tube heat exchanger, and a serpentine coil. The heat exchanger 1862 rejects heat into the sweep gas 1864. The evaporator 1856 reduces the wet bulb temperature of the sweep gas 1864 below the wet bulb temperature of the ambient air and the $CO_2$ capture apparatus 1852 reduces the dry bulb temperature of the sweepgas (e.g., air) to be below the dry bulb temperature of the ambient air. The heat exchanger 1862 rejects heat into the sweep gas 1864 and has a higher heat exchange capacity because the heat exchanger 1862 is rejecting the heat into the air having lower dry bulb and wet bulb temperatures than the ambient air. In another embodiment, the evaporator 1856 is downstream of the heat exchanger 1862 so that water may be condensed from the sweepgas 1864 which provides a source of water and may reduce the risk of plume. In certain applications, the evaporator 1856 being positioned downstream of the heat exchanger 1862 may provide higher condenser temperatures.

Figure 36:
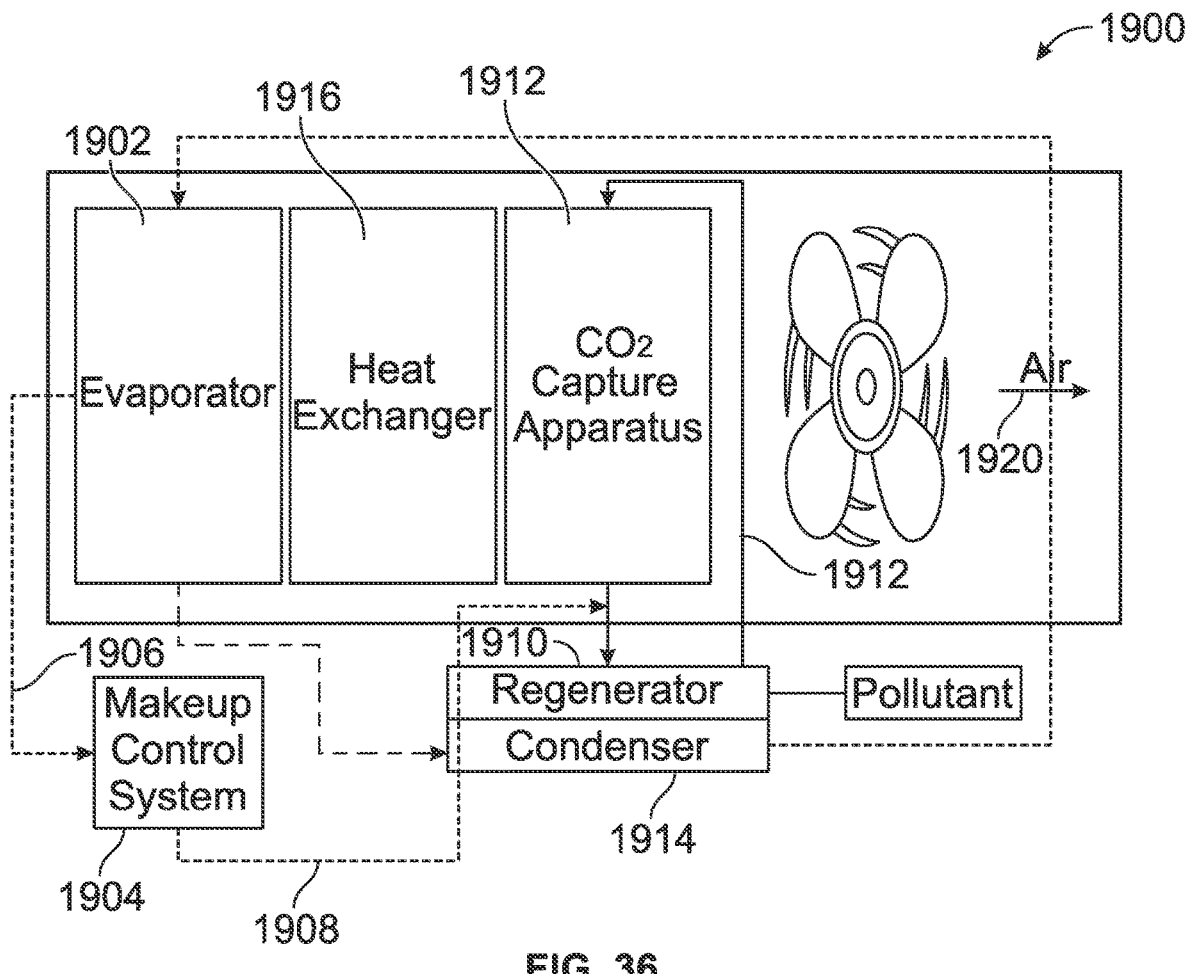
FIG. 36 is a schematic view of an air contactor having an evaporator at a temperature lower than the dewpoint temperature of the inlet sweepgas, the air contactor having a makeup control system to direct condensed water from the evaporator to an air pollutant capture solution regenerator.

With reference to FIG. 36, a heat pump 1900 is provided having an evaporator 1902 with a temperature that is lower than the dew point temperature. The heat pump 1900 further includes a makeup control system 1904 that directs collected water 1906 from the evaporator 1902 as makeup water 1908 to a regenerator 1910. The heat pump 1900 further includes a $CO_2$ capture apparatus 1912, a condenser 1914, and a heat exchanger 1916 intermediate the evaporator 1902 and the $CO_2$ capture apparatus 1912. In this embodiment, the $CO_2$ capture apparatus 1912 performs better with dry air. The temperature of the evaporator 1916 is less than the dry bulb temperature but is upstream of the $CO_2$ capture apparatus 1912. The evaporator 1916 reduces the relative humidity of the sweepgas 1920 (e.g., air) by increasing the dry bulb temperature of the air after the evaporator 1902 has removed water from the sweepgas 1920. Positioning the heat exchanger 1916 upstream of the $CO_2$ capture apparatus 1912 provides several advantages for some embodiments. First, the operation of the $CO_2$ capture apparatus 1912 may increase dry bulb temperature and/or wet bulb temperature of the sweepgas 1920 which may adversely affect the efficiency of a heat exchanger downstream of the $CO_2$ capture apparatus 1912. Second, the operation of the $CO_2$ capture apparatus 1912 may benefit from warmer air and the heat exchanger 1916 may compensate for cooling provided by the evaporator 1902. Third, the risk of solvent of the $CO_2$ capture apparatus 1912 being carried onto the heat exchanger 1916 is reduced.

Figure 37:
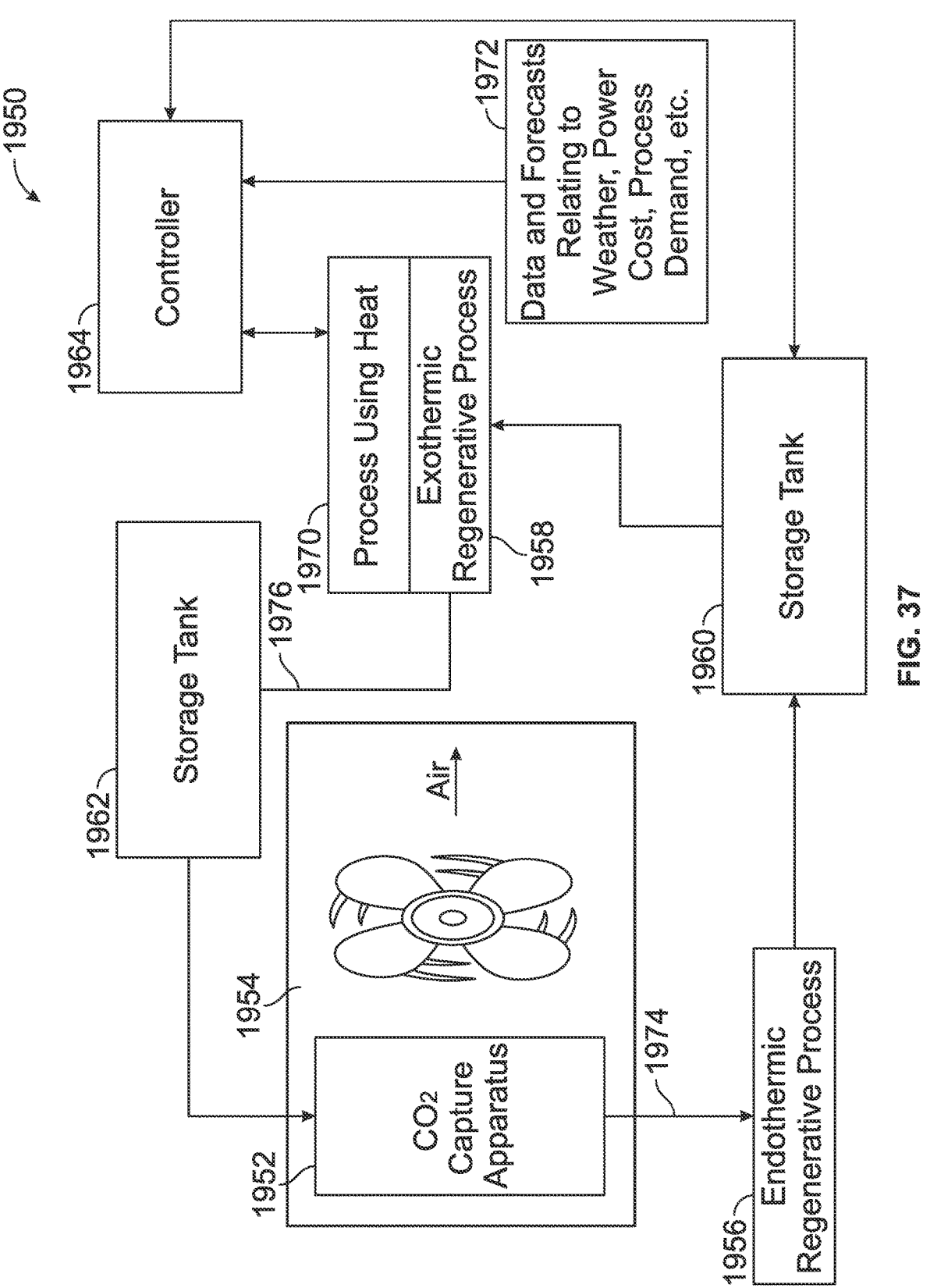
FIG. 37 is a schematic view of an air contactor having a controller operable to selectively release capture solution regeneration material from a storage tank to an endothermic regenerative process and provide heat to a process.

With reference to FIG. 37, an air contactor system 1950 is provided that includes a $CO_2$ capture apparatus 1952, a fan assembly 1954, an endothermic regenerative process 1956, an exothermic regenerative process 1958, and storage tanks 1960, 1962. The air contactor system 1950 includes a controller 1964 that operates the storage tank 1960 to selectively release one or more chemicals to the exothermic regenerative process 1958 to selectively provide heat to a process 1970 that utilizes the heat. For example, the controller 1964 may run the exothermic regenerative process 1958 at night to supply heat to the process 1970 which uses air source heat pumps during the day. As one example, the process 1970 may include district heating. The controller 1964 may receive data from a data source 1972 such as weather, power cost, process demand, or other information that is utilized by the controller 1964 to determine when to operate the exothermic regenerative process 1958.

For example, the carbon capture solution utilized by the $CO_2$ capture apparatus 1952 may be lye (NaOH) that will entrain carbon from the air and reacts with the air to form potassium carbonate. An output 1974 of the $CO_2$ capture apparatus 1952 includes a solution of flakes of potassium carbonate and solution. The endothermic regenerative process 1956 bakes the flakes at, for example, 900° C. The baked carbonate flakes are stored in the storage tank 1960 until the controller 1964 directs the storage tank 1960 to release the baked flakes into the exothermic regenerative process 1958. The exothermic regenerative process 1958 may involve, for example, adding water to the carbonate flakes. The water ($H_2O$) donates hydrogen atoms to the carbonate to provide a carbon capture solution at an output 1976 of the exothermic regenerative process 1958. Further, the combination of water and the carbonate flakes generates heat that is transferred to the process 1970. The carbon capture solution from the exothermic regenerative process is stored in the storage tank 1962 until needed by the $CO_2$ capture apparatus 1952. The controller 1964 may operate the storage tank 1962 to direct carbon capture solution to the $CO_2$ capture apparatus 1952 to recharge the $CO_2$ capture apparatus 1952 with fresh carbon capture solution.

Figure 38:
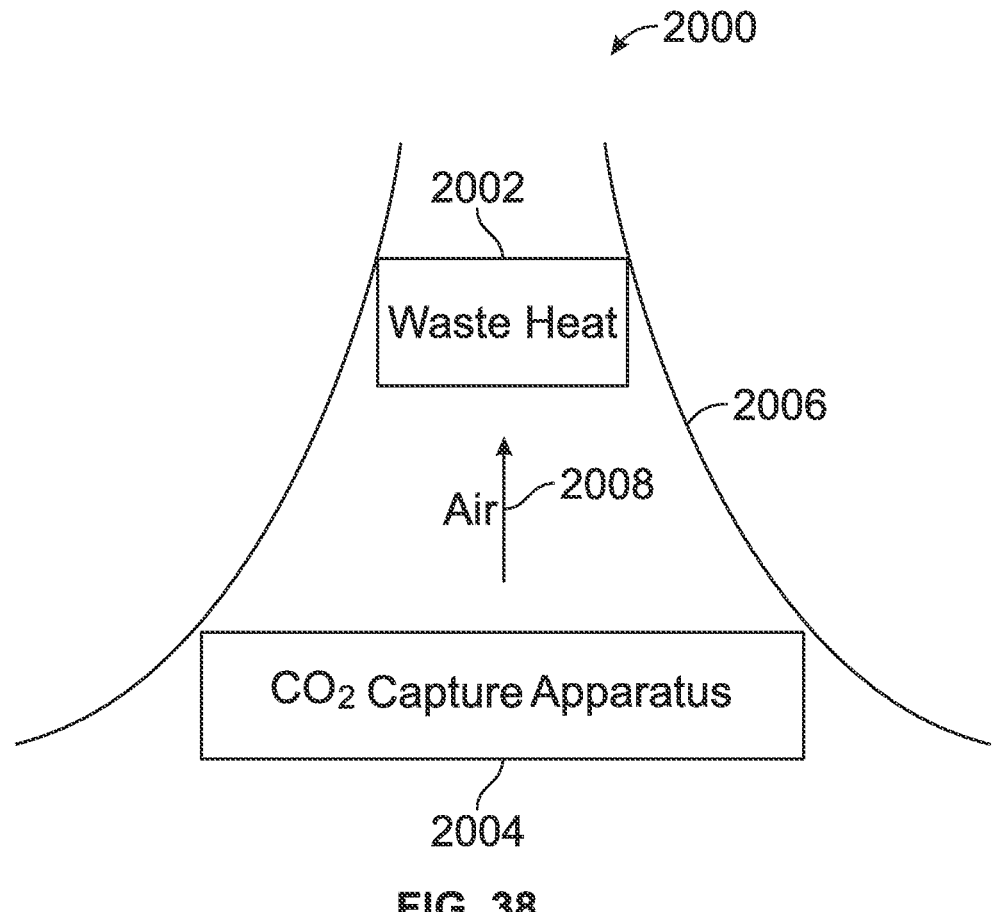
FIG. 38 is a schematic view of a hyperbolic cooling tower having a $CO_2$ capture apparatus and a waste heat source that generates airflow across the $CO_2$ capture apparatus due to the temperature-buoyancy effect.

With reference to FIG. 38, an air contactor 2000 is provided having an airflow generator such as a heat source 2002, a $CO_2$ capture apparatus 2004, and a hyperbolic outer structure 2006. The heat source 2002 may be, for example, waste heat from an industrial process or a geothermal heat source. The heating of sweep gas 2008 by the heat source 2002 moves air upwardly and through the hyperbolic outer structure 2006 due to the temperature-buoyancy effect of air. In this manner, the heat source 2002 operates as an air flow generator to cause movement of sweep gas across the sorper 2004. In this manner, the air contactor 2000 provides air flow across the $CO_2$ capture apparatus 2004 without having to power fans, although fans may be used in some applications.

With reference to FIGS. 39-43, an air pollutant capture system 2500 is provided that is similar in many respects to the embodiments discussed above. Some carbon capture systems include a regeneration process that is driven by heat. The heat is then dissipated into the atmosphere using a heat exchanger. The air pollutant capture system 2500 uses thermal energy storage to recover at least a portion of the heat utilized for regeneration and significantly reduces the amount of external heat to be provided into the system.

Figure 39:
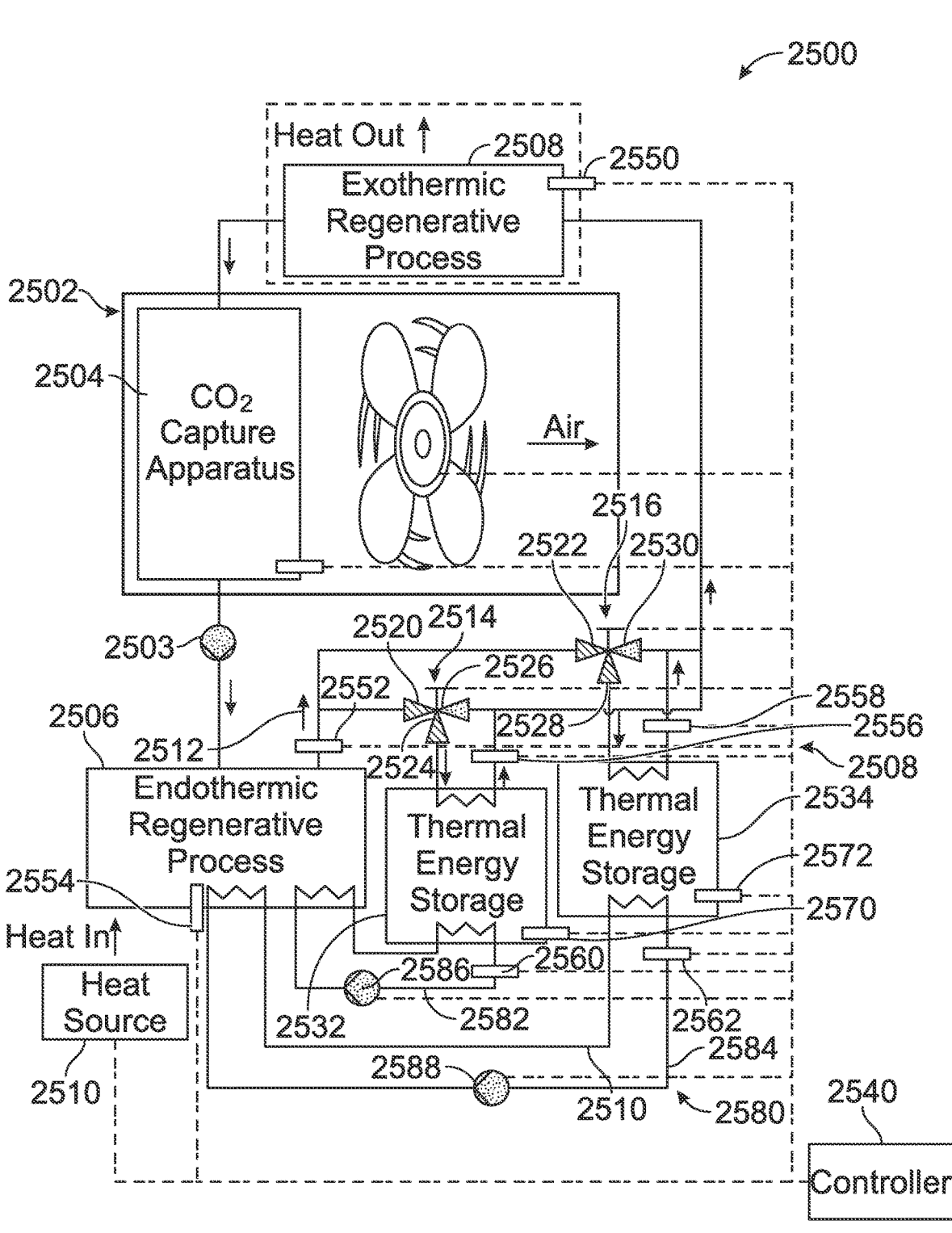
FIG. 39 is a schematic view of an air contactor system having thermal energy storage systems for selectively providing heat to an endothermic regenerative process, FIG. 39 showing the system in a charging mode wherein the endothermic process is powered by a heat source and the thermal energy storage systems are being charged.

More specifically and with reference to FIG. 39, the air pollutant capture system 2500 includes an air contactor 2502 having a $CO_2$ capture apparatus 2504 that utilizes a capture solution. The capture solution entrains an air pollutant, such as $CO_2$, via contact with the air. The capture solution may be circulated in the air contactor 2502 until the capture solution has a concentration of the air pollutant that is in excess of a predetermined threshold. The air pollutant capture system 2500 may include a pump 2503 for pumping the capture solution between the components of the air pollutant capture system 2500.

Once the capture solution has become saturated with the air pollutant, the capture solution is regenerated and the captured air pollutant is removed from the capture solution using an endothermic regenerative process 2506 and an optional exothermic regenerative process 2508. More specifically, some carbon capture mediums (solid or liquid) need increased temperature conditions to be regenerated. The output of the $CO_2$ capture apparatus 2504 may be, for example, carbon capture solution if the $CO_2$ capture apparatus 2504 utilizes a liquid capture solvent. Alternatively, the output of the $CO_2$ capture apparatus 2504 may be a heat carrying fluid such as $N_2$ gas if the $CO_2$ capture apparatus 2504 utilizes a solid sorbent.

The exothermic regenerative process 2508 may, in one form, simply be a cooling step of a liquid capture solvent. The air pollutant capture system 2500 may include intermediate operations between the endothermic regenerative process 2506 and the exothermic regenerative process 2508, such as the operations discussed above with respect to FIG. 7.

The endothermic regenerative process 2506 receives heat from a heat source 2510 and outputs regeneration material 2512 that is directed to one or more process controls, such as three-way valves 2514, 2516. An example of the endothermic regenerative process 2506 include the regeneration process for KOH; specifically, the regeneration of pellets in a calciner. For solid sorbents, zeolites and amines (and other materials) require higher temperatures to expel the molecules, etc. the solid sorbents have absorbed.

The regenerated material 2512 may be a liquid or a slurry for a capture system that utilizes a liquid solvent. For solid sorbents, the regenerated material 2512 may be a carrier fluid (e.g., gas) used to remove $CO_2$ from a solid sorbent.

The three-way valves 2514, 2516 have inlets 2520, 2522 and outlets 2524, 2526, 2528, 2530 that are selectively put in communication with one another to control flow of the regeneration material 2512 to the exothermic regenerative process 2508 and to thermal energy storages 2532, 2534. The thermal energy storages 2532, 2534 may include, for example, storage tanks. For example, the thermal energy storages 2532, 2534 may include a storage tank (e.g., made of metal and/or plastic) and contain one or more heat exchangers made of metal, plastic, and/or ceramic materials. The heat exchangers may include, for example, serpentine coils, pillow plate heat exchangers, plate heat exchangers, fin-tube heat exchangers, etc. The storage tanks of the thermal energy storages 2532, 2534 may be filled with water or another liquid for single-phase storage. The liquid may be under pressure so as not to exceed a boiling point, in one embodiment. Alternatively or additionally, the storage tanks of the thermal energy storages 2532, 2534 may be filed with a solid having high heat capacity (e.g., concrete or metal), or a phase change material with a temperature of fusion selected to closely match the process temperature. Example phase change materials include a molten metal, hydrated salt, paraffin, or bio-based phase change material (PCM).

The air pollutant capture system 2500 further includes a controller 2540 in communication with the components of the system 2500 that operates the various components of the system 2500 based upon data from sensors 2542. The sensors 2542 include temperature sensors 2550, 2552, 2554, 2556, 2558, 2560, 2562 for detecting a temperature of the regeneration material 2512. The sensors 2542 may measure, for example, flow rate, pH (such as for KOH or NaOH solvents), $CO_2$ concentration (e.g., if using a gaseous carrier fluid), pressure (positive pressure or vacuum), water content (e.g., if using an aqueous solution), and/or relative humidity (e.g., for a gaseous stream).

The sensors 2542 further include storage sensors 2570, 2572 to generate data indicative of the state of charge of the thermal energy storages 2532, 2534. The storage sensors 2570, 2572 may detect, for example temperature, level (e.g., volume in tank), and density. Phase change materials (PCMs) may have significant variations in density between solids and liquid states such that detecting the density of the PCM in the thermal energy storages 2532, 2534 may be used to determine the energy stored in the thermal energy storages 2532, 2534.

As an example with a PCM, the controller 2540 may determine the level of the PCM in the storage tank when the PCM is liquid or fully melted (0% charge) and when the PCM is solid or fully fused (100% charge). The controller 2540 may then interpolate between the levels of the PCM in real-time to get an indication of the instantaneous level of charge of the PCM.

Alternatively or additionally, the controller 2540 may use the temperature of the PCM to determine the charge of the PCM. For example, if fusion temperature is 80° F., the controller 2540 may utilize data from one or more of the sensors 2542 to estimate the charge level of the PCM. If the sensor 2542 detects a temperature of the PCM of approximately 80° F. and then the sensor 2542 begins detecting an increase in temperature, the controller 2540 may determine that the PCM has melted at the location of the sensor 2542. Conversely, if temperature drops from 90° F. gradually to around 80° F., and then remains constant (and possibly starts cooling very slowly below 80° F.), the controller 2540 may determine the PCM has melted at the location of the sensor 2542.

For single phase storage, the controller 2540 may determine charge level using temperature data from one or more sensors 2542. The controller 2540 correlates the level of charge based on the temperature difference between the storage media and the fluid to be heated/cooled. As the difference between the temperatures gets smaller (e.g., 2° F.), it may be increasingly difficult to charge and discharge the thermal storage up to a fully charged or fully discharged point. The controller 2540 may therefore operate the system to maintain a predetermined difference in temperatures between the storage media and the fluid to be heated or cooled.

The air pollutant capture system 2500 further includes thermal energy store thermal energy transfer circuits 2580 having conduits 2582, 2584 and discharge pumps 2586, 2588 to transfer heat between the thermal energy storages 2532, 2534 and the endothermic regenerative process 2506. In one embodiment, the heat transfer fluid is water, such as water under 212° F. In another embodiment, the heat transfer fluid is steam and the discharge pumps 2586, 2588 include a blower and/or compressor as some examples.

Different high temperature carrier fluids may be used to transfer heat between the thermal energy storages 2532, 2534 and the endothermic regenerative process 2506. In another embodiment, the endothermic regenerative process 2506 may take place in the tanks of the thermal energy storages 2532, 2534. An external heat source may be used to provide heat to the endothermic regenerative process 2506 in the tanks.

The air pollutant capture system 2500 has a regeneration and charging mode as shown in FIG. 39. The regeneration occurs in parallel with charging of the thermal energy storage 2532 and the thermal energy storage 2534. More specifically, the outlets 2526 and 2530 of the three-way valves 2514, 2516 are closed so that regeneration material 2512 from the endothermic regenerative process 2506 is directed to the thermal energy storages 2532, 2534. The regeneration material 2512 transfers heat from the regenerative material 2512 to the thermal energy storages 2532, 2534. The regenerative material 2512 is then directed from the thermal energy storages 2532, 2534 to the exothermic regenerative process 2508. The regenerative material 2512 undergoes an exothermic chemical reaction in the exothermic regenerative process 2508 before being directed to the $CO_2$ capture apparatus 2504.

Figure 40:
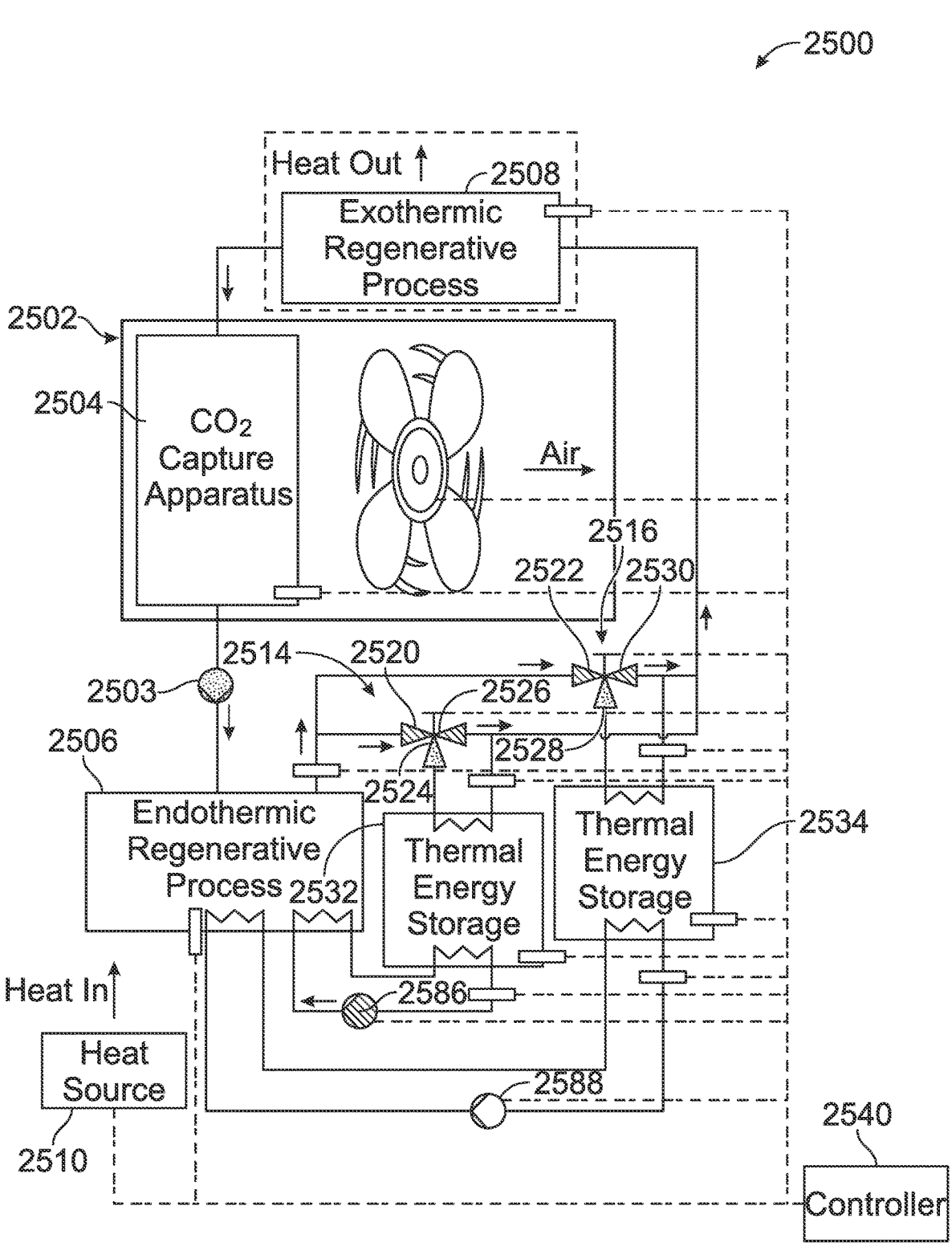
FIG. 40 is a view similar to FIG. 39 showing the system in a mode wherein one of the thermal energy storage systems is discharging heat to the endothermic regenerative process and the other thermal energy storage system is fully charged.

Regarding FIG. 40, the air pollutant capture system 2500 is shown in a regeneration, discharging, and storage mode. More specifically, the heat source 2510 provides supplemental heat if necessary but may not be the primary heat source for the endothermic reaction of the endothermic regenerative process 2506. Instead, the discharge pump 2586 is operated to transfer thermal energy from the thermal energy storage 2532 to the endothermic regenerative process 2506. Further, the outlet 2524 of the three-way valve 2514 is closed so that the regenerative material 2512 from the endothermic regenerative process 2506 is directed to the exothermic regenerative process 2508 rather than entering the thermal energy storage 2532.

In FIG. 40, the thermal energy storage 2534 is fully charged and is storing thermal energy. More specifically, the discharge pump 2588 is off so that the stored thermal energy of the thermal energy storage 2534 is not being supplied to the endothermic regenerative process 2506. Further, the outlet 2528 of the three-way valve 2516 is closed such that the regenerative material 2512 from the endothermic regenerative process 2506 is not directed to the thermal energy storage 2534 and instead travels to the exothermic regenerative process 2508.

Figure 41:
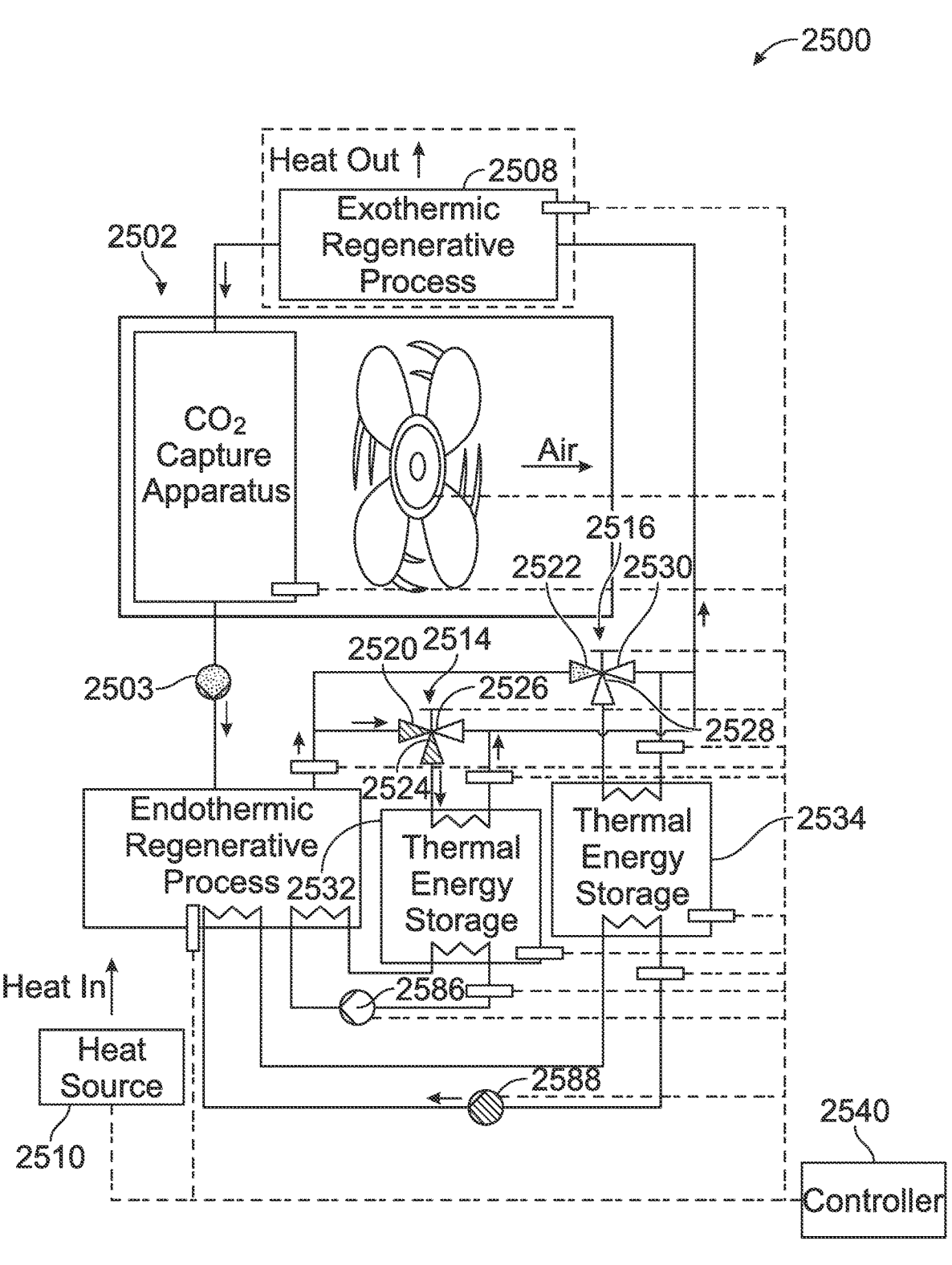
FIG. 41 is a view similar to FIG. 39 showing the system in a mode wherein the thermal energy storage system that was discharging in FIG. 40 is now being charged and the other thermal energy storage system is discharging heat to the endothermic regenerative process.

Regarding FIG. 41, the air pollutant capture system 2500 has a regenerating, charging, and discharge mode. The heat source 2510 provides supplemental heat if needed to the endothermic regenerative process 2506. The thermal energy storage 2534 is fully charged and the discharge pump 2588 is pumping stored thermal energy from the full thermal energy storage 2534 to the endothermic regenerative process 2506. The thermal energy storage 2532 has been exhausted, and the discharge pump 2586 has been turned off.

In FIG. 41, the outlet 2526 of valve 2514 is closed and the outlet 2524 is open to direct regenerative material 2512 into the storage 2532 to charge the storage 2532. The regenerative material 2512 travels from the storage 2532 to the exothermic regenerative process 2508. The inlet 2522 and outlets 2528, 2530 of the valve 2516 are closed to keep regenerative material 2512 from traveling to the storage 2534.

Figure 42:
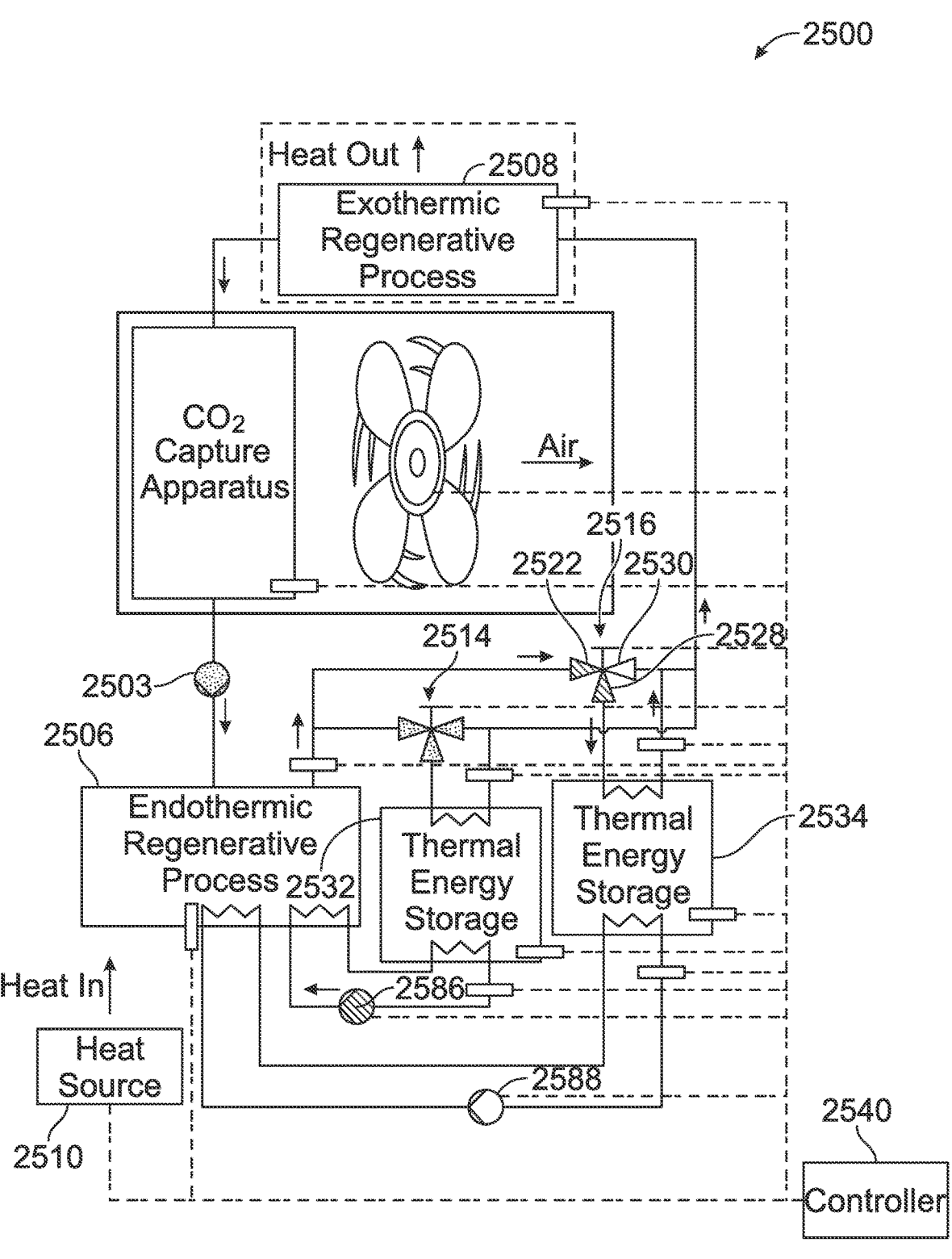
FIG. 42 is a view similar to FIG. 39 showing the system in a mode wherein the thermal energy storage system discharging heat to the endothermic regenerative process in FIG. 40 is again discharging heat, except that the other thermal energy storage system is now charging.

With reference to FIG. 42, the air pollutant capture system 2500 has a regenerating, discharge, and charging mode. The storage 2532 is fully charged and the pump 2586 directs stored thermal energy to the endothermic regenerative process 2506. The valve 2514 is closed to keep regenerative material 2512 from flowing into or out of the thermal storage 2532.

In FIG. 42, the thermal energy storage 2534 is being recharged. Specifically, the pump 2588 is off. The inlet 2522 and outlet 2528 of the three-way valve 2516 are opened to direct regenerative material 2512 toward the thermal energy storage 2534. The thermal energy storage 2534 absorbs heat from the regenerative material 2512, then the regenerative material 2512 is directed to the exothermic regenerative process 2508.

Figure 43:
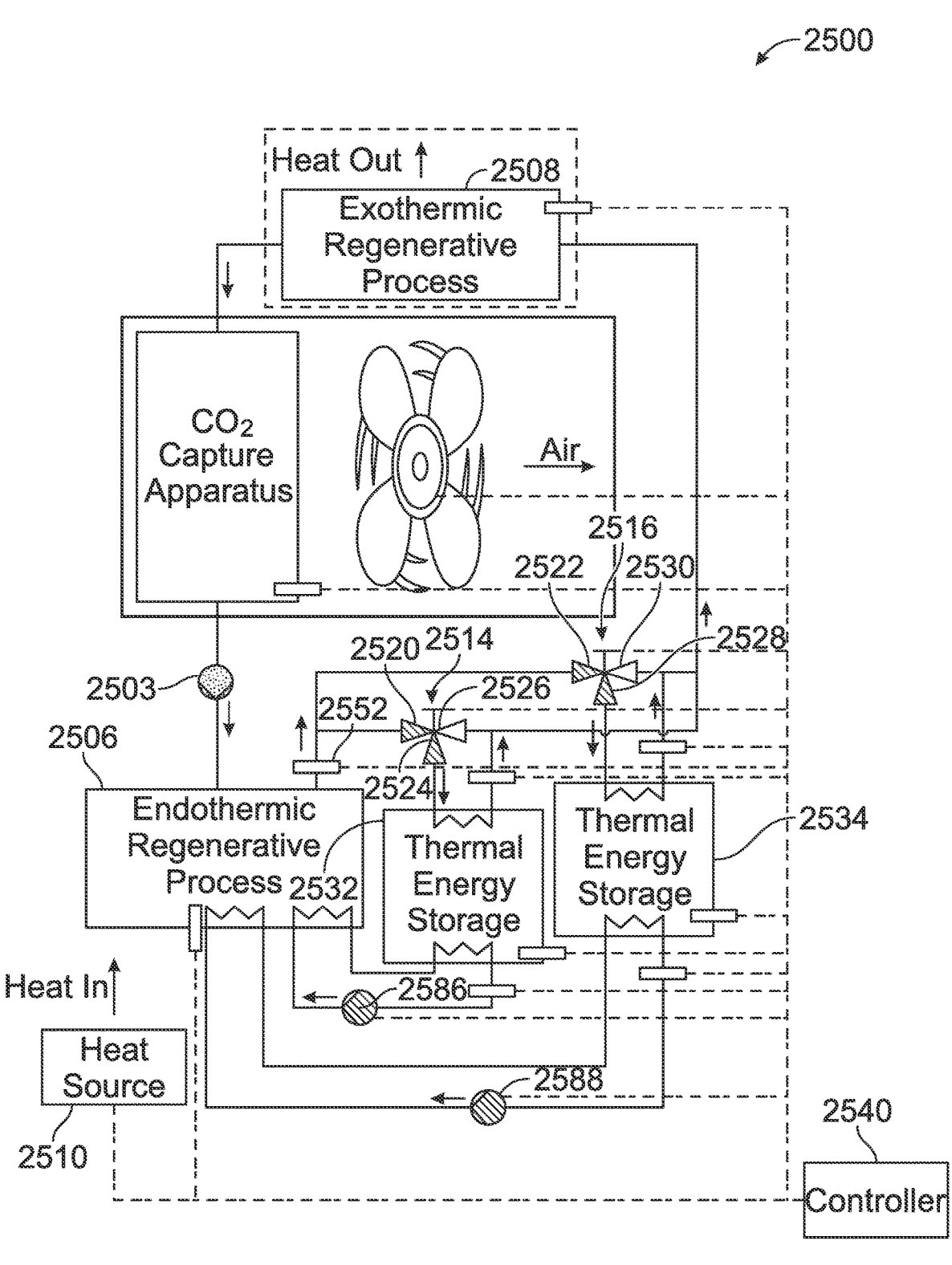
FIG. 43 is a view similar to FIG. 39 showing the system in a mode wherein both of the thermal energy storage systems are discharging heat to the endothermic regenerative process.

Regarding FIG. 43, the air pollutant capture system 2500 has a regeneration and a dual discharge mode. In this mode, the thermal energy storages 2532, 2534 are both discharging to provide heat to the endothermic regenerative process 2506. More specifically, the outlets 2526, 2530 of the three-way valves 2514, 2516 are closed while the inlets 2520, 2522 and outlets 2524, 2528 are open to permit the regenerative material to flow from the endothermic regenerative process 2506 to the thermal energy storages 2532, 2534. Further, the discharge pumps 2586, 2588 are being operated to transfer stored thermal energy from the thermal energy storages 2532, 2534 to the endothermic regenerative process 2506.

The controller 2540 may switch between the various modes of operation of the air pollutant capture system 2500 based upon data from the various sensors 2542. For example, the controller 2542 may charge one thermal energy storage 2532 while discharging the other thermal energy storage 2534 so that there is at least one thermal energy storage 2532, 2534 providing stored thermal energy to the endothermic regenerative process 2506 to reduce the external heat from the heat source 2510.

Figure 44:
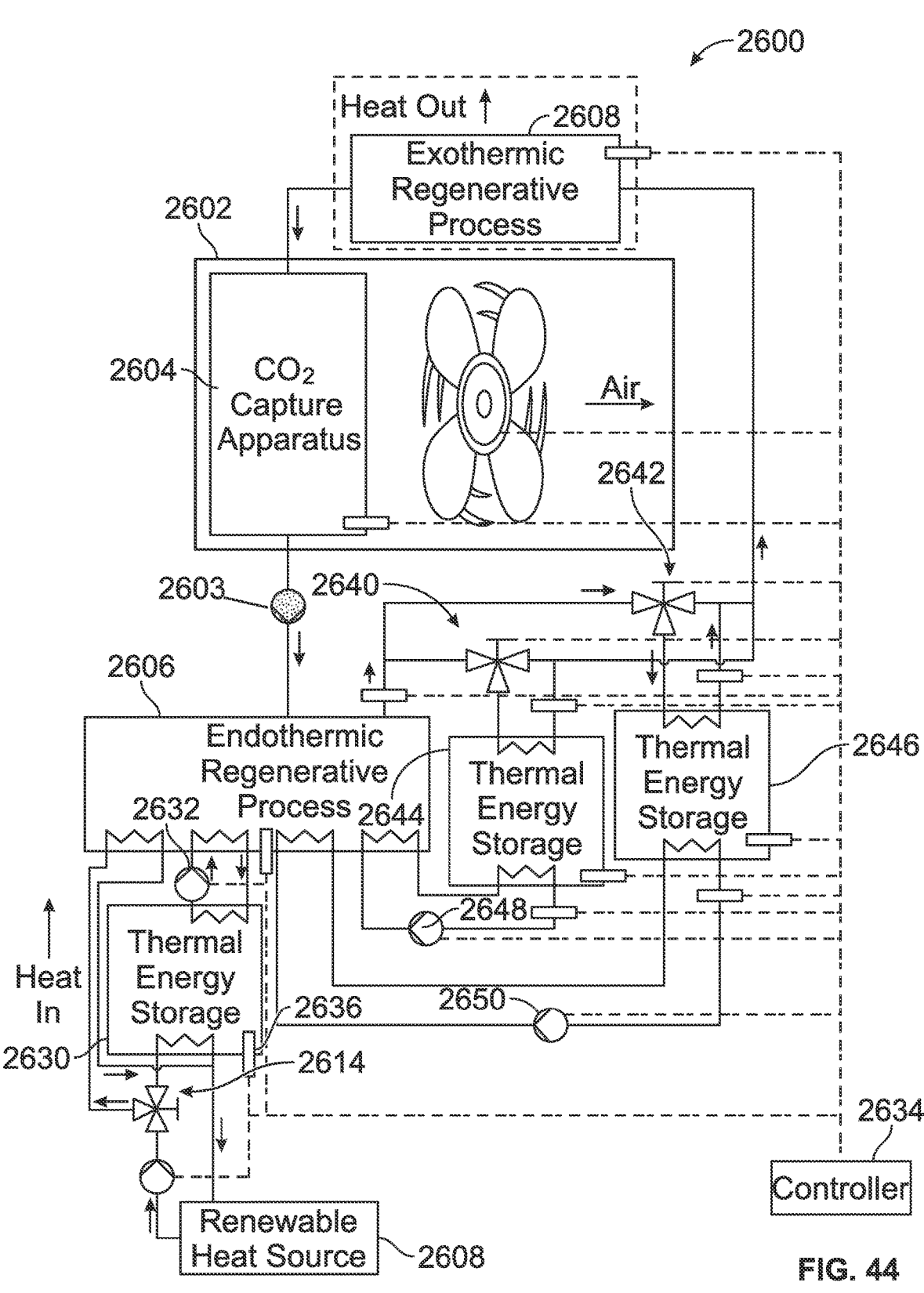
FIG. 44 is a schematic view of an air contactor system having an intermittent renewable heat source for providing heat to an endothermic regenerative process and a thermal energy storage for storing thermal energy for time periods when the renewable heat source is not available.

With reference to FIG. 44, an air pollutant capture system 2600 is provided that is similar in many respects to the air pollutant capture system 2500 discussed above. The air pollutant capture system 2600 includes an air contactor 2602 having a $CO_2$ capture apparatus 2604, a pump 2603, an endothermic regenerative process 2606, and an optional exothermic regenerative process 2608. The exothermic regenerative process 2608 may not be utilized for some air pollutant capture techniques.

The air pollutant capture system 2600 includes an intermittent renewable heat source 2608, such as concentrated solar power or wind power as some examples. The air pollutant capture system 2600 includes a discharge pump 2610 for circulating a heat exchange fluid 2612, such as water, to a valve 2614 that controls the flow of the heat exchange fluid 2612 to either the endothermic regenerative process 2602 or a thermal energy storage 2630. The heat exchange fluid 2612 may be, for example, water, steam, oil, molten salts, liquid metals, nanoparticles, and/or a slurry.

The valve 2614 has an inlet 2616, an outlet 2618 to direct fluid to the exothermic regenerative process 2606, and an outlet 2620 to direct fluid to the thermal energy storage 2630. The thermal energy storage 2630 is configured to store thermal energy for use by the endothermic regenerative process 2606 when the removable heat source 2608 is unavailable, such as night for the example of concentrated solar power.

The air pollutant capture system 2600 includes a discharge pump 2632 for pumping a heat exchange fluid from the thermal energy storage 2630 to the endothermic regenerative process 2602 as requested by a controller 2634 of the air pollutant capture system 2600. The controller 2634 may be operably connected to a sensor 2636 of the thermal energy storage 2630 to determine the capacity of the thermal energy storage 2630. The controller 2634 is also operatively connected to the discharge pumps 2610, 2632 and valve 2614.

The thermal energy storage 2630 may be charged when the removable heat source 2608 is providing heat such as by the controller 2634 operating the valve 2614 to close the outlet 2618, opening the inlet 2616 and the outlet 2620, and operating the pump 2610 to direct heat transfer fluid to the thermal energy storage 2630.

In another example, the renewable heat source 2608 may provide heat to both the thermal energy storage 2630 and the endothermic regenerative process 2606. More specifically, the controller 2634 operates the valve 2614 to open the inlet 2616, outlet 2618, and outlet 2620 and operates the pump 2610 to direct heat transfer fluid from the renewable heat source 2608 to both the endothermic regenerative process 2606 and the thermal energy storage 2630.

When the thermal energy storage 2630 is fully charged, the controller 2634 may operate the valve 2614 to close the outlet 2620 while leaving the inlet 2612 and outlet 2618 open. The pump 2610 continues to direct heat exchange fluid to the endothermic regenerative process 2606.

The air pollutant capture system 2600 also includes valves 2640, 2642 and thermal energy storages 2644, 2646, and discharge pumps 2648, 2650 that permit storage and discharge of thermal energy to the endothermic regenerative process 2606 as desired.

In one embodiment, the $CO_2$ capture apparatus 2604 includes a solid sorbent and the pump 2603 directs a carrier gas (e.g., $N_2$ or steam) to the endothermic regenerative process 2606. The solid sorbent may be heated by the carrier gas or another heat source in the $CO_2$ capture apparatus 2604. Alternatively or additionally, a vacuum may be utilized to remove the air pollutant from the solid sorbent of the $CO_2$ capture apparatus 2604. In yet another embodiment, $N_2$ gas is provided from a pressurized container to the $CO_2$ capture apparatus 2604 rather than using a pump to direct the $N_2$ gas.

Figure 45:
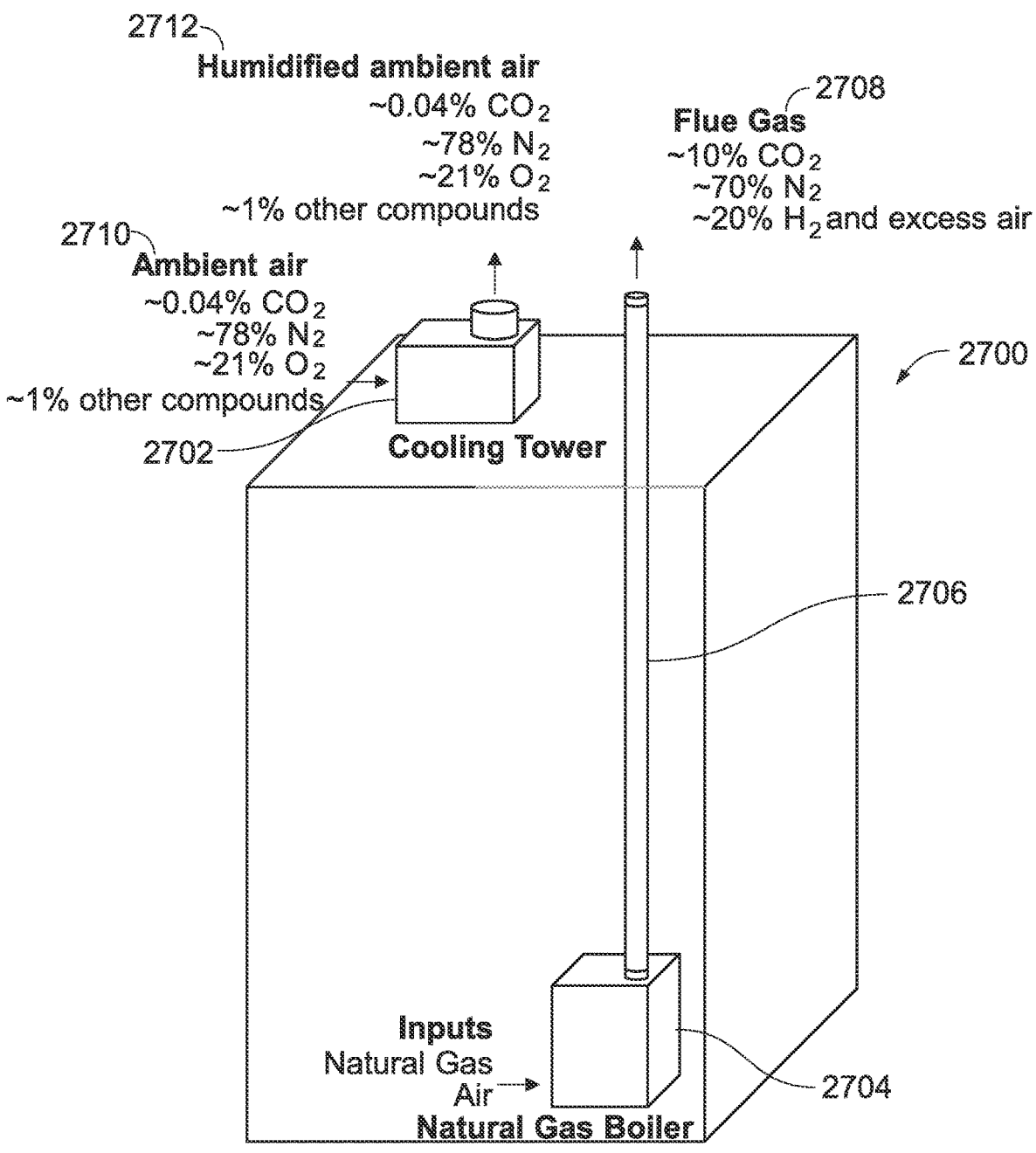
FIG. 45 is a schematic view of a building having a natural gas boiler and a cooling tower.

With reference to FIG. 45, a building 2700 is shown that has a cooling tower 2702 and a natural gas boiler 2704. The natural gas boiler 2704 has a flue 2706 that emits a flue gas 2708 within a $CO_2$ concentration of approximately ten percent. The cooling tower 2702 draws in ambient air 2710 and discharges humidified ambient air 2712. As shown in FIG. 45, the flue gas has a significantly higher concentration of $CO_2$ than the humidified air exiting the cooling tower 2702.

Regarding FIG. 46, a point source capture and direct air capture system 2800 is provided for a building 2801. The system 2800 includes an air contactor 2802 with a heat exchanger, such as a wet heat exchanger, to transfer heat between ambient air 2804 and a process fluid. The air contactor 2802 also includes a $CO_2$ capture system 2806 that captures $CO_2$ from the ambient air. For example, the $CO_2$ capture system 2806 may utilize one of the solvent-based or other $CO_2$ capture approaches discussed herein. The air contactor 2802 discharges a $CO_2$ rich gas stream 2815 having a higher $CO_2$ concentration than the ambient air.

The system 2800 includes a $CO_2$ scrubber such as a boiler flue gas carbon capture system 2810 that is configured to remove $CO_2$ from a flue gas 2819 exiting a boiler 2814. For example, the flue gas 2819 exiting the boiler 2814 has a $CO_2$ content of approximately ten percent, while flue gas 2812 exiting the building 2801 has a $CO_2$ content of approximately one percent. The boiler 2814 may be a natural gas or coal fire process as used in various commercial, residential, and/or industrial buildings.

The system 2800 further includes an ambient air source 2820 and an ambient air mixer 2817 that introduces ambient air into the $CO_2$ rich gas stream 2815 to reduce the $CO_2$ concentration of the $CO_2$ rich gas stream 2815 to a concentration that matches a $CO_2$ concentration of the flue gas 2815 exiting the boiler 2814. The ambient air mixer 2817 may include, for example, a fan, a valve, louvers, an actuator, a motor, and/or movable ducting to selectively direct ambient air into the $CO_2$ rich gas stream 2815.

The system 2800 operates the ambient air mixer 2817 to cause the $CO_2$ rich gas stream 2815 to have a similar $CO_2$ concentration as the flue gas 2819 leaving the boiler 2814 to permit the boiler flue gas carbon capture system 2810 to remove $CO_2$ from both the $CO_2$ rich gas stream 2815 and the flue gas 2819. The boiler flue gas carbon capture system 2810 can use the same chemical process to remove $CO_2$ from the $CO_2$ rich gas stream 2815 and the flue gas 2819 due to the similar $CO_2$ concentration in the flue gas 2819 and the $CO_2$ rich gas stream 2815. In this manner, the air contactor 2802 may be retrofit onto a building 2801 having the boiler flue gas carbon capture system 2810 to add ambient air carbon capture ability to the building 2801.

Matching $CO_2$ concentrations may facilitate a high efficiency of $CO_2$ removal from both flue gas 2819 and $CO_2$ rich gas stream 2815 working with separation, purification, and liquefaction processes that have an expected $CO_2$ and $N_2$ concentration. In one embodiment, the air contactor 2802 utilizes a solid sorbent and $N_2$ gas discharged from the air contactor 2802 as the carrier gas for captured $CO_2$ rather than ambient air 2820.

The boiler flue gas carbon capture system 2810 removes $CO_2$ from the flue gas 2819 by diverting the flue gas 2812 via a conduit 2830 from the flue 2831 into the system 2810. The system 2810 also receives the $CO_2$ rich exhaust gas 2815 via conduit 2833. Next, the system 2810 separates the $CO_2$, nitrogen, and oxygen. The $CO_2$ is converted to liquid $CO_2$ 2822 and is collected such as in a tank.

In one embodiment, the $CO_2$ rich gas stream 2815 may have a $CO_2$ concentration that already matches the $CO_2$ content of the flue gas 2819 such that ambient air is not added to the $CO_2$ rich gas stream 2815. The ambient air mixer 2817 may not be provided in this embodiment. Alternatively, the ambient air mixer 2817 have a $CO_2$ sensor that detects the similar $CO_2$ concentrations and inhibits the addition of ambient air to the $CO_2$ rich gas stream 2815.

Air Contactor Design Optimization

For some embodiments, there are a few design parameters that can be optimized to improve the $CO_2$ capture performance of the air contactor and decrease operating cost and equipment costs. These design parameters include:

| Primary Design Parameter | Secondary Design Parameter |
|---|---|
| Materials of construction | |
| Construction mechanism, i.e., whether field erected or factory assembled | |
| Packing | Material of construction |
| | Shape - simplified to surface area per unit volume |
| | Pressure drop |
| | Height |
| | Depth |
| Unit layout | Width |
| | Height |
| | Fan position and number of fans |

-continued

| Primary Design Parameter | Secondary Design Parameter |
| --- | --- |
| Operating air flow rate | |
| Operating solvent flow rate | |
| Liquid solvent type | |

One approach to optimizing design of air contactors utilizes a "coarse" set of assumptions, namely focusing on volume of packing (assumed to be the most expensive part of the equipment) and a rate of energy consumed per given amount of $CO_2$ captured.

A more detailed approach to optimizing design of air contactors includes operating costs (pumping power, solvent and water costs, among others) and a net $CO_2$ capture rate. This more detailed approach may indicate that the air contactor equipment itself carries a negative carbon "charge" from its production, installation, use, and end of life (i.e., embodied carbon). Further, the operation of the equipment itself may result in $CO_2$ emissions from energy, water, and solvent consumption perspectives.

The net rate of carbon capture may therefore calculated as follows:

$$\dot{m}_{CO_{2,net}} = \dot{m}_{CO_{2,captured}} - m_{CO_{2,embodied}} / t_{lifetime} - \dot{m}_{CO_{2,operating}} \qquad [\text{Eq. 1}]$$

Where $\dot{m}_{CO_{2,net}}$ is the net rate of $CO_2$ captured in kg/s, $\dot{m}_{CO_{2,captured}}$ is the average rate of $CO_2$ captured in kg/s (to be estimated using test data, fundamental mass transfer models, and/or numerical simulation), $m_{CO_{2,embodied}}$ is the mass of embodied $CO_2$ of the equipment in kg, $t_{lifetime}$ is the expected operating life of the equipment in seconds, and $\dot{m}_{CO_{2,operating}}$ is the rate of $CO_2$ emitted from the operation of the equipment in kg/s.

The rate of $CO_2$ emissions from operation is defined as follows:

$$\dot{m}_{CO_{2,operating}} = ((\text{Fan Power} + \text{Pump Power}) \times \text{Electricity Carbon Intensity}) + (\text{Water Consumption} \times \text{Water Carbon Intensity}) + (\text{Solvent Consumption} \times \text{Solvent Carbon Intensity}) \qquad [\text{Eq. 2}]$$

Where Fan Power and Pump Power are in kW (to be estimated using test data, fan and pump manufacturer data, fundamental air and liquid flow models, and/or a numerical simulation), electricity carbon intensity is in $kgCO_2/kW$, water consumption is in kg/s and defined as the sum of the water evaporation rate in kg/s (to be estimated using test data, fundamental heat and mass transfer models, and/or numerical simulation), and the water drift rate in kg/s (defined as overall drift rate in kg/s multiplied by the mass fraction of water in the solution in kg/kg), water carbon intensity is in $kgCO_2/kg$, solvent consumption is in kg/s, and defined as the sum of the solvent renewal rate in kg/s (i.e., assuming the solvent will not last the entire lifetime of the unit, and will have to be "refreshed") and the solvent drift rate in kg/s (defined as overall drift rate in kg/s multiplied by the mass fraction of solvent in the solution in kg/kg). The solvent carbon intensity is in $kgCO_2/kg$.

A given contactor design may include electricity generation (e.g., heat recovery and reuse, solar photovoltaics (PV)), in which case the rate of $CO_2$ emissions from operation would be defined as follows:

$$\dot{m}_{CO_{2,operating}} = ((\text{Fan Power} + \text{Pump Power} - \text{Power Generation}) \times \text{Electricity Carbon Intensity}) + (\text{Water Consumption} \times \text{Water Carbon Intensity}) + (\text{Solvent Consumption} \times \text{Solvent Carbon Intensity}) \qquad [\text{Eq. 3}]$$

With power generation in kW, assumed to be net power generated, as the generation device may itself consume energy. In some cases, power generation may be greater than power consumption, which could mean that power could be sold and/or utilized in other areas of the carbon capture facility.

Similarly, a contactor design may include embedded water generation equipment (e.g., dehumidification of inlet and/or discharge air streams), in which case the rate of $CO_2$ emissions from operation would be defined as follows:

$$\dot{m}_{CO_{2,operating}} = ((\text{Fan Power} + \text{Pump Power} + \text{Water Generation Power}) \times \text{Electricity Carbon Intensity}) + ((\text{Water Consumption} - \text{Water Generation}) \times \text{Water Carbon Intensity}) + (\text{Solvent Consumption} \times \text{Solvent Carbon Intensity}) \qquad [\text{Eq. 4}]$$

With water generation power in kW, and water generation in kg/s. In some cases, water generation may be greater than water consumption, which could mean that water could be sold and/or utilized in other areas of the carbon capture facility.

In one approach, air contactor design is optimized using the following optimization criteria or figures of merit (FOMs): Cost of capture (CoC—in $USD/kgCO_2$); Water intensity of capture (WIoC—in $kgwater/kgCO_2$); Energy intensity of capture (EIoC—in $kJ/kgCO_2$), and Footprint of capture (FoC—in $1/kgCO_2$). These optimization criteria are each discussed in greater detail below.

Cost of Capture (CoC—in $USD/kg_{CO2}$)

The cost of capture may be calculated using the following equation:

$$CoC = \frac{(\text{Capital Cost}/t_{lifetime} + \text{Operating Cost})}{(\dot{m}_{CO_{2,net}})} \qquad [\text{Eq. 5}]$$

Where Capital Cost is total installed cost of the equipment, including maintenance (and possibly decommissioning) in USD, and operating cost is defined as:

$$\text{Operating Cost} = ((\text{Fan Power} + \text{Pump Power}) \times \text{Electricity Cost}) + (\text{Water Consumption} \times \text{Water Cost}) + (\text{Solvent Consumption} \times \text{Solvent Cost}) \qquad [\text{Eq. 6}]$$

Where electricity cost in USD/kW, water cost is in USD/kg, and the solvent cost is in USD/kg. A given contactor design may include electricity generation (e.g., heat recovery and reuse, solar PV), in which case the operating cost would be defined as follows:

$$\text{Operating Cost} = ((\text{Fan Power} + \text{Pump Power} - \text{Power Generation}) \times \text{Electricity Cost}) + (\text{Water Consumption} \times \text{Water Cost}) + (\text{Solvent Consumption} \times \text{Solvent Cost}) \qquad [\text{Eq. 7}]$$

Similarly, a contactor design may include embedded water generation equipment (e.g., dehumidification of inlet and/or discharge air streams), in which case the operating cost would be defined as follows:

$$\text{Operating Cost} = ((\text{Fan Power} + \text{Pump Power} + \text{Water Generation Power}) \times \text{Electricity Cost}) + ((\text{Water Consumption} - \text{Water Generation}) \times \text{Water Cost}) + (\text{Solvent Consumption} \times \text{Solvent Cost}) \qquad [\text{Eq. 8}]$$

Water Intensity of Capture (WIoC—in $kg_{water}/kg_{CO2}$)

The water intensity of capture may be determined using the following equation:

$$WIoC = \frac{(\text{Water Consumption})}{(\dot{m}_{CO_{2,net}})} \qquad [\text{Eq. 9}]$$

Where water consumption is in kg/s and is defined as the sum of the water evaporation rate in kg/s (which may be estimated using test data, fundamental heat and mass transfer models, numerical simulation, or a combination of each), and the water drift rate in kg/s (defined as overall drift rate in kg/s multiplied by the mass fraction of water in the solution in kg/kg). Water consumption may include in situ water generation, as presented in an earlier paragraph.

Another expression of water intensity could include the water intensity of the power generation process, in which case the water intensity of capture would be defined as followed:

$$WIoC = \frac{\text{(Water Consumption + }}{\text{(Power Consumption} \times \text{Grid Water Intensity))}}{(\dot{m}_{CO_2,net})}$$ [Eq. 10]

Where power consumption is in kW, and defined as one of the ways presented in an earlier paragraph, and the grid water intensity is in kg/kW.

Energy Intensity of Capture (EIoC—in kJ/kg$_{CO2}$)

The Energy intensity of capture may be defined using the following equation:

$$EIoC = \frac{\text{(Power Consumption)}}{(\dot{m}_{CO_2,net})}$$ [Eq. 11]

Where power consumption is in kg/s and defined as the sum of the power consumption of the fans and pumps (and ancillary equipment as defined in an earlier paragraph). Power consumption may include in situ water generation, as presented in an earlier paragraph.

Another expression of energy intensity could include the power consumption of the water production process, in which case the energy intensity of capture would be defined as followed:

$$EIoC = \frac{\text{(Power Consumption + (Water Consumption} \times}{\text{Water Production Energy Intensity))}}{(\dot{m}_{CO_2,net})}$$ [Eq. 12]

Where water consumption is in kg/s and defined as one of the ways presented in an earlier paragraph, and the water production energy intensity is in kW/kg.

Design Optimization

The optimal design for a particular embodiment will be the one satisfying one of the following equations, depending on the preferred optimization target(s):

Optimal Design=min(CoC$_{Design\ 1}$,CoC$_{Design\ 2}$, CoC$_{Design\ 3}$, . . . ,CoC$_{Design\ n}$) [Eq. 13]

Optimal Design=min(WIoC$_{Design\ 1}$, WIoC$_{Design\ 2}$,WIoC$_{Design\ 3}$, . . . ,WIoC$_{Design\ n}$) [Eq. 14]

Optimal Design=min(EIoC$_{Design\ 1}$, EIoC$_{Design\ 2}$,EIoC$_{Design\ 3}$, . . . ,EIoC$_{Design\ n}$) [Eq. 15]

In one approach, optimization may be based on a given optimization parameters, but with "not to exceed" thresholds for one or both of the remaining optimization parameters. For example, it may be desirable to minimize CoC, but ensure that WIoC<2.5 kg$_{water}$/kg$_{CO2}$, and EIoC<2e^3 kJ/kgCO$_2$.

Footprint of Capture (FoC—in 1/kg$_{CO2}$)

One design optimization approach may include weighing factors A, B, and C based on specific regulatory requirements, design philosophy, or other criteria of interest, and defining an overall footprint of capture as follows:

FoC=A×CoC+B×WIoC+C×EIoC [Eq. 16]

Where A is in 1/US dollars, B in 1/kg$_{water}$, and C in 1/kJ.

The optimal design will thus be one satisfying the following equation:

Optimal Design=min(FoC$_{Design\ 1}$,FoC$_{Design\ 2}$, FoC$_{Design\ 3}$, . . . ,FoC$_{Design\ n}$) [Eq. 17]

Figure 47:
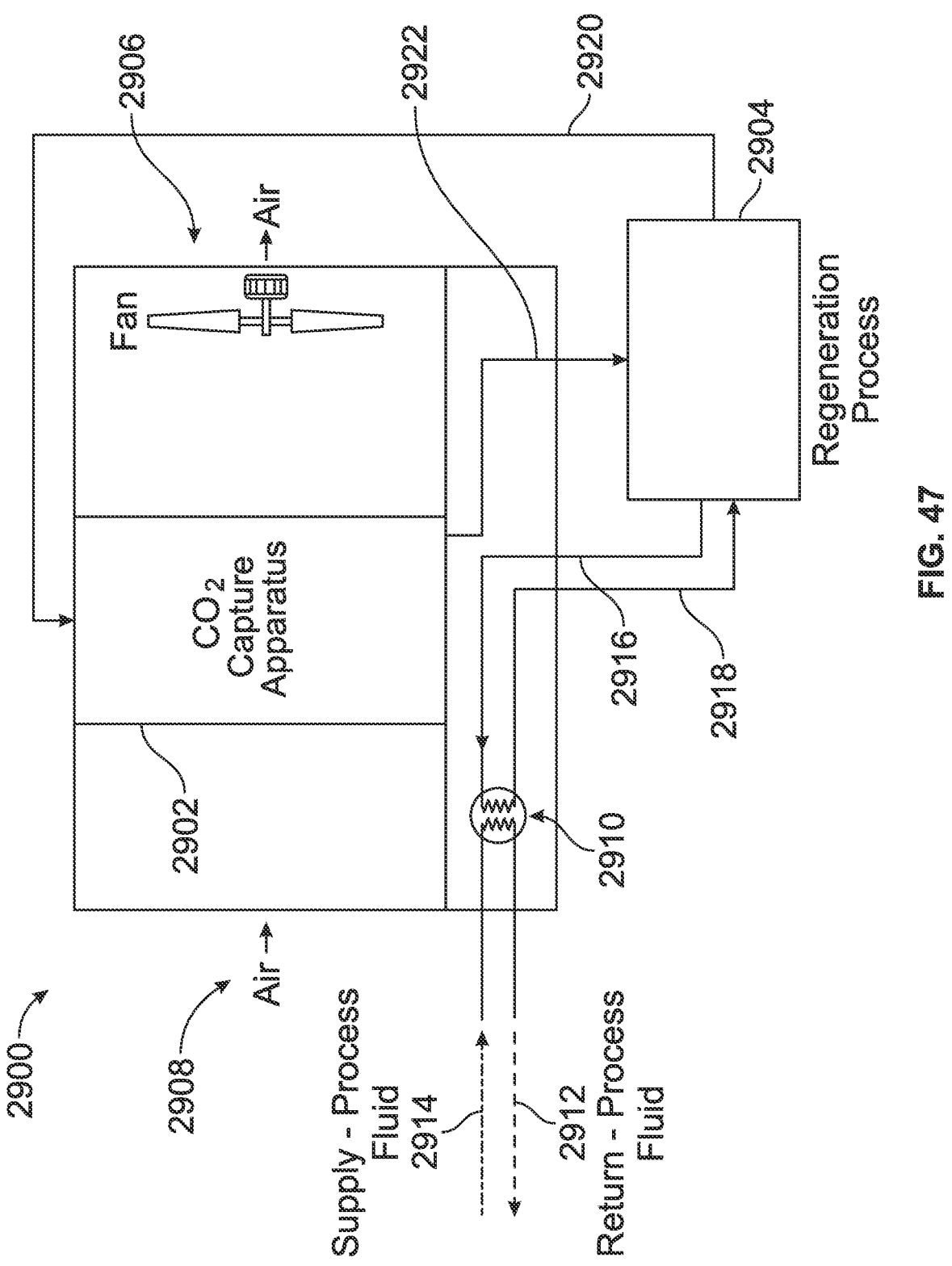
FIG. 47 is a schematic view of an air contactor having a heat exchanger for a carbon capture regeneration process outside of an air path of the air contactor.

With reference to FIG. 47, an air contactor 2900 is provided having a carbon capture apparatus 2902 and a regeneration process 2904 for regenerating the carbon capture apparatus 2902 such as by removing carbon from a carbon capture solution. In another embodiment, the carbon capture apparatus 2902 may include a solid sorbent capture apparatus and the regeneration process 2904 removes CO$_2$ from a carrier gas used to remove CO$_2$ from the solid sorbent capture apparatus.

The air contactor 2900 has a fan assembly 2906 that generates a flow of air 2908 through the air contactor 2900 and through the carbon capture apparatus 2902. The air contactor 2900 is similar to the air contactor of FIG. 35, however the air contactor 2900 has a heat exchanger 2910 out of the path of the air 2908 as the air 2908 travels through the air contactor 2900. In some embodiments, the heat exchanger 2910 outside of the air path may reduce energy consumption by lowering the pressure drop of air through the air contactor 2900. The heat exchanger 2910 receives hot process fluid 2912 and returns cooled process fluid 2914. The heat exchanger 2910 exchanges heat between hot process fluid 2912 and a regeneration fluid 2916. The regeneration fluid 2916 may include, for example, a fluid (e.g., water) to provide heat to the regeneration process 2904 and/or carbon capture solution that is heated by the heat exchanger 2910. The heat exchanger 2910 returns regeneration fluid 2918 back to the regeneration process 2904. The regeneration process 2904 utilizes heat from the heat exchanger 2910 to refresh or remove carbon from capture fluid 2922. The regeneration process 2904 directs regenerated capture fluid 2920 to the carbon capture solution 2902, wherein the regenerated capture fluid 2920 has a lower carbon content than capture fluid 292. The regeneration process 2904 stores or outputs the carbon removed from the capture fluid 2922. As discussed above, the capture solution 2922 may be continuously or intermittently directed from the carbon capture apparatus 2902 to the regeneration process 2904.

Figure 48:
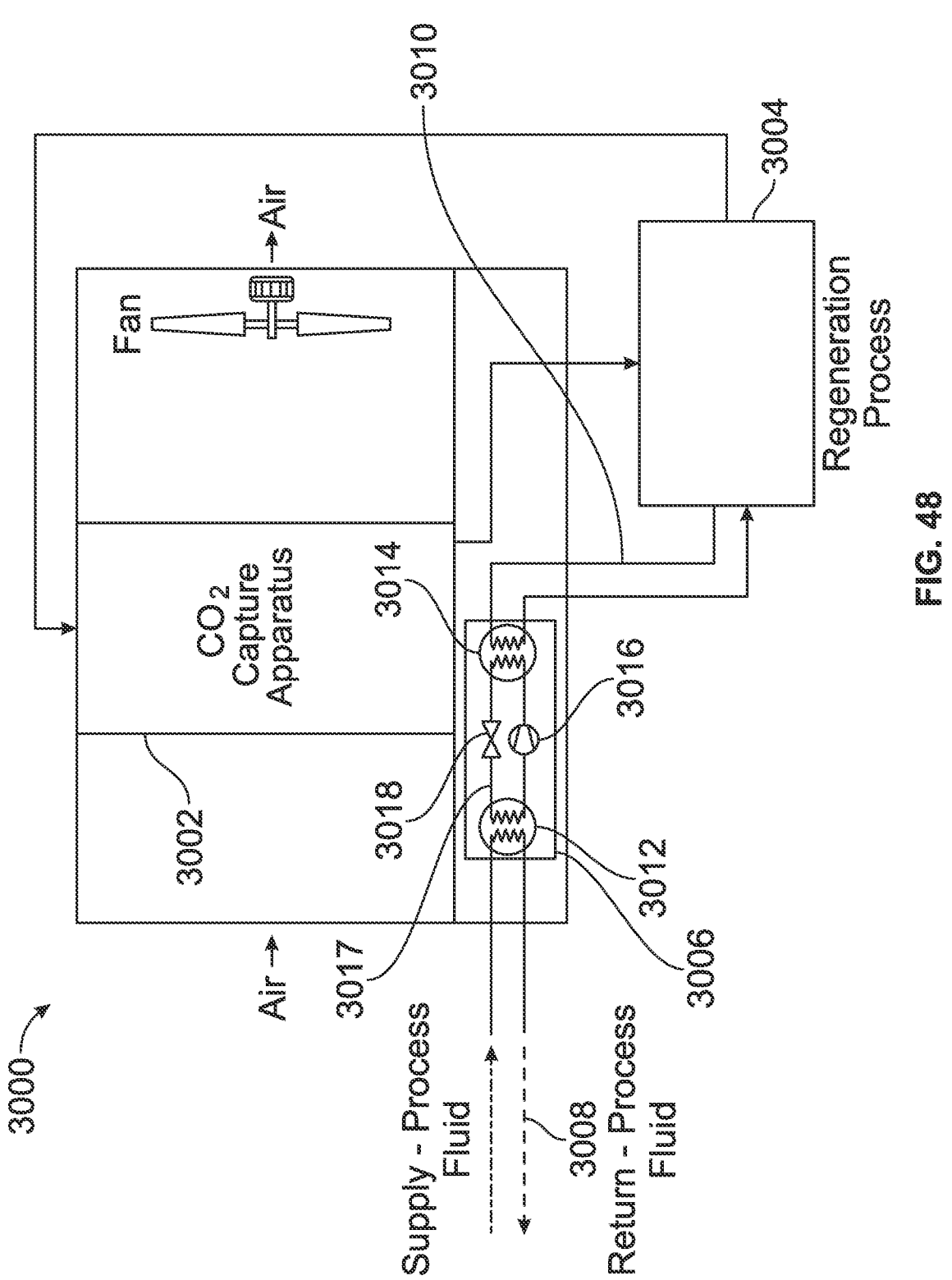
FIG. 48 is a schematic view of an air contactor having a heat pump for transferring heat from a process fluid to a carbon capture regeneration process.

With reference to FIG. 48, an air contactor 3000 is provided having a carbon capture apparatus 3002, a regeneration process 3004, and a heat pump 3006 to transfer heat from a hot process fluid 3008 to a regeneration fluid 3010 from the regeneration process 3004. Instead of directly heating the regeneration fluid 3010 using the hot process fluid 3008, the heat pump 3006 has a closed circuit for a heat pump fluid 3017 that operates as an intermediary between the hot process fluid 3008 and the regeneration fluid 3010. The heat pump fluid 3017 may include, for example, hydrofluorocarbons (e.g., R410A, R134A, R407C, R32, R1234ZE), propane (e.g., R290, R744), carbon dioxide, or ammonia (e.g., R717).

The heat pump 3006 has a condenser 3014 that operates at a higher temperature than the hot process fluid 3008 because the heat pump 3006 has a compressor 3106 that increases the temperature and pressure of the heat pump fluid 3017 as the heat pump fluid 3017 travels from the evaporator 3012 to the condenser 3014. For example, the evaporator 3012 of the heat pump 3006 transfers heat from the hot process fluid 3008 to the heat pump fluid 3017. In one embodiment, the heat pump fluid 3017 enters the evaporator 3012 as a liquid, the heat pump fluid 3017 is boiled in the evaporator 3012 by the heat from the process fluid 3008, and the heat pump fluid 3017 exits the evaporator 3012 as a gas.

At the condenser 3014 of the heat pump 3006, the fluid of the heat pump 3006 loses heat to the regeneration fluid 3010. In the condenser 3014, phase change occurs (e.g., gas condensing into liquid) while the temperature and pressure remain generally constant. The heat pump 3006 further includes a compressor 3016 and an expansion valve 3018. The expansion valve 3018 provides a rapid pressure decrease of the heat pump fluid 3017 and an associated rapid temperature drop of the heat pump fluid 3017. The heat pump 3006 may heat the capture fluid 3010 more efficiently than an electric heater because the coefficient of performance of the heat pump 3006 is greater than one. More specifically, the energy the heat pump 3006 transfers to the regeneration fluid 3010 is greater than the energy consumed by the compressor 3106.

Figure 49:
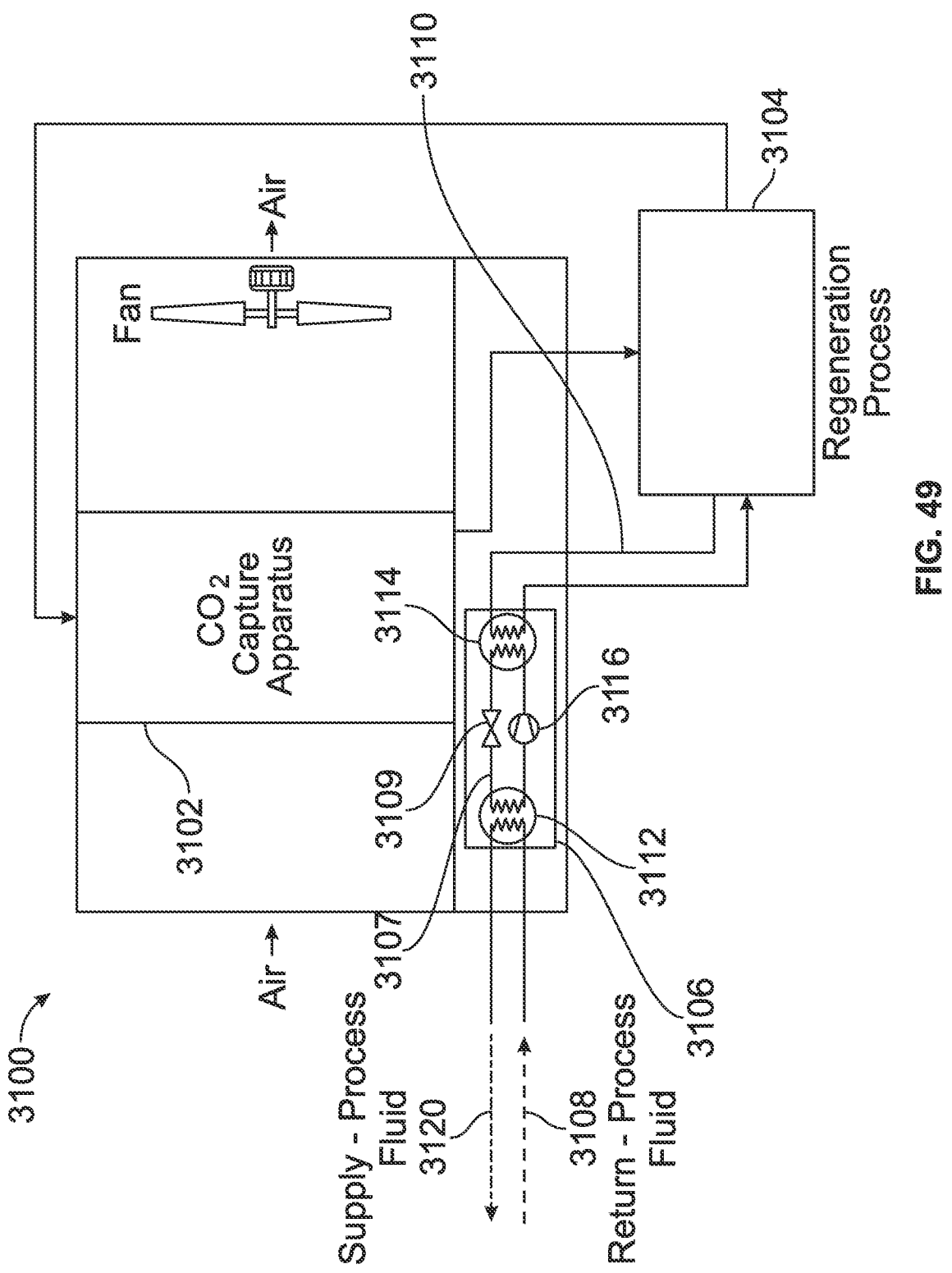
FIG. 49 is a schematic view of an air contactor having a chiller for transferring heat from a process fluid to a carbon capture regeneration process.

With reference to FIG. 49, an air contactor 3100 is provided having a carbon capture apparatus 3102, a regeneration process 3104, and a chiller 3106. The chiller 3106 has a chiller fluid 3107 that receives heat from a process fluid 3108. The chiller 3106 has a compressor 3116 that increases the temperature of the process fluid 3108, a condenser 3114 to transfer heat to regeneration fluid 3110, and an expansion valve 3109. The air contactor 3100 is similar to the air contactor 3000, except that the air contactor 3100 has a chiller 3106 instead of the heat pump 3006. The evaporator 3112 and condenser 3114 of the chiller 3106 have lower temperatures than the evaporator 3012 and condenser 3014 of the air contactor 3000, which may improve the efficiency of the process that receives cooled process fluid 3120 from the chiller 3106. More specifically, the chiller 3106 may operate at cooler temperatures than the heat pump 3006 because the chiller 3106 is sized to provide a particular cooling capacity for the process fluid 3120. By contrast, the heat pump 3006 may be configured to increase the temperature of the regeneration fluid 3110 and operates at a higher temperature than the chiller 3106 since the primary function of the heat pump 3006 is to heat the regeneration fluid 3110.

Figure 50:
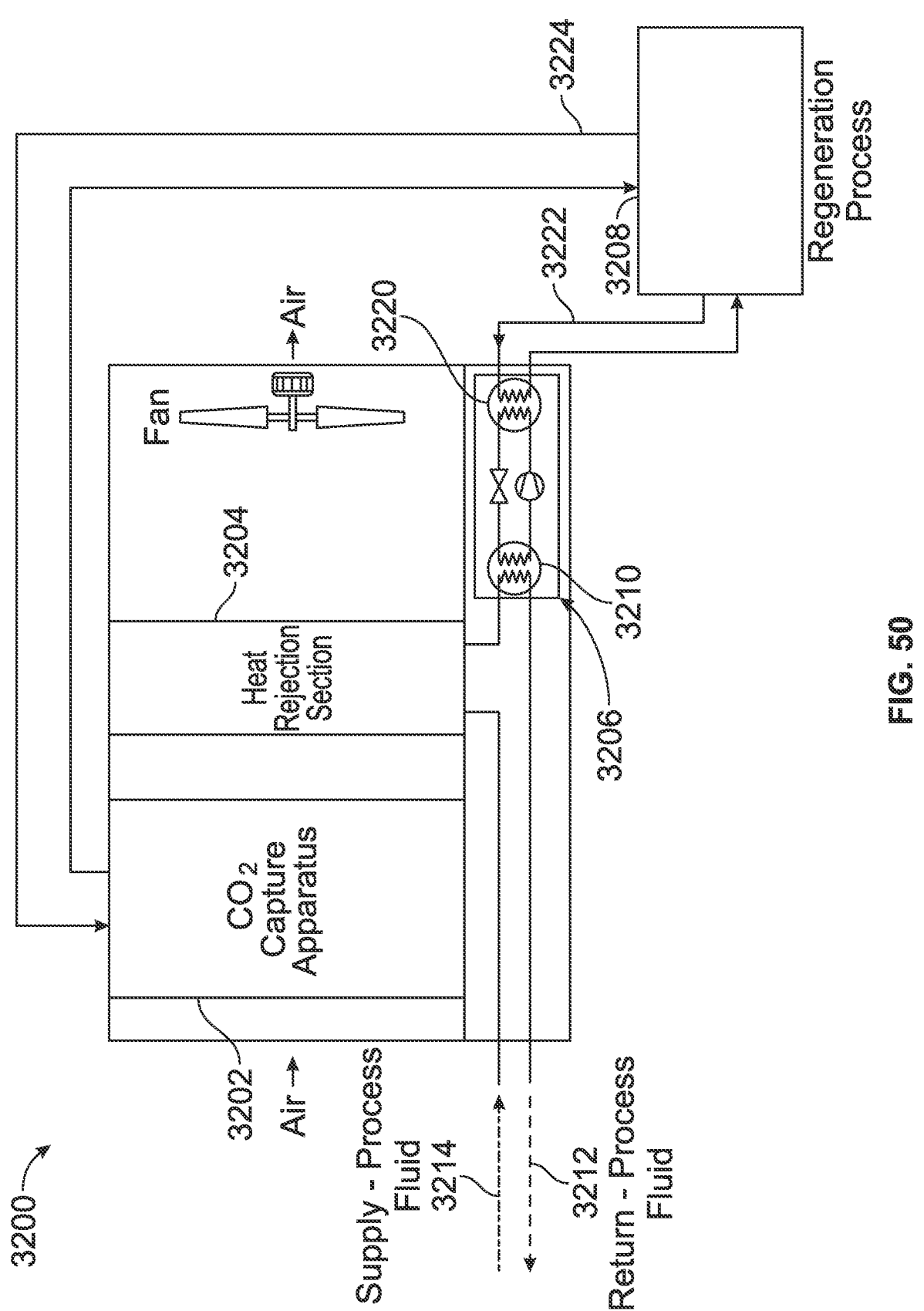
FIG. 50 is a schematic view of an air contactor having an air-cooled heat exchanger downstream of a carbon capture media and a heat pump for transferring heat from a process fluid to a carbon capture regeneration process.

Regarding FIG. 50, an air contactor 3200 is provided having a carbon capture apparatus 3202, an air-cooled heat exchanger 3204, a heat pump 3206, and a regeneration process 3208. The air-cooled heat exchanger 3204 may include, for example, a direct heat exchanger, a dry indirect heat exchanger, a wet indirect heat exchanger, a hybrid wet/dry heat exchanger, and/or adiabatic heat exchanger. The heat pump 3206 has an evaporator 3210 that receives hot process fluid 3212 and absorbs heat therefrom. The evaporator 3210 directs the process fluid 3212 to the air-cooled heat exchanger 3204 wherein the process fluid loses additional heat to the air flow through the air contactor 3200. The air contactor 3200 directs cooled process fluid 3214 from the air-cooled heat exchanger 3204 back to the associated process. The heat pump 3206 has a condenser 3220 that transfers heat to a regeneration fluid 3222. The regeneration process 3208 utilizes the heated regeneration fluid 3222 to replenish or produce a regenerated capture fluid 3224 for the carbon capture apparatus 3202. The heat pump 3206 provides extra heat rejection capacity to the air contactor 3200. Additionally or alternatively to the carbon capture apparatus 3202, the air contactor 3200 may include a system to distribute (e.g., spray or flood) an indirect heat exchanger of the air-cooled heat exchanger 3204 with carbon capture solution to increase the overall $CO_2$ capture capacity and provide some additionally heat rejection capacity via evaporation of water in the carbon capture solution.

Figure 51:
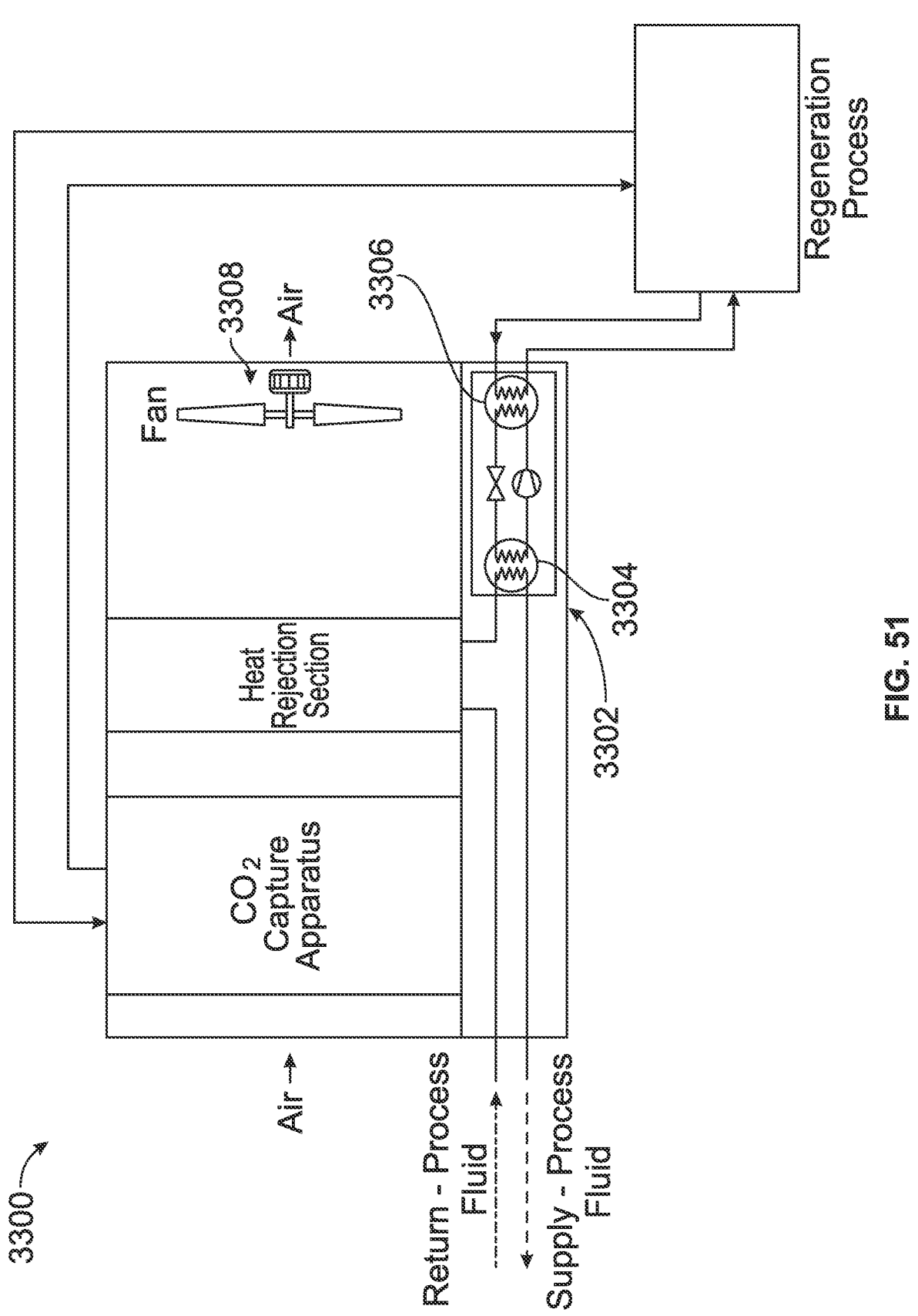
FIG. 51 is a schematic view of an air contactor having an air-cooled heat exchanger downstream of a carbon capture media and a chiller to transfer heat from a process fluid to a regeneration process.

With reference to FIG. 51, an air contactor 3300 is provided that is similar in many respects to the air contactor 3200 discussed above, with the exception of the air contactor 3300 including a chiller 3302 instead of a heat exchanger. Due to the lower temperatures of an evaporator 3304 and condenser 3306 of the chiller 3302, a controller of the air contactor 3300 may reduce the speed of a fan assembly 3308 and reduce power consumption for a lower heat rejection capacity requirement.

Figure 52:
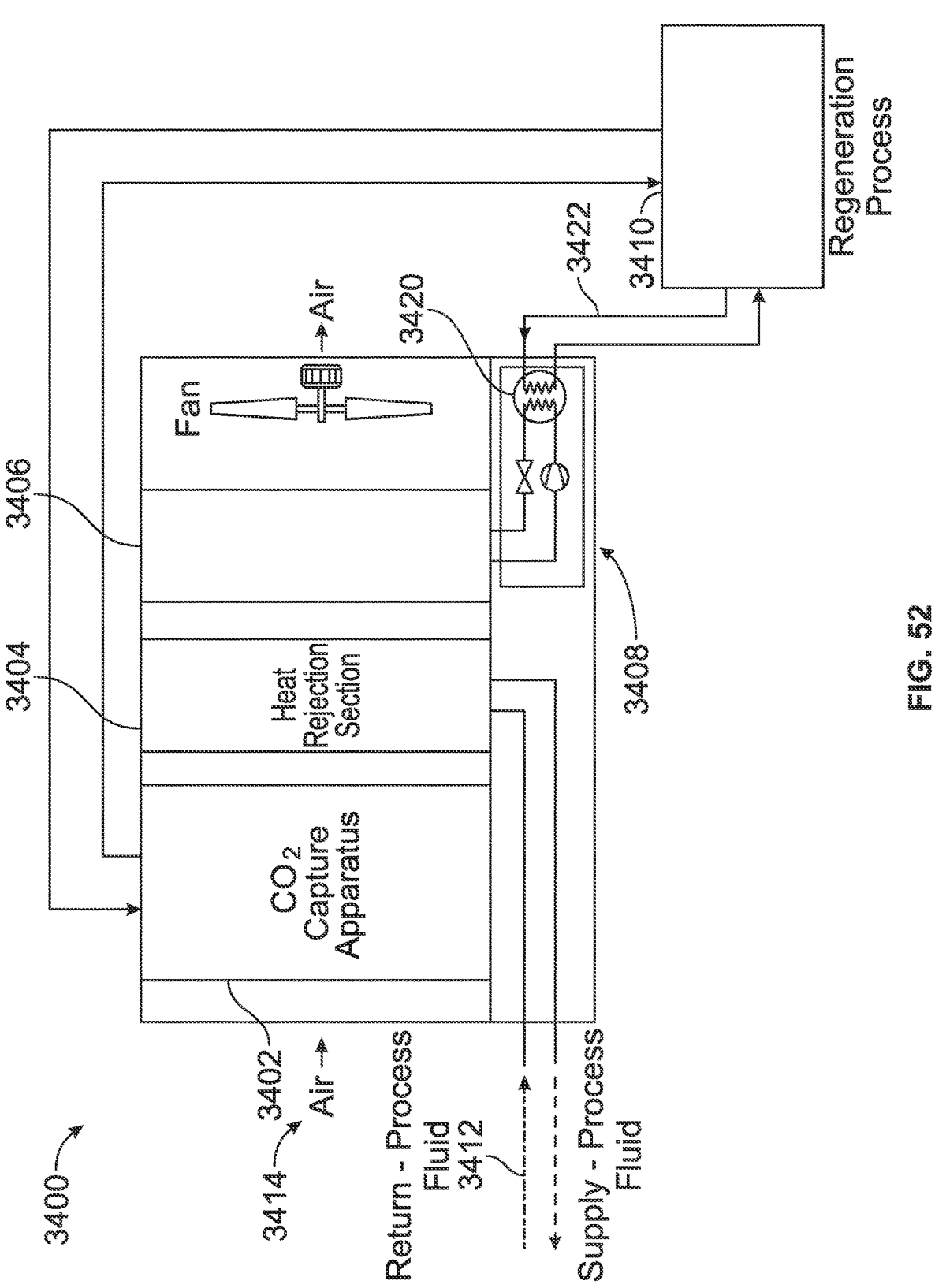
FIG. 52 is a schematic view of an air contactor having an air-cooled heat exchanger and an evaporator downstream of a carbon capture media, the evaporator connected to a heat pump for providing heat to a carbon capture regeneration process.

With reference to FIG. 52, an air contactor 3400 is provided having a carbon capture apparatus 3402, an air-cooled heat exchanger 3404, an evaporator 3406, a heat pump 3408, and a regeneration process 3410. The air-cooled heat exchanger 3404 receives hot process fluid 3412 and transfers heat to air 3414 traveling through the air contactor 3400 upstream of the evaporator 3406. In one embodiment, the evaporator 3406 includes a fin-tube heat exchanger. The evaporator 3406 receives the heated air 3414 downstream of the air-cooled heat exchanger 3404 and transfers heat from the heated air flow to a fluid of the heat pump 3408. The heat pump 3408 has a condenser 3420 for transferring heat to a regeneration fluid 3422 of the regeneration process 3410. Positioning the evaporator 3406 in the air stream permits high-temperature air from the air-cooled heat exchanger 3404 to be used as a heat source for the heat pump 3408. In this manner, high temperatures may be provided at the condenser 3420 with increased energy efficiency for the regeneration process 3410.

Figure 53:
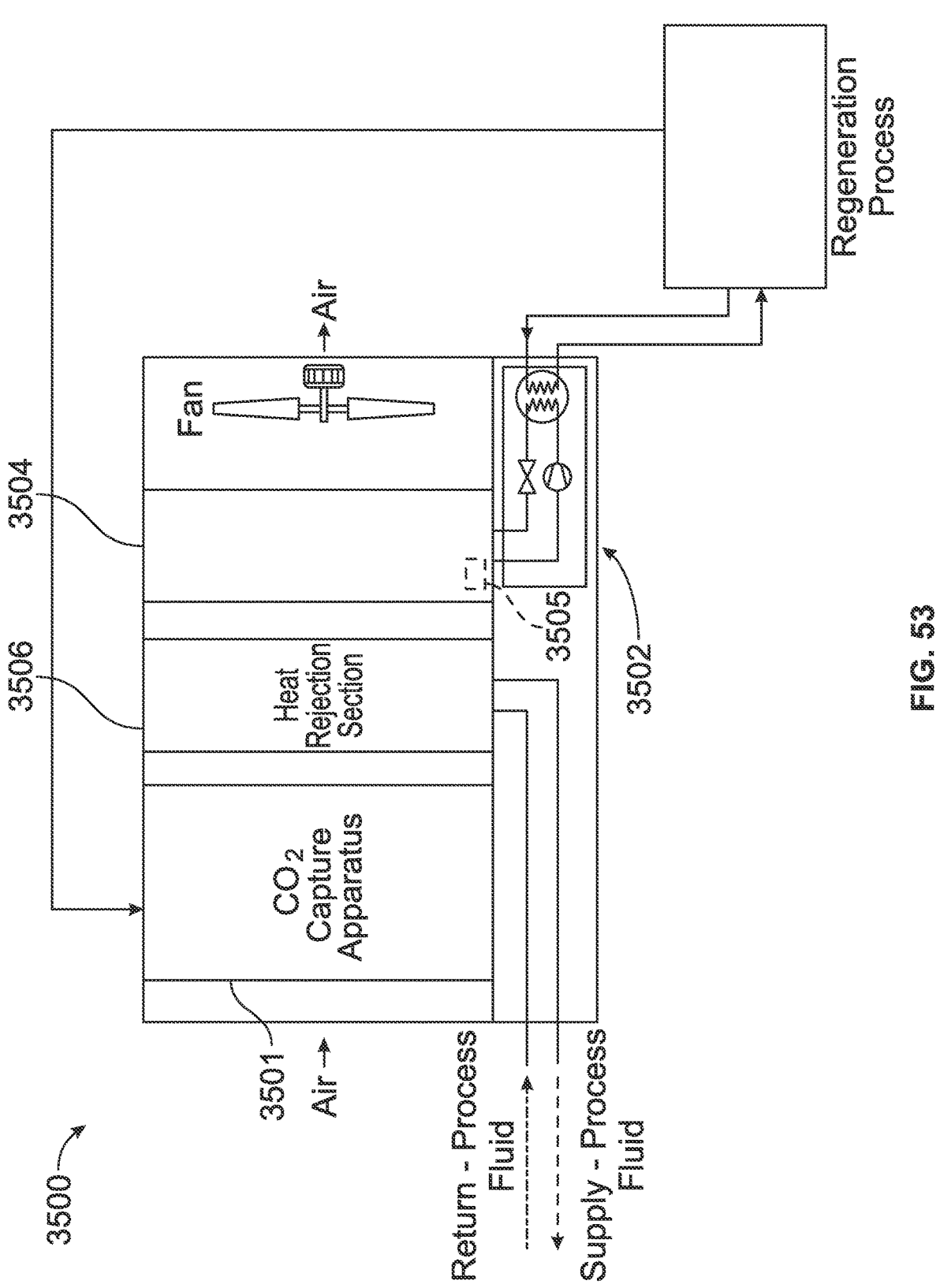
FIG. 53 is a schematic view of an air contactor having an air-cooled heat exchanger and an evaporator downstream of a carbon capture media, the evaporator connected to a chiller for providing heat to a carbon capture regeneration process.

With reference to FIG. 53, an air contactor 3500 is provided that is similar in many respects to the air contactor 3400 discussed above. One difference between the air contactors 3500, 3400 is that the air contactor 3500 includes a chiller 3502 instead of the heat pump 3408 of the air contactor 3400. The chiller 3502 provides chiller fluid to an evaporator 3504 in the stream of air flowing through the air contactor 3500. The evaporator 3504 absorbs heat from the air downstream of an air cooled heat exchanger 3506, which cools the air after the air travels through air cooled heat exchanger 3506. The cooling provided by the evaporator 3504 may reduce the risk of plume. Further, the evaporator 3504 may include a water recovery system 3505 and the cooling provided by the evaporator 3504 may condense water from the air that may be used in another process, such as a makeup water source. The water recovery system 3505 may include, for example, a trough arranged to collect condensed water that falls from an indirect heat exchanger of the evaporator 3504.

Figure 54:
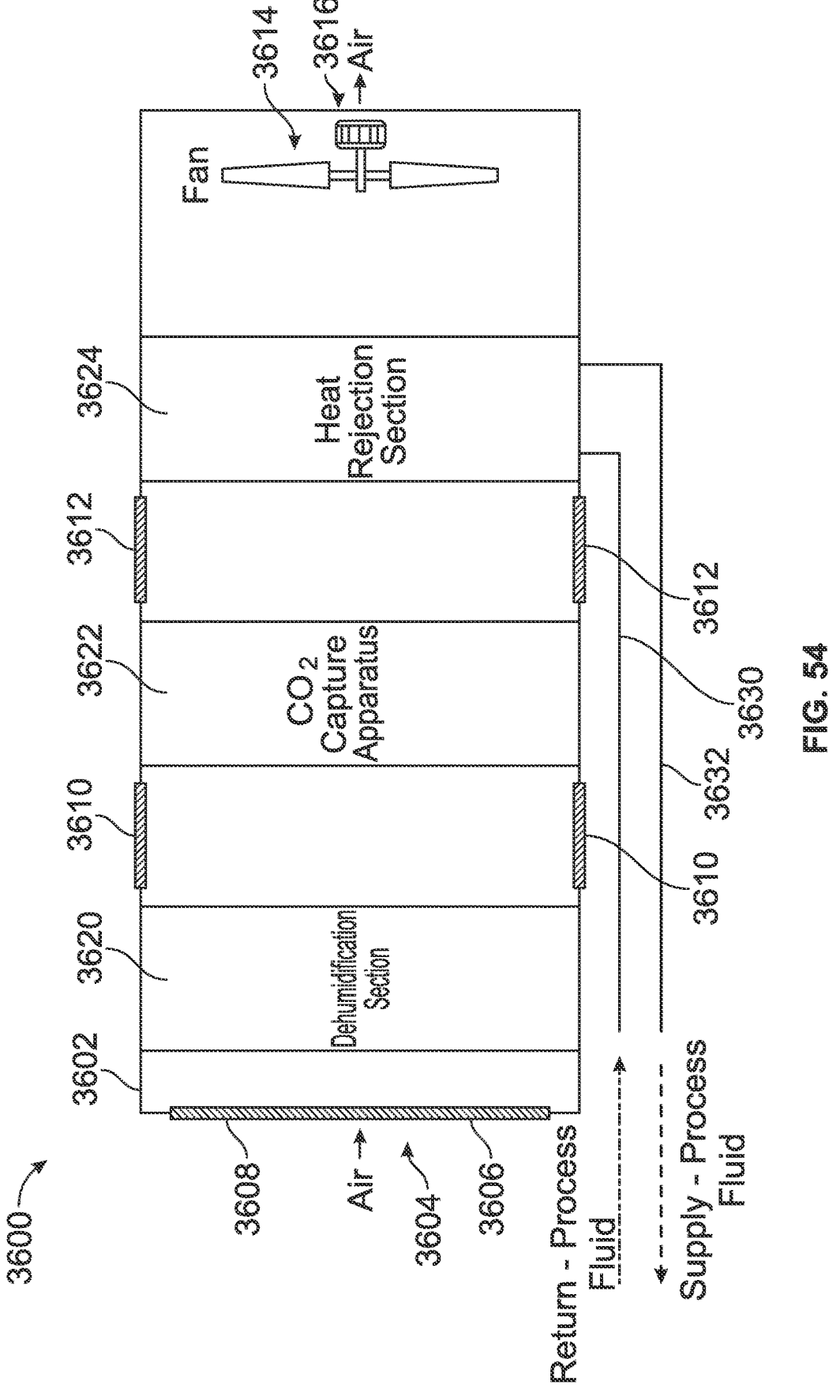
FIG. 54 is a schematic view of an air contactor having open main louvers and closed first and second intermediate louvers such that air flows through a dehumidifier, an air pollutant capture media, and a heat exchanger of the air contactor.

With reference to FIG. 54, an air contactor 3600 is provided having an outer structure, such as housing 3602, with dampers 3604 to control the airflow traveling through the air contactor 3600. The dampers 3604 may each be closed, open, or partially open to control air flow through the damper 3604. In one embodiment, the dampers 3604 include main louvers 3606 at an inlet 3608 of the air contactor 3600, first intermediate louvers 3610, and second intermediate louvers 3612. The air contactor 3600 has a fan assembly 3614 to generate air flow through one or more of the louvers 3606, 3610, 3612 and out from an outlet 3616 of the air contactor 3600.

The air contactor 3600 includes a dehumidifier 3620, capture apparatus 3622, and a heat exchanger 3624. The dehumidifier 3620, capture apparatus 3622, and heat exchanger 3624 may be similar to the associated components discussed above. The heat exchanger 3624 receives process fluid via a process fluid return 3630 and exchanges heat with air flowing through the air contactor 3600. The heat exchanger 3624 returns the process fluid to the process via a process fluid supply 3632. In one embodiment, the process fluid return 3630 is providing heated process fluid and the heat exchanger 3624 and removes heat from the process fluid before directing the process fluid to the process fluid supply 3632.

In FIG. 54, the air contactor 3600 is shown in a first configuration wherein the main louvers 3606 are open and the first and second intermediate 3610, 3612 are closed. In the first configuration, drawn into the air contactor 3600 by the fan assembly 3614 is directed through the dehumidifier 3620, the capture medium 3622, and the heat exchanger 3624. The air contactor 3600 may be operated in the first configuration when the capture medium 3622 is removing an air pollutant from the air, dehumidification is desired upstream of the capture medium 3622, and the heat exchanger 3624 is exchanging heat between the air and the process fluid.

Figure 55:
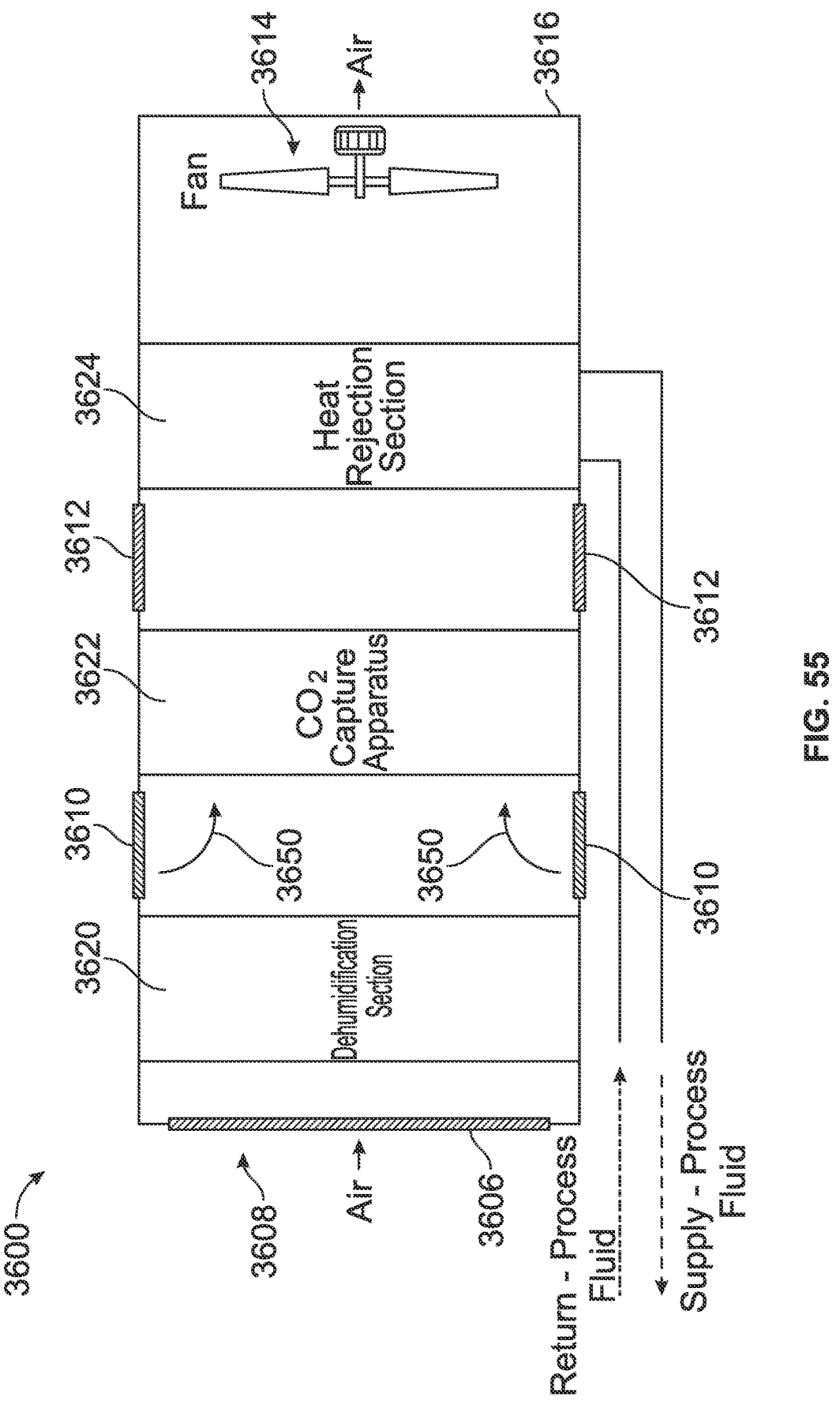
FIG. 55 is a schematic view similar to FIG. 54 showing the main louvers and the second intermediate louvers closed and the first intermediate louvers open such that air bypasses the dehumidifier.

With reference to FIG. 55, the air contactor 3600 is shown in a second configuration wherein the main louvers 3606 and the second intermediate louvers 3612 are closed and the first intermediate louvers 3610 are open. A controller associated with the air contactor 3600 may cause the air contactor 3600 to reconfigure from the first configuration of FIG. 54 to the second configuration of FIG. 55, or any of the other configurations discussed below, such as by operating linear actuators of air contactor 3600 to adjust the louvers 3606, 3610, 3612.

In the second configuration, the air flow enters the air contactor 3600 generally in directions 3650 via the first intermediate louvers 3610, travels through the capture medium 3622 and heat exchanger 3624, before exiting via the outlet 3616. In the second configuration, the dehumidifier 3620 is bypassed by the air flow. The air contactor 3600 may be operated in the second configuration when the capture medium 3622 and heat exchanger 3624 are operating, but dehumidification is not required. Bypassing the dehumidifier 3620 may reduce the power consumed by the fan assembly 3614 when the dehumidifier is not operating.

Figure 56:
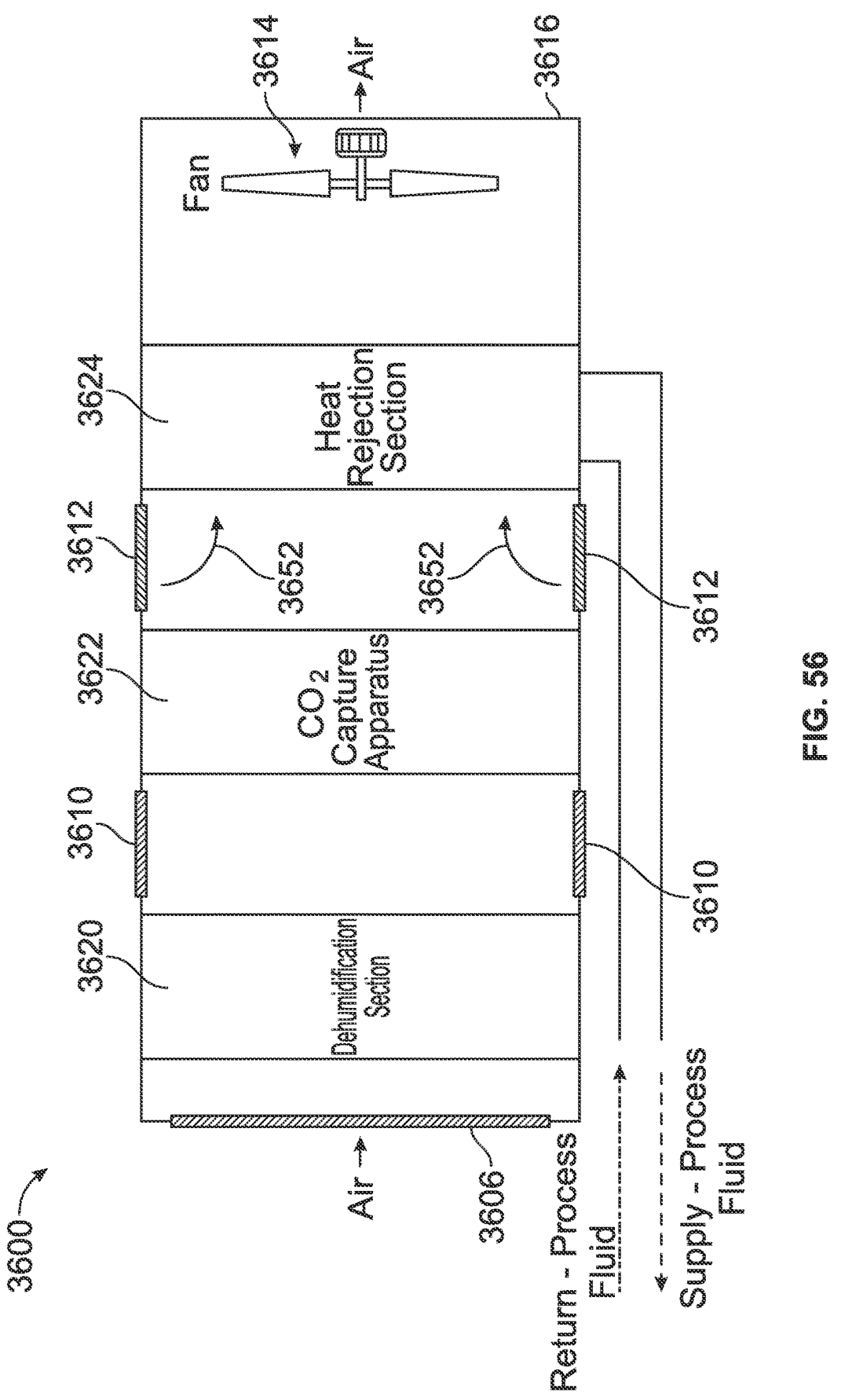
FIG. 56 is a schematic view similar to FIG. 54 showing the main louvers and first intermediate louvers closed and the second intermediate louvers open such that air bypasses the dehumidifier and the capture media.

With reference to FIG. 56, the air contactor 3600 is shown in a third configuration wherein the main louvers 3606 and the first intermediate louvers 3610 are closed and the second intermediate louvers 3612 are opened. The air flow enters the air contactor 3600 generally in directions 3652 via the second intermediate louvers 3612, travels through the heat exchanger 3624, and exits the air contactor via the outlet 3616. Because the main louvers 3606 and first intermediate louvers 3610 are closed, the air flow bypasses the dehumidifier 3620 and the capture medium 3622. The air contactor 3600 may be shifted to the third configuration, for example, when the capture medium 3622 is not used to reduce the power draw of the fan assembly 3614.

Figure 57:
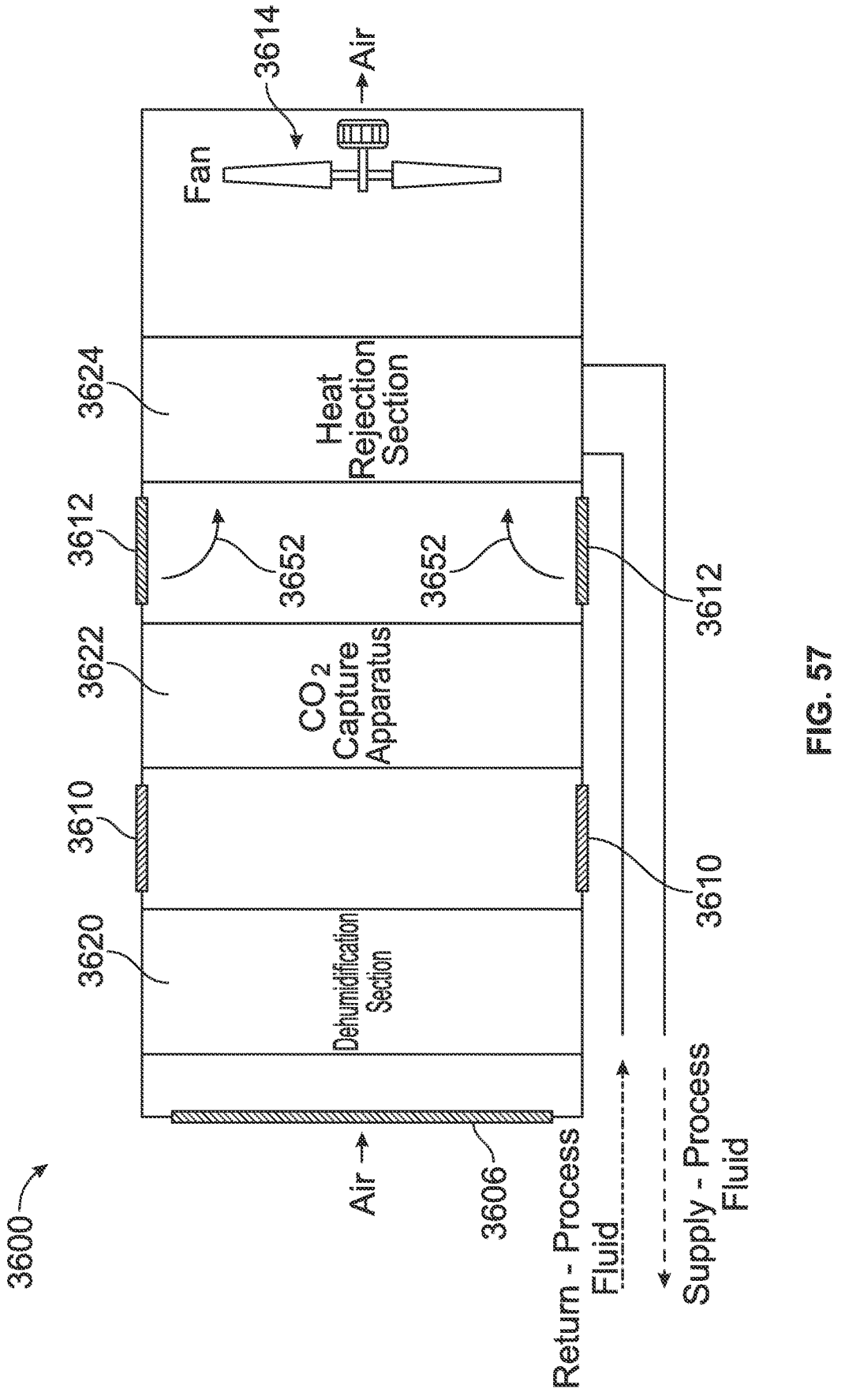
FIG. 57 is a schematic view similar to FIG. 54 showing the main louvers and the second intermediate louvers open and the first intermediate louvers closed such that ambient air may be drawn directly into the heat exchanger.

With reference to FIG. 57, the air contactor 3600 is shown in a fourth configuration wherein the main louvers 3606 and the second intermediate louvers 3612 are open while the first intermediate louvers 3610 are closed. In this manner, air flow may enter the air contactor 3600 via the main louvers 3606, travel through the dehumidifier 3620, the capture medium 3622, and the heat exchanger 3624. The open, second intermediate louvers 3612 permit air to be directed through the heat exchanger 3624 in addition to the air that enters the air contactor 3600 via the main louvers 3606. The air that enters via the second intermediate louvers 3612 may have a different makeup (e.g., has not been in contact with carbon capture solution) and/or may be cooler than the air traveling from the capture medium 3622 to the heat exchanger 3624. The air drawn into the open, second intermediate louvers 3612 may dilute the airflow coming from the air pollutant capture process, which in some embodiments reduces the concentration of corrosive chemicals in the air stream. The air drawn into the open, second intermediate louvers 3612 may also reduce plume in an embodiment where operation of the capture medium 3622 increases the humidity of the air stream.

Further, the air that enters via the second intermediate louvers 3612 may provide an additional volume of air such that the heat exchanger 3624 has a higher flow rate of air traveling therethrough than does the dehumidifier 3620 and the capture medium 3622. The ability to provide different air flow rates through the capture medium 3622 and the heat exchanger 3624 enables the precise control of the air pollutant capture process and heat rejection process. In some embodiments, one or more of the louvers 3606, 3610, 3612 may be partially opened to optimize air path distribution, flow rate, and/or air velocity. The louvers 3606, 3610, 3612 may be located on one or more vertical, horizontal, inclined, top, bottom, and/or side walls of the air contactor 3600.

The internal components of the air contactors of FIGS. 50-57 may be organized so that the air contacts the components in a desired order generally as discussed above with respect to FIGS. 13-37. For example, the air contactors of FIGS. 50-57 may be provided with heat exchangers upstream of the capture apparatus in some embodiments. Dehumidifiers and/or evaporators may likewise be positioned upstream or downstream of the capture apparatus. As an example in this regard, the heat rejection section 3506 and evaporator 3504 of the cooling tower 3500 may be provided upstream of capture apparatus 3501. As yet another example, the heat rejection section 3506 may be upstream of the capture apparatus 3501 while the evaporator 3504 is downstream of the capture apparatus 3501.

Figure 58:
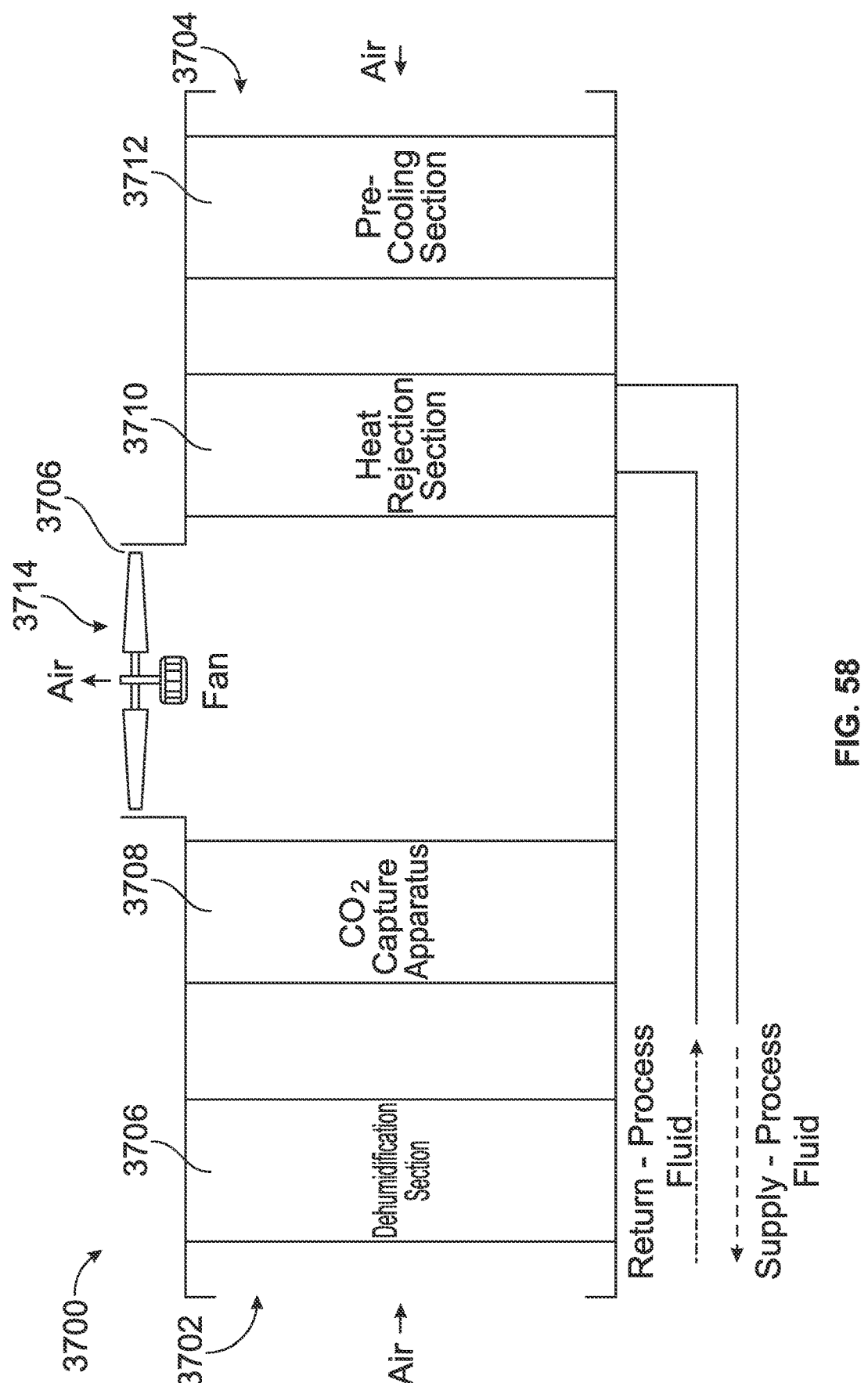
FIG. 58 is a schematic view of an asymmetric air contactor having one side of the air contactor configured to provide air pollutant capture and the other side of the air contactor configured to provide heat exchange.

Regarding FIG. 58, an air contactor 3700 is provided that has a first air inlet 3702, a second air inlet 3704, and an air outlet 3706. The air contactor 3700 has a dehumidifier 3706 and capture apparatus 3708 on one side of the air contactor 3700 and a heat exchanger 3710 and a precooler 3712 on the opposite side of the air contactor 3700. In this manner, the air contactor 3700 is asymmetric such that one side of the air contactor 3700 provides air pollutant capture operability and the opposite side of the air contactor 3700 provides heat exchange operability. The precooler 3712 may include, for example, an adiabatic pad system. Air that travels from the capture apparatus 3708 and the heat exchanger 3710 are combined and discharged through the air outlet 3706 via operation of a fan assembly 3714.

Figure 59:
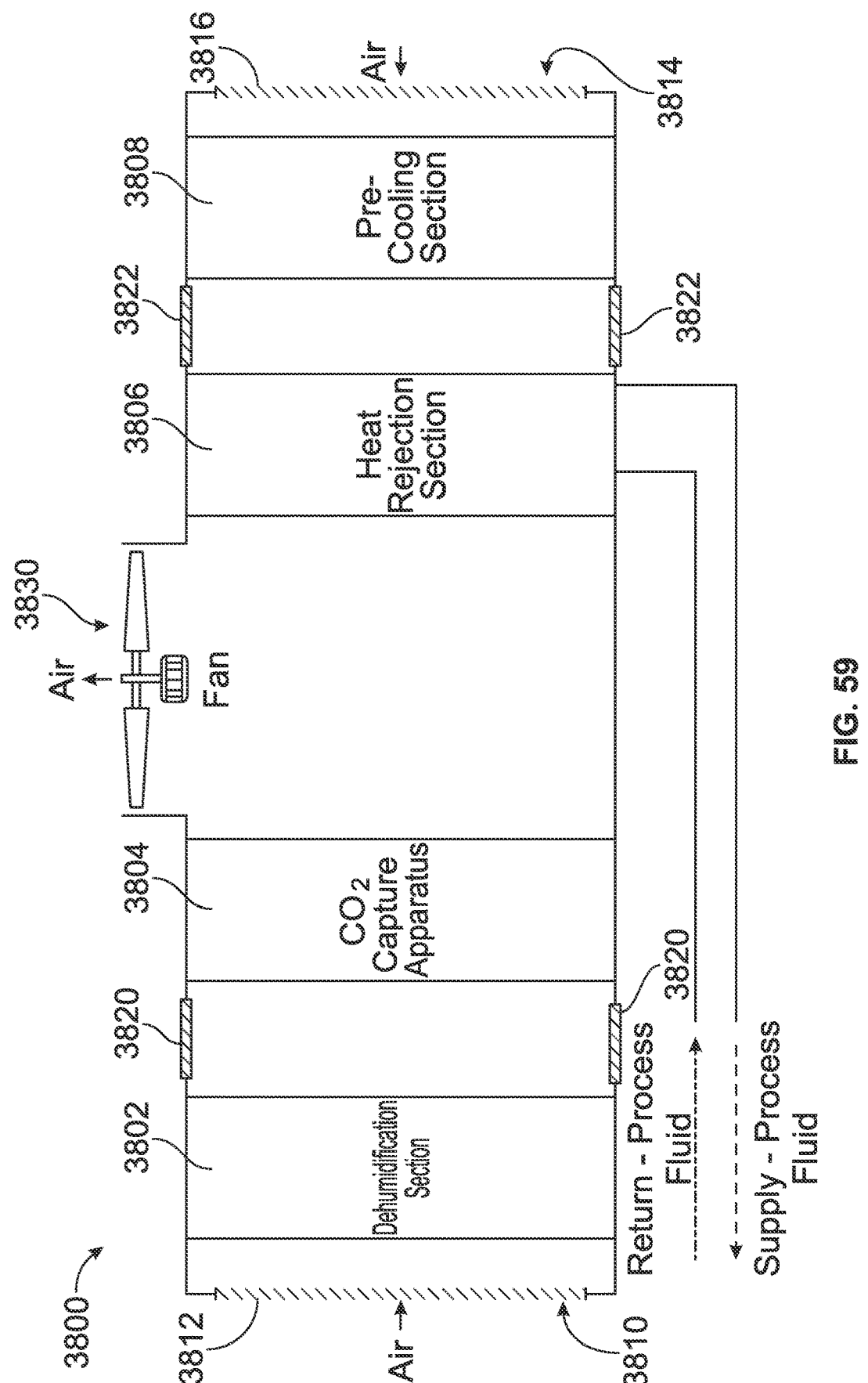
FIG. 59 is a schematic view of an asymmetric air contactor having louvers to selectively control airflow through dehumidification, air pollutant capture, heat exchange, and pre-cooling components of the air contactor.

Regarding FIG. 59, an air contactor 3800 is provided that is similar in many respects to the air contactor 3700. The air contactor 3800 includes a dehumidifier 3802, capture apparatus 3804, a heat exchanger 3806, and a precooler 3808. The air contactor 3800 has a first air inlet 3810 with first main louvers 3812, a second air inlet 3814 with main louvers 3816, and first and second intermediate louvers 3820, 3822. The louvers 3812, 3816, 3820, 3822 may be opened or closed to control air flow to the different sections of the air contactor 3800. The louvers 3812, 3816, 3820, 3822 may be partially opened or closed depending on the air velocity and/or flow rate requirements of the air contactor 3800, expected energy and/or water consumption, and/or heat transfer load required for the air contactor 3800. The louvers of the air contactor 3800 may enable independent operation of the air pollutant capture and air rejection operability of the unit. For example, the main louvers 3812 and first intermediate louvers 3820 may be closed so that air bypasses the dehumidifier 3802 and the capture apparatus 3804 when air pollutant capture is not required. Bypassing the dehumidifier and the capture apparatus 3804 may reduce power consumption of a fan assembly 3830 of the air contactor 3800. Conversely, the main louvers 3812 and first intermediate louvers 3820 may be opened while the louvers 3816, 3822 are closed to enable air pollutant capture operability while bypassing the heat exchanger 3806 and the precooler 3808 when heat exchanger operability is not required.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

While there have been illustrated and described particular embodiments of the present invention, those skilled in the art will recognize that a wide variety of modifications, alterations, and combinations can be made with respect to the above-described embodiments without departing from the scope of the invention, and that such modifications, alterations, and combinations are to be viewed as being within the ambit of the inventive concept. For example, various embodiments of air contactors are described herein as being configured to remove $CO_2$ from the air, but it will be apparent that the air contactors may be configured to remove other air pollutants in addition to or instead of $CO_2$, such as methane, VOC and VOX by utilizing the appropriate capture technique. As another example, water makeup systems are described for some air contactors, but it will be appreciated that the water makeup systems may be used with any of the air contactors where water makeup would be useful.

What is claimed is:

1. An air contactor comprising:
an airflow generator operable to produce an airflow;
an air pollutant capture system comprising:
an air pollutant capture apparatus to transfer an air pollutant from the airflow and to a fluid;
a fluid regeneration apparatus configured to utilize heat from a heat source to remove the air pollutant from the fluid; and
a thermal energy storage operable to either receive heat from the fluid or provide heat to the fluid regeneration apparatus;
the air pollutant capture system having:
a regeneration and charging mode wherein the fluid regeneration apparatus receives heat from the heat source, the fluid regeneration apparatus removes the air pollutant from the fluid, and the thermal energy storage receives heat from the fluid; and
a regeneration and discharging mode wherein the fluid regeneration apparatus receives heat from the thermal energy storage and the fluid regeneration apparatus removes the air pollutant from the fluid; and
a controller operatively connected to the air pollutant capture system, the controller configured to operate the air pollutant capture system in the regeneration and discharging mode in response to a determination of the air pollutant capture system in the regeneration and discharging mode satisfying an operating criterion.

2. The air contactor of claim 1 wherein the operating criterion comprises the fluid regenerator apparatus being able to remove the air pollutant from the fluid despite the heat source being unable to provide sufficient heat to operate the fluid regenerator apparatus.

3. The air contactor of claim 1 wherein the operating criterion comprises saving energy.

4. The air contactor of claim 1 wherein the controller is configured to operate the air pollutant capture system in the regeneration and charging mode in response to a determination of the heat source being able to provide sufficient heat to the fluid regeneration process and a determination of an inadequate charge of the thermal energy storage.

5. The air contactor of claim 1 wherein the air pollutant capture system has a regeneration mode wherein:
the fluid regeneration apparatus receives heat from the heat source, the fluid regeneration apparatus removes the air pollutant from the fluid, and the thermal energy storage receives less heat from the fluid than when the air pollutant capture system is in the regeneration and charging mode.

6. The air contactor of claim 1 wherein the air pollutant capture system comprises a pump operable to pump a heat transfer fluid between the thermal energy storage and the fluid regeneration apparatus; and
wherein, with the air pollutant capture system in the regeneration and discharging mode, the pump pumps the heat transfer fluid between the thermal energy storage and the fluid regeneration apparatus to cause the fluid regeneration apparatus to receive heat from the thermal energy storage.

7. The air contactor of claim 1 wherein the air pollutant capture system comprises a valve intermediate the fluid regeneration apparatus and the thermal energy storage;
wherein, with the air pollutant capture system in the regeneration and charging mode, the valve has a first configuration wherein the valve directs the fluid from the fluid regeneration apparatus to the thermal energy storage; and
wherein, with the air pollutant capture system in the regeneration and discharge mode, the valve has a second configuration wherein the fluid bypasses the thermal energy storage.

8. The air contactor of claim 1 wherein the thermal energy storage comprises a plurality of thermal energy storages; and
wherein, with the air pollutant capture system in the regeneration and discharging mode, the fluid regeneration apparatus receives heat from the thermal energy storages.

9. The air contactor of claim 1 wherein the thermal energy storage comprises a first thermal energy storage and a second thermal energy storage;
wherein the air pollutant capture system has a regeneration, charging, and discharging mode wherein:
the fluid regeneration apparatus receives heat from the heat source;
the fluid regeneration apparatus removes the air pollutant from the fluid;
the first thermal energy storage receives heat from the fluid; and
the fluid regeneration apparatus receives heat from the second thermal energy storage.

10. The air contactor of claim 9 wherein the controller is configured to operate the air pollutant capture system in the regeneration, charging, and discharging mode in response to:

a determination of the heat source being unable to provide sufficient heat to the fluid regeneration apparatus; and a determination of an inadequate charge of the first thermal energy storage and an adequate charge of the second thermal energy storage.

11. The air contactor of claim 1 wherein the fluid regeneration apparatus comprises an endothermic regenerative apparatus configured to receive the fluid from the air pollutant capture apparatus.

12. The air contactor of claim 11 wherein the air pollution capture fluid regeneration apparatus further includes an exothermic regenerative process configured to receive the fluid from the endothermic regenerative apparatus.

13. The air contactor of claim 1 wherein the air pollutant capture system includes a heat source thermal energy storage;

wherein the air pollutant capture system has a regeneration, charging, and heat source active mode wherein:

the fluid regeneration apparatus receives heat from the heat source and removes the air pollutant from the fluid;

the thermal energy storage receives heat from the fluid; and the heat source thermal energy storage receives heat from the heat source;

wherein the air pollutant capture system has a regeneration, charging, and heat source inactive mode wherein:

the fluid regeneration apparatus receives heat from the heat source thermal energy storage and removes the air pollutant from the fluid; and the thermal energy storage receives heat from the fluid.

14. The air contactor of claim 1 wherein the air pollutant capture system includes a heat source thermal energy storage;

wherein the air pollutant capture system has a regeneration, charging, and heat source active mode wherein:

the fluid regeneration apparatus receives heat from the heat source and removes the air pollutant from the fluid;

the thermal energy storage receives heat from the fluid; and the heat source thermal energy storage receives heat from the heat source;

wherein the air pollutant capture system has a regeneration, discharging, and heat source inactive mode wherein:

the fluid regeneration apparatus:

receives heat from the heat source thermal energy storage;

receives heat from the thermal energy storage; and removes the air pollutant from the fluid.

15. The air contactor of claim 1 wherein the air pollutant capture system comprises a solid sorbent and the fluid comprises a gas.

16. The air contactor of claim 1 wherein the airflow generator comprises a fan assembly operatively connected to the controller.

17. The air contactor of claim 1 wherein the fluid regeneration apparatus comprises at least one of a heat pump and a chiller.

18. The air contactor of claim 1 wherein the fluid is configured to chemically react with carbon dioxide ($CO_2$) in the airflow to remove the $CO_2$ from the airflow.

19. The air contactor of claim 1 wherein the air pollutant is carbon dioxide ($CO_2$), methane ($CH_4$), volatile organic compounds (VOC), volatile halogenated organic carbons (VOX), or a combination thereof.

20. An air contactor comprising:

a fan assembly to generate an airflow;

an air pollutant capture system comprising:

an air pollutant capture apparatus to transfer an air pollutant from the airflow to a fluid;

a fluid regeneration apparatus configured to remove the air pollutant from the fluid; and a mechanical heat generator comprising at least one of a chiller and a heat pump, the mechanical heat generator configured to receive a process fluid from an industrial process at a first temperature and to receive a heat transfer fluid from the air pollutant capture system;

the mechanical heat generator operable to increase the temperature of the heat transfer fluid to a second temperature higher than the first temperature and return the heat transfer fluid to the fluid regeneration apparatus at the second temperature to facilitate the fluid regeneration apparatus removing the air pollutant from the fluid.

21. The air contactor of claim 20 further comprising a heat exchanger configured to transfer heat between the process fluid and the airflow.

22. The air contactor of claim 21 wherein the heat exchanger is downstream of the air pollutant capture apparatus so that the heat exchanger transfers heat between the process fluid and the airflow after the fluid removes the air pollutant from the airflow.

23. The air contactor of claim 20 wherein the air pollutant capture apparatus comprises a liquid absorbent material.

24. The air contactor of claim 20 wherein the mechanical heat generator includes:

a first heat exchanger configured to transfer heat between the process fluid and a mechanical heat generator fluid;

a second heat exchanger configured to transfer heat between the mechanical heat generator fluid and the heat transfer fluid;

an expansion valve; and a compressor.

25. The air contactor of claim 20 wherein the mechanical heat generator includes the chiller.

26. The air contactor of claim 20 wherein the mechanical heat generator includes the heat pump.

27. The air contactor of claim 20 wherein the fluid is configured to chemically react with the air pollutant to remove the air pollutant from the airflow.

* * * * *